(12) United States Patent
Becker et al.

(10) Patent No.: US 11,789,921 B2
(45) Date of Patent: *Oct. 17, 2023

(54) SYSTEM AND METHOD FOR MODIFYING VARIOUS TYPES OF ASSETS

(71) Applicant: ImageWorks Interactive, Park Forest, IL (US)

(72) Inventors: Thomas W. Becker, Willow Springs, IL (US); John Moran, Winfield, IL (US); Mike Barrett, Buffalo Grove, IL (US); Gary W. Grube, Barrington Hills, IL (US); Timothy W. Markison, Mesa, AZ (US)

(73) Assignee: ImageWorks Interactive, Park Forest, IL (US)

( * ) Notice: Subject to any disclaimer, the term of this patent is extended or adjusted under 35 U.S.C. 154(b) by 117 days.

This patent is subject to a terminal disclaimer.

(21) Appl. No.: 16/715,296

(22) Filed: Dec. 16, 2019

(65) Prior Publication Data

US 2020/0118214 A1    Apr. 16, 2020

Related U.S. Application Data

(63) Continuation of application No. 13/868,599, filed on Apr. 23, 2013, now Pat. No. 10,510,116.

(60) Provisional application No. 61/641,723, filed on May 2, 2012.

(51) Int. Cl.
*G06F 16/23* (2019.01)
*G06Q 40/06* (2012.01)

(52) U.S. Cl.
CPC ............. *G06F 16/23* (2019.01); *G06Q 40/06* (2013.01)

(58) Field of Classification Search
CPC .......... G06F 16/23; G06F 16/20; G06Q 40/06
See application file for complete search history.

(56) References Cited

U.S. PATENT DOCUMENTS

| | | |
|---|---|---|
| 6,816,879 B1 | 11/2004 | Kiritzov |
| 7,181,425 B1 | 2/2007 | Cha |
| 7,299,208 B1 | 11/2007 | Bailon |
| 7,356,500 B1 | 4/2008 | Waelbroeck |
| 7,555,449 B2 | 6/2009 | Moser |
| 7,571,171 B1 | 8/2009 | Shaw |

(Continued)

*Primary Examiner* — Miranda Le
(74) *Attorney, Agent, or Firm* — Gary W. Grube

(57) ABSTRACT

A method includes generating, by an asset modification module, a core algorithm for modification of assets. The core algorithm modifies the assets based on time-sensitive and time varying evaluation data and in accordance with user preferences. For an asset of the assets, the method further comprises generating a set of augmented algorithms based on the core algorithm, where the set of augmented algorithms modifies the asset based on asset specific time-sensitive and time varying evaluation data and in accordance with asset specific user preferences. When the asset is selected for modification, the method further includes obtaining current asset specific time-sensitive and time varying evaluation data and selecting an augmented algorithm to process indicators of the current asset specific time-sensitive and time varying evaluation data in light of the asset specific user preferences to determine a modification operation. The method further includes modifying the asset in accordance with the modification operation.

3 Claims, 72 Drawing Sheets

(56) References Cited

U.S. PATENT DOCUMENTS

| | | | |
|---|---|---|---|
| 7,680,722 B2 | 3/2010 | Bok | |
| 7,689,493 B1* | 3/2010 | Sullivan | G06Q 40/06 |
| | | | 705/36 R |
| 7,739,183 B2* | 6/2010 | Voudrie | G06Q 40/12 |
| | | | 705/37 |
| 7,783,546 B2 | 8/2010 | Saulys | |
| 7,793,308 B2 | 9/2010 | Gusler | |
| 7,870,563 B2 | 1/2011 | Satyanarayana | |
| 7,886,001 B2 | 2/2011 | Asthana | |
| 8,069,106 B2 | 11/2011 | Waelbroeck | |
| 8,099,336 B2 | 1/2012 | Klim | |
| 8,112,425 B2 | 2/2012 | Baum | |
| 8,140,664 B2 | 3/2012 | Huang | |
| 8,146,090 B2 | 3/2012 | Travostino | |
| 8,219,473 B2* | 7/2012 | Gardner | G06Q 40/04 |
| | | | 705/37 |
| 8,224,729 B2* | 7/2012 | Hansen | G06Q 10/087 |
| | | | 705/26.4 |
| 8,346,652 B2 | 1/2013 | Smith | |
| 8,510,123 B2* | 8/2013 | Bonev | G06Q 10/02 |
| | | | 705/1.1 |
| 8,630,934 B2 | 1/2014 | Altius | |
| 8,655,826 B1 | 2/2014 | Drewry | |
| 8,732,048 B2 | 5/2014 | Marynowski | |
| 8,738,753 B2 | 5/2014 | Devraj | |
| 8,762,406 B2 | 6/2014 | Ho | |
| 8,872,847 B2 | 10/2014 | Nash | |
| 9,110,933 B1 | 8/2015 | Fuller | |
| 2002/0082969 A1* | 6/2002 | O'Keeffe | G06Q 10/02 |
| | | | 705/37 |
| 2002/0152151 A1* | 10/2002 | Baughman | G06Q 40/06 |
| | | | 705/36 R |
| 2002/0156710 A1* | 10/2002 | Ryder | G06Q 40/10 |
| | | | 705/35 |
| 2002/0156719 A1 | 10/2002 | Finebaum | |
| 2002/0178102 A1 | 11/2002 | Scheinberg | |
| 2003/0126062 A1 | 7/2003 | Gilbert | |
| 2003/0171980 A1* | 9/2003 | Keiser | G06Q 40/00 |
| | | | 705/7.11 |
| 2003/0208432 A1* | 11/2003 | Wallman | G06Q 40/12 |
| | | | 705/36 R |
| 2003/0220830 A1 | 11/2003 | Myr | |
| 2004/0128219 A1* | 7/2004 | Hilton | G06Q 40/06 |
| | | | 705/36 R |
| 2004/0254872 A1 | 12/2004 | Grzebeta | |
| 2005/0004852 A1 | 1/2005 | Whitney | |
| 2005/0119900 A1* | 6/2005 | Eder | G06Q 10/0635 |
| | | | 705/7.28 |
| 2006/0041490 A1* | 2/2006 | Roberts | G06Q 40/06 |
| | | | 705/35 |
| 2006/0095283 A1 | 5/2006 | Matsumoto | |
| 2006/0229959 A1 | 10/2006 | Heidingsfield | |
| 2007/0100748 A1* | 5/2007 | Dheer | G06Q 20/40 |
| | | | 705/39 |
| 2007/0136165 A1 | 6/2007 | Cha | |
| 2007/0156543 A1 | 7/2007 | Klim | |
| 2007/0198331 A1 | 8/2007 | Hurley | |
| 2007/0219895 A1* | 9/2007 | Cooper | G06Q 40/06 |
| | | | 705/36 R |
| 2007/0265950 A1 | 11/2007 | Reuss | |
| 2007/0288333 A1 | 12/2007 | Blasnik | |
| 2008/0071667 A1 | 3/2008 | Himmelstien | |
| 2008/0162211 A1* | 7/2008 | Addington | G06Q 40/04 |
| | | | 705/14.5 |
| 2009/0024540 A1* | 1/2009 | Ryder | G06Q 40/00 |
| | | | 705/36 R |
| 2009/0150279 A1 | 6/2009 | Hadar | |
| 2009/0157541 A1 | 6/2009 | Sutton | |
| 2009/0262657 A1 | 10/2009 | Ekelin | |
| 2010/0185559 A1 | 7/2010 | May | |
| 2010/0217725 A1* | 8/2010 | Clyne | G06Q 40/04 |
| | | | 705/37 |
| 2011/0066544 A1* | 3/2011 | Hughes | G06Q 40/04 |
| | | | 705/37 |
| 2011/0087917 A1 | 4/2011 | He | |
| 2011/0161220 A1 | 6/2011 | Cole | |
| 2011/0161964 A1 | 6/2011 | Piazza | |
| 2011/0258108 A1 | 10/2011 | Brown | |
| 2012/0016718 A1* | 1/2012 | Kahn | G06Q 10/02 |
| | | | 705/7.31 |
| 2012/0072583 A1 | 3/2012 | Kupferman | |
| 2012/0084322 A1 | 4/2012 | Goldstein | |
| 2012/0123813 A1* | 5/2012 | Sunshine | G06Q 30/0283 |
| | | | 705/5 |
| 2012/0166250 A1 | 6/2012 | Ferrante | |
| 2012/0191716 A1 | 7/2012 | Omoigui | |
| 2012/0259759 A1 | 10/2012 | Crist | |
| 2012/0317105 A1 | 12/2012 | Bai | |
| 2013/0046654 A1* | 2/2013 | Killoran | G06Q 30/0621 |
| | | | 705/26.8 |
| 2015/0095253 A1* | 4/2015 | Lim | G06Q 10/00 |
| | | | 705/327 |

* cited by examiner data filter 154

| sequence (ordering) 214 | operation ID 216 | trigger indicator(s) 218 | de-trigger indicator(s) 220 | eval data indcatrs 224 | | execute indicator(s) 226 | pause indicator(s) 228 | operational data indicators 230 | | | current op status 232 | execution module selection 234 |
|---|---|---|---|---|---|---|---|---|---|---|---|---|
| | | | | eval data ID 236 | eval data factor(s) 238 | | | op data ID 240 | data allotment 242 | data operand(s) 244 | | |
| 0 (1, x) | A | | | | | | | | | | | |
| 0 (1, x) | B | | | | | | | | | | | |
| 1 (2, 3) | C | | | | | | | | | | | |
| 1 (2, 3) | D | | | | | | | | | | | |
| 2 (4, 6) | E | | | | | | | | | | | |
| 2 (4, 6) | F | | | | | | | | | | | |
| 2 (4, 6) | G | | | | | | | | | | | |
| 3 (4, 5) | H | | | | | | | | | | | |
| 4 (5, 1) | I | | | | | | | | | | | |

⋯

| x | Z |
|---|---|
| | | operation set limit table 212

FIG. 9

| sequence (ordering) 214 | operation ID 216 | trigger indicator(s) 218 | de-trigger indicator(s) 220 | eval data indictrs 222 | | execute indicator(s) 224 | pause indicator(s) 226 | operational data indicators 228 | | | current op status 230 | execution module selection 232 |
|---|---|---|---|---|---|---|---|---|---|---|---|---|
| | | | | eval data ID 234 | eval data factor(s) 236 | | | op data ID 238 | data allotment 240 | data operand(s) 242 | | |
| 0 | A | turn op on signal | turn op off signal | n/a | n/a | upon activation | upon execution | n/a | n/a | n/a | executed | A-1 |
| 1 | B | dm >= f1(m) | dm < f1(m) - f2(m) | dm | dm source, time frame | dm >= f1(m) + 3 | dm < f2(m) | Dc | 10% | x value | hold | B-1 |
| 1 | C | dn >= k | dn < k - 2 | dn | dn source, time frame | dn >= k + 2 | dn < k | Dc | 10% | x value | triggered | C-1 |
| 2 | D | | | | | | | | | | | |
| 2 | E | | | | | | | | | | | |
| 2 | F | | | | | | | | | | | |
| 3 | G | | | | | | | | | | | |
| 3 | H | | | | | | | | | | | |
| 3 | K | | | | | | | | | | | |
| 3 | L | | | | | | | | | | | |
| 4 | M | | | | | | | | | | | |
| ... | | | | | | | | | | | | |
| 5 | P | | | | | | | | | | | | operation set limit table 212

FIG. 34

| sequence 556 | sub-op ID(s) 558 | general sub-op description 560 | indicators 562 |
|---|---|---|---|
| 0 | A | turn operation on | detect turn on signal |
| 1 | B C | open a position | eval data analysis is favorable |
| 2 | D | extend position type 1 | extend asset development per type 1 indicators |
| 2 | E F | extend position type 2 | extend asset development per type 2 indicators |
| 3 | G H | reduce position type 1 | reduce asset development per type 1 indicators |
| 3 | K L | reduce position type 2 | reduce asset development per type 2 indicators |
| 4 | M N O | close position | eval data analysis is unfavorable |
| 5 | P | turn operation off | detect turn off signal |

FIG. 35

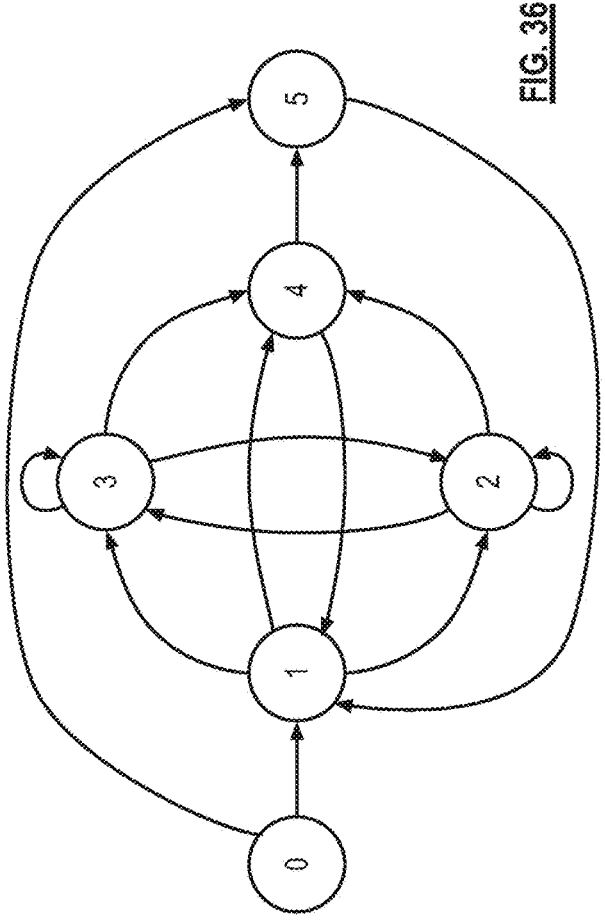

FIG. 36

| Sequence | Type | *Indicator Settings | Notes | Limit Type Inherent Trigger | Activation Trigger (distance from base level) | Execution Trigger (distance from activation) |
|---|---|---|---|---|---|---|
| 1 | Trading System Signal | | Trigger an "Open Initial" based on input signal from a Trading System | | | |
| 1 | Moving Average | 200,0,Simple,Median | Trigger an Open Initial Sequence x distance from Moving Average/Price Cross | | 10 | 0 |
| 1 | Money Flow | 14 | Direction can be determined by the level of the cross. | | 0 | 0 |
| 2 | Open Initial | | Trigger and execute at the same level when the Activation trigger and Execution trigger are both 0 | | 0 | 0 |
| 3 | Open Remaining | | | | 20 | 0 |
| 4 | Open Limit | | | | -30 | 20 |
| 5 | Open Limit 2 Tops | Candle Time | 2 Candles Higher Highs or Lower Lows | | 10 | 0 |
| 6 | Close Limit | | | | 20 | 5 |
| 7 | Close Destination Stop | | Sum ( act level + execution level) then hold until executed on retrace # | | 10 | 20 |
| 8 | Close Signal | | | | | |
| 9 | Stop Loss | | | | 50 | |
| 10 | Close All | | | | 50 | |
| 11 | Close Limit 3 Tops | | 3 Candles Higher Highs or Lower Lows | | | |
| 12 | Close Limit Floor | | Activation trigger is a "profit level", once that level is reached then the floor is set at that level less execution trigger value | | 40 | 20 |
| 13 | MACD | 12,26,9,close price | Close All Positions if MACD crosses Price opposite direction of positions | | | 0 |

FIG. 41

| Sequence | Type | Action | | Trigger Reference | Status | Additional Actions |
|---|---|---|---|---|---|---|
| | | Action | % Trade Allotment | | | |
| 1 | Trading System Signal | Trigger Open Initial | | Base Level | Executed | |
| 1 | Moving Average | Trigger Open Initial | | Current price | Waiting | |
| 1 | Money Flow | | | Current price crosses Money Flow at 20 or 80 | Terminated | |
| 2 | Open Initial | Open First Position | 10% | | Executed | -Terminate any other Open Limits - Activate Close Destination Stop based on All in |
| 3 | Open Remaining | Open Additional Position for remaining trade allotment | Remaining % | Initial Trade | Waiting | |
| 4 | Open Limit | Open Additional positions | 20% | Initial Trade | Holding | |
| 5 | Open Limit 2 Tops | Open Additional position | 25% | Average Position Price | Terminated | Can be Reactivated |
| 6 | Close Limit | Close partial position | 20% | Average Position Price | Triggered | |
| 7 | Close Destination Stop | Close all Positions | 100% | Average Position Price | Waiting | Reset Sequence Table to unarmed |
| 8 | Close Signal | | | | | |
| 9 | Stop Loss | Close all Positions at loss | 100% | Initial Trade | Waiting | Reset Sequence Table to unarmed |
| 10 | Close All | Close all Positions at profit level | 100% | Initial Trade | | |
| 11 | Close Limit 3 Tops | | | | Waiting | |
| 12 | Close Limit Floor | Close partial positions | 50% | Average Position Price | | |
| 13 | MACD | Close all Positions | | Opposite Signal | Terminated | Reset Sequence Table to unarmed |

FIG. 42

| operation ID 214 | trigger indicator(s) 218 | de-trigger indicator(s) 220 | eval data indictrs 222 | | execute indicator(s) 224 | pause indicator(s) 226 | operational data indicators 228 | | | current op state 230 | execution module selection 232 |
|---|---|---|---|---|---|---|---|---|---|---|---|
| | | | eval data ID 234 | eval data factor(s) 236 | | | op data ID 238 | data allotment 240 | data operand(s) 242 | | |
| A | | | | | | | | | | | |
| B | | | | | | | | | | | |
| C | | | | | | | | | | | |
| D | | | | | | | | | | | |
| E | | | | | | | | | | | |
| F | | | | | | | | | | | |
| G | | | | | | | | | | | |
| H | | | | | | | | | | | |
| ... | | | | | | | | | | | |
| Z | | | | | | | | | | | | operation set limit table 212

FIG. 53

| eval data ID 592 | characteristic 594 | recognition filter parameter(s) 596 | frequency 598 | frequency deviation 600 | factor(s) 602 | subsequent characteristic 604 | probability of sub. charac. 606 |
|---|---|---|---|---|---|---|---|
| eval data 1 | pattern α | pattern parameter set α1 | ave. 3 times per day for last month | daily standard deviation = 0.65 | preceding char. NOT = pattern β | trend B within a given period | 67% |
| eval data 1 | pattern α | pattern parameter set α2 | ave. 3 times per day for last month | daily standard deviation = 0.65 | preceding char. = pattern β | trend A nearly immediate | 80% |
| eval data 2 | pattern ψ | pattern parameter set ψ1 | ave. 7 times per day for last two weeks | daily standard deviation = 3.5 | current eval data value > M | pattern ψ pattern λ | 40% 30% |
| eval data 2 | trend A | trend parameter set A1 | once per day for last 5 weeks | daily standard deviation = 0.15 | none | max value within x hrs | 72% |
| eval data 2 | 3 month min value of eval data | min threshold | n/a | n/a | none | trend C within 2 days | 84% |

• • •

| eval data 4, 5, 6 | function 1 | function 1 parameter set | 2 times per day for last 8 weeks | daily standard deviation = 0.35 | none | pattern Ω within K minutes | 35% |
|---|---|---|---|---|---|---|---| historical eval data 590

FIG. 55

SYSTEM AND METHOD FOR MODIFYING VARIOUS TYPES OF ASSETS

CROSS REFERENCE TO RELATED PATENTS

This application claims priority pursuant to 35 U.S.C. § 120 as a continuation of U.S. Utility application Ser. No. 13/868,599, entitled "ASSET MODIFICATION COMMUNICATION SYSTEM AND COMPONENTS THEREOF," filed Apr. 23, 2013, issuing as U.S. Pat. No. 10,510,116 on Dec. 17, 2019, which claims priority pursuant to 35 USC § 119(e) to a provisionally filed patent application entitled "ASSET MODIFICATION COMMUNICATION SYSTEM AND COMPONENTS THEREOF," filed May 2, 2012 as U.S. Provisional Application No. 61/641,723, all of which are incorporated by reference herein.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

Technical Field of the Invention

This invention relates generally to communication systems and more particularly to asset evaluation and modification within the communication system.

Description of Related Art

Communication systems are known to allow data to be from one or more devices within a communication system to one or more other devices. The data may be raw data (e.g., created by a first communication device and communicated through the communication system unaltered), encrypted data, compressed data, processed data (e.g., data created by a first communication device is processed (e.g., manipulated, calculated, operand of a calculation, encoded, encrypted, compiled, etc.) by another device within the communication system as the data is communicated through the communication system), etc. The data may be video data, audio data, text data, graphics data, image data, and/or a combination thereof.

Almost every business, if not every business, uses data and communicates data with its customers, suppliers, employees, contractors, etc. The data may be advertisements to customers, purchase orders to suppliers, invoices to customers, accounting information, business evaluation information, inventory monitoring information, day trading information, market analysis information, etc. Depending on the type of business, a business may utilize large and expensive computer enterprise systems to manage its data. For a small business or for an individual, it may use one or more personal computers and one or more software applications to manage its data. Whether an individual, a small business, or a large business, managing data is an ever increasing challenge as the amount and communication of digital data is increasing rapidly.

BRIEF DESCRIPTION OF THE SEVERAL VIEWS OF THE DRAWING(S)

FIG. 9 is a diagram of an example of an operation set limit table in accordance with the present invention;

FIG. 34 is a diagram of another example of an operation set limit table in accordance with the present invention;

FIG. 35 is a diagram of another example of a generalized operation set limit table in accordance with the present invention;

FIG. 36 is a diagram of an example of operation sequencing based on an operation set limit table in accordance with the present invention;

FIGS. 41-42 are a diagram of another example of an operation set limit table in accordance with the present invention;

FIG. 53 is a diagram of another example of an operation set limit table in accordance with the present invention;

FIG. 55 is a diagram of an example of historical evaluation data for building an operation set limit table in accordance with the present invention;

DETAILED DESCRIPTION OF THE INVENTION

Figure 1:
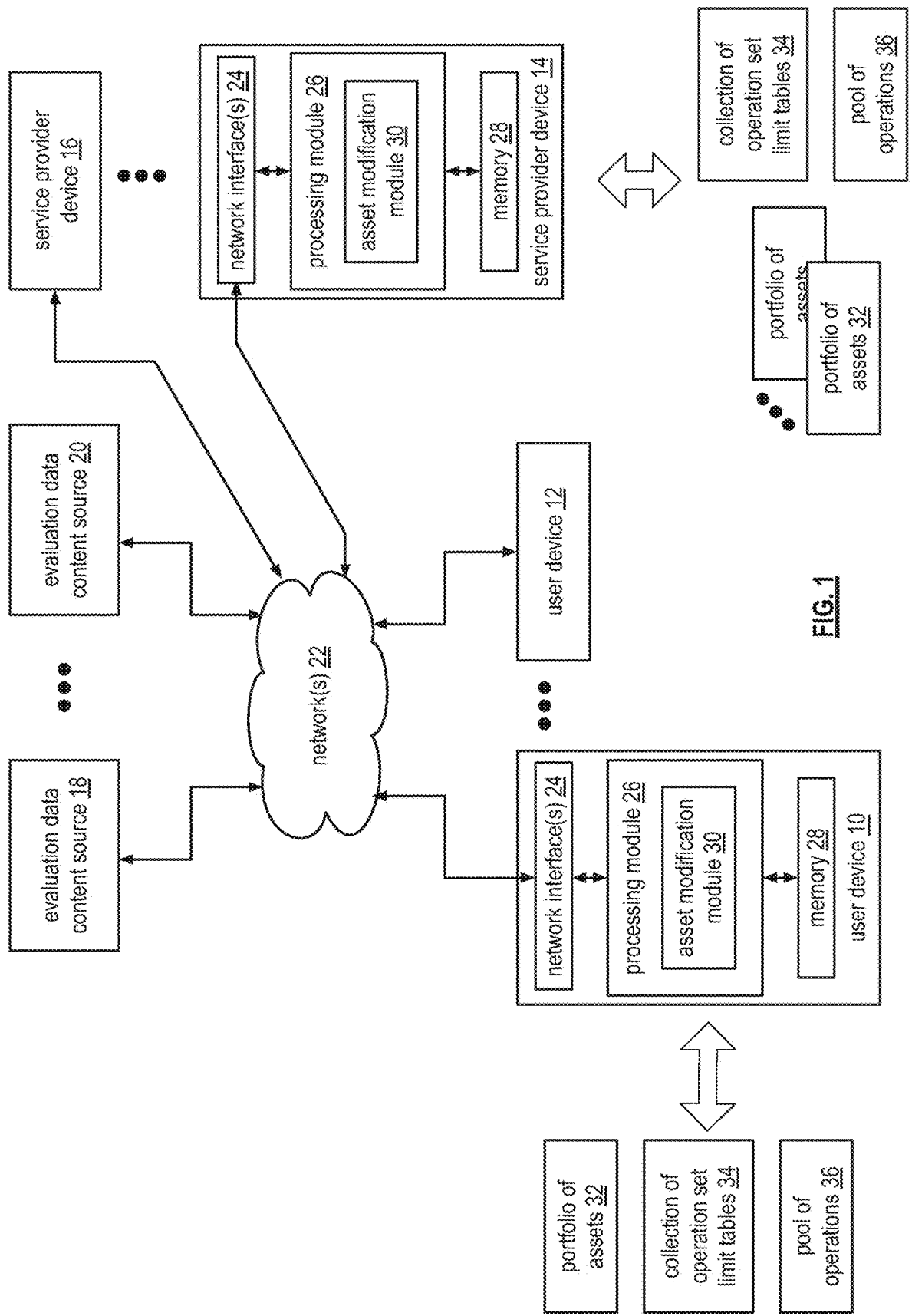
FIG. 1 is a schematic block diagram of an embodiment of a data communication system in accordance with the present invention.

FIG. 1 is a schematic block diagram of an embodiment of a data communication system that includes a plurality of user devices 10-12, a plurality of service provider devices 14-16, a plurality of evaluation content sources 18-20, and one or more networks 22 (e.g., one or more local area networks (LAN), one or more wireless LANs (WLAN), one or more wide area networks (WAN), the Internet, etc.). Each of the user devices 10-12 includes one or more network interfaces 24 (e.g., LAN, WLAN, WAN, Internet, etc.), one or more processing modules 26, and memory 28. Each of the service provider devices 14-16 includes one or more network interfaces 24, one or more processing modules 26, and memory 28. The one or more processing modules 26 of the user devices 10-12 and/or the service provider devices 14-16 implement one or more asset modification modules 30.

In an example of operation, a user device 10-12 has a portfolio of assets 32, a collection of operation set limit tables 34, and a pool of operations 36. The assets 32 may be tangible property (e.g., real estate, inventory, energy (e.g., gas, electric, etc.), financial capital (e.g., money, stock, bonds, precious metals, etc.), etc.), intangible assets (e.g., patents, copyrights, trademarks, good will, trade secrets, etc.), intelligence information (e.g., personal data, person of interest data, weather data, sports data, traffic data, competitor information, etc.), a rented asset, and/or a disposable asset (e.g., tickets). Each limit table 34 includes entries, where an entry includes identity of one or more evaluation data to monitor, trigger indicators, de-trigger indicators, activation indicators, de-activations indicators, identity of one or more operations of the pool of operations 36, operational data indicators, status information, etc. The pool of operations 36 includes operations regarding modification of an asset, where modification includes increase amount of an asset, decrease amount of an asset, dispose of some or all of an asset, use some or all of the asset, transfer some or all of the asset, assign some or all of the asset, adjust sales prices of an asset, adjust anticipated purchase price of an asset, adjust purchasing procedures of an asset, buy more of an asset, sell some or all of an asset, etc. Other operations of the pool of operations 36 include compiling evaluation data, evaluating evaluation data, trend recognition, pattern recognition, data extrapolation, etc.

For a specific asset, the asset modification module 30 uses an operation set limit table to manage the modification of the asset. The operation set limit table may be the only one for this asset or may be selected from a plurality of operation set limit tables 34 for this asset. The selection of an operation set limit table may be automatic based on user preferences (e.g., a conservative approach, an aggressive approach, modification thresholds for the asset (e.g., lower limit on how the asset might decrease), evaluation data of preference, how the asset is modifying during a given period of time, etc.) or selected via a user input.

As a specific example, assume that the asset is a stock. In this specific example, the limit table includes entries on when to buy more of the stock and how much to buy based on various conditions, trends, patterns, limits, and/or other factors of the evaluation data (e.g., line price data, candlestick data, average position price, simple moving average, exponential moving average, Bollinger bands, money flow, MACD, parabolic SAR, rate of change, relative strength, slow Stochastic, fast Stochastic, volume, volume+moving average, William % R, etc.). The limit table also includes entries on when to sell some or all of the stock based on various conditions, trends, patterns, limits, and/or other factors of the evaluation data. The limit table further includes entries on when to "open" the stock for modification and when to "close" the stock modification.

As another specific example, assume that the asset is a component of a production product. In this specific example, the selected limit table generally includes entries to manage maintaining inventory of the component at a desired level (e.g., just-in-time, having a surplus, etc.) for manufacturing the product based on various conditions, trends, patterns, limits, and/or other factors of the evaluation data (e.g., component pricing, component availability, political issues effecting availability of the component, sub-component material pricing, sub-component material availability, shipping, import/export factors, assembly requirements, labor issues, weather, supply-demand information, market information for the product, etc.). For instance, the limit table may include an entry to determine when to buy the component, an entry to determine the per purchase quantity of the component, an entry to determine the purchase price of the component, an entry to select one or more vendors, an entry to determine a desired inventory level, etc.

As another specific example, assume that the asset is season tickets to a sporting event. In this specific example, the selected limit table generally includes entries to manage, on a per event basis, the sale of tickets, use of the tickets, donation of the tickets, and/or transfer of the tickets to family or friends based on various conditions, trends, patterns, limits, and/or other factors of the evaluation data (e.g., season ticket holder's schedule, weather, opponent's fan following, current success of home team, standings, time of season, playoff scenarios, season ticket holder's desired level of attendance, other ticket sales quantity for an event, other ticket sales pricing for the event, etc.). For instance, the limit table may include an entry to set the sales price above face value, an entry to set the sales price below face value, an entry to determine which events to sell the tickets, an entry to determine which events to use the tickets, etc.

As another specific example, assume that the asset is intelligence data regarding a particular person. In this specific example, the selected limit table generally includes entries to manage data regarding an individual based on various conditions, trends, patterns, limits, and/or other factors of the evaluation data (e.g., person's financial information, person's press clippings, person's family information, person's education information, person's employment information, number of inventions, number of published papers, purchase history, etc.). For instance, the limit table may include an entry to determine the person's shopping preferences, an entry to determine the person's likes, an entry to determine the person's dislikes, an entry to determine the person's profession success, an entry to determine the person's potential for employment viability, etc.

In another example of operation, a service provider device 14-16 functions similarly to a user device 10-12, but does so on behalf of clients. As such, for each client, the service provider devices 14-16 functions to manage the client's assets in similar manner as the user device 10-12. In this regard, for each client, the service provider device 14-16 stores a portfolio of assets 32, a collection of operation set limit tables 34, and a pool of operations 36.

Figure 1A:
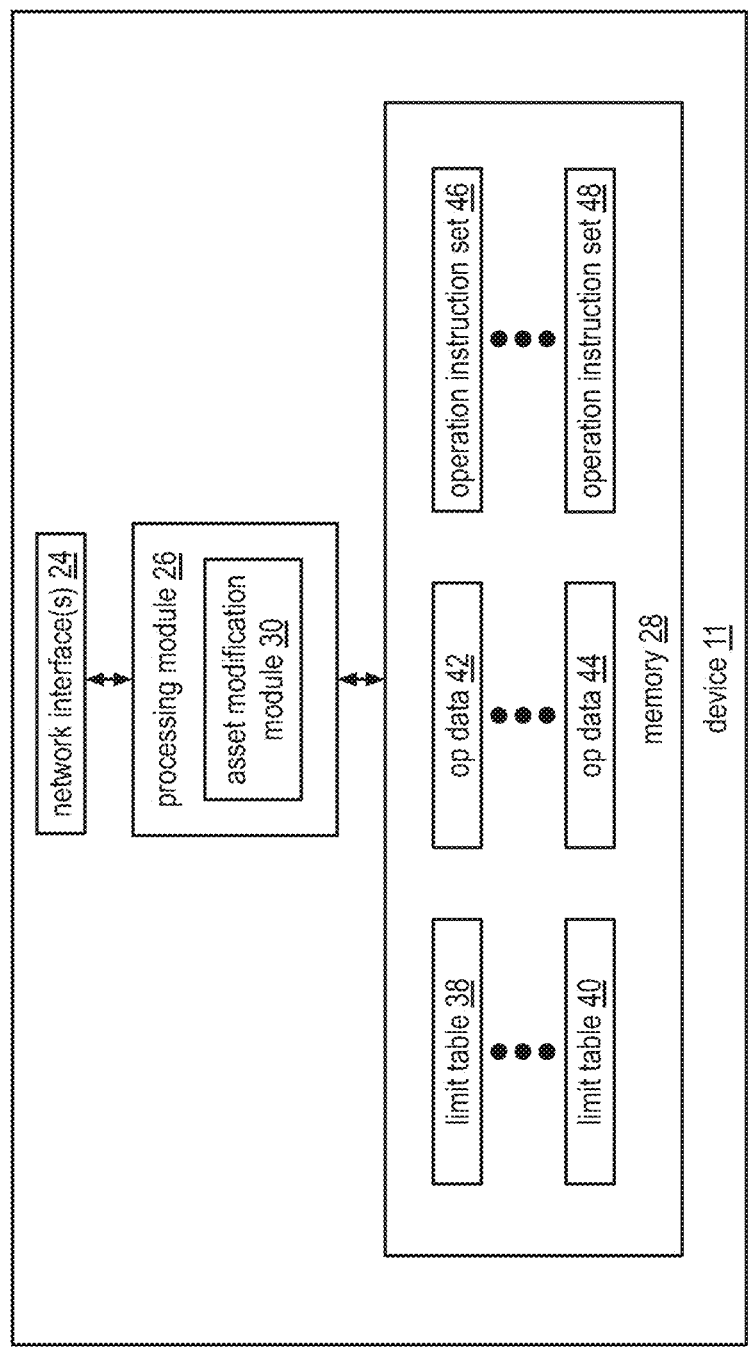
FIG. 1A is a schematic block diagram of an embodiment of a user and/or service provider device in accordance with the present invention.

FIG. 1A is a schematic block diagram of an embodiment of a device 11 (e.g., user device 10 and/or service provider device 14) that includes one or more network interfaces 24, one or more processing modules 26, and memory 28. The processing module(s) 26 implement one or more asset modification modules 30. The memory 28 stores a plurality of limit tables 38-40, operational data 42-44 regarding assets (e.g., tangible assets, intangible assets, financial capital, intelligence information, rented assets, disposable assets, etc.), and operation instruction sets 46-48.

In an example of operation, the processing module 26 selects an asset to modify from a portfolio of assets. The processing module 26 identifies which of the plurality of limit tables 38-40 correspond to the selected asset and selects one or more of the limit tables. The processing module interprets the appropriate limit table, or tables, to identify time-varying and time-sensitive data regarding the asset and one or more corresponding operation sets. The processing module receives the time-varying and time-sensitive data from a local area network or a wide area network through the network interface 24. The time-varying and time-sensitive data is data from one or more sources (e.g., subscription based data providers, free data providers, vendors, suppliers, weather, government, etc.) that varies over time and, for the purposes of a current asset modification, is only useful for a given period of time (e.g., minutes, days, weeks, months, years).

The processing module evaluates the time-varying and time-sensitive data based on evaluation criteria contained in the one or more limit tables 38-40. When the evaluation is favorable, the one or more operation instruction sets 46-48 are triggered (e.g., one or more operations is selected, is retrieved from memory, is loaded into the processing module, is readied for execution, etc.). With an operation triggered, the processing module further evaluates the time-varying and time-sensitive data based on correlated evaluation criteria of the limit tables 38-40 to determine whether to activate the operation instruction sets 46-48. When activated, the processing module executes the operation on the operational data 42-44 to modify the asset.

Figure 1B:
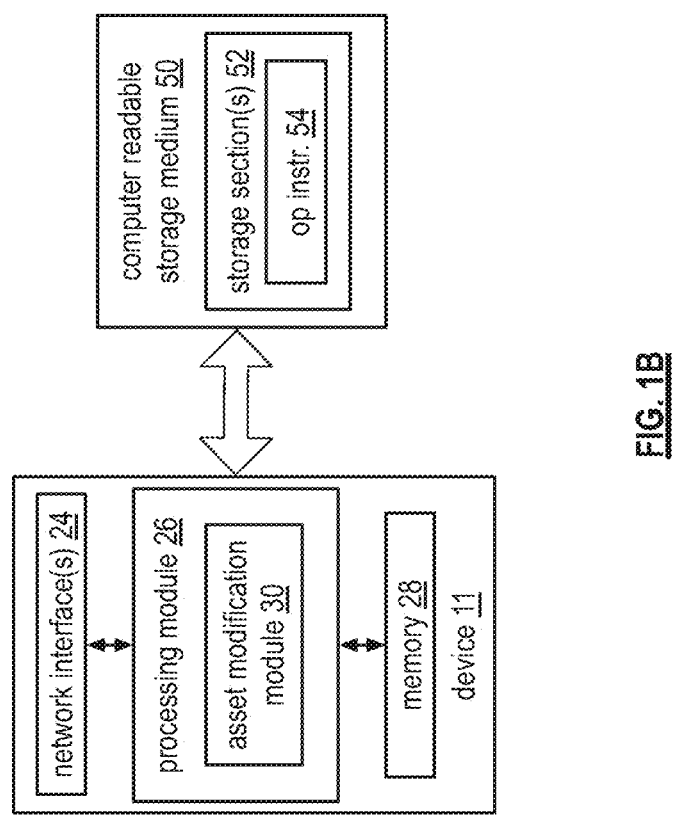
FIG. 1B is a schematic block diagram of an embodiment a computer readable storage medium in accordance with the present invention.

FIG. 1B is a schematic block diagram of an embodiment of a computer readable storage medium 50 coupled to device 11 (e.g., the user device 10 and/or the service provider device 14). The computer readable storage medium includes a plurality of storage sections 52 that store data and/or operational instructions. A storage section 52 includes one or more byte-addressable, word-addressable, multiple word-addressable, or other sized-addressable lines such that the storage section is capable of storing bytes to Giga-bytes of data and/or operational instructions. The computer readable storage medium 50 may be one or more memory devices, where a memory device is a disk, a memory of a download source, a flash memory, a USB drive, an external hard drive, a memory of a computer, etc.

In an example of operation, the computer readable storage medium 50, or a portion thereof, contains five storage sections 52; each of which storing operational instructions that, when executed by the processing module 26, causes the processing module to perform one or more functions, tasks, sub-routines, algorithms, etc. A first storage section stores operational instructions 54 that cause the processing module 26 to obtain one or more limit tables regarding an asset. A second storage section stores operational instructions 54 that cause the processing module 26 to identify time-varying and time-sensitive data from the one or more limit tables. A third storage section stores operational instructions 54 that cause the processing module 26 to analyze the time-varying and time-sensitive data based on evaluation criteria from the one or more limit tables. A fourth storage section 52 stores operational instructions 54 that, when the analyzing the time-varying and time-sensitive data is favorable, causes the processing module 26 to trigger one or more operations of a set of operations corresponding to a particular criteria.

With one or more operations triggered, a fifth storage section 54 stores operational instructions 54 that causes the processing module 26 to further analyze the time-varying and time-sensitive data based on correlated evaluation criteria of the evaluation criteria. When the further analyzing the time-varying and time-sensitive data in view of the correlated particular criteria is favorable, the processing module 26 activates the one or more operations to execute a corresponding function on operational data corresponding to the asset such that the asset is modified.

Figure 2:
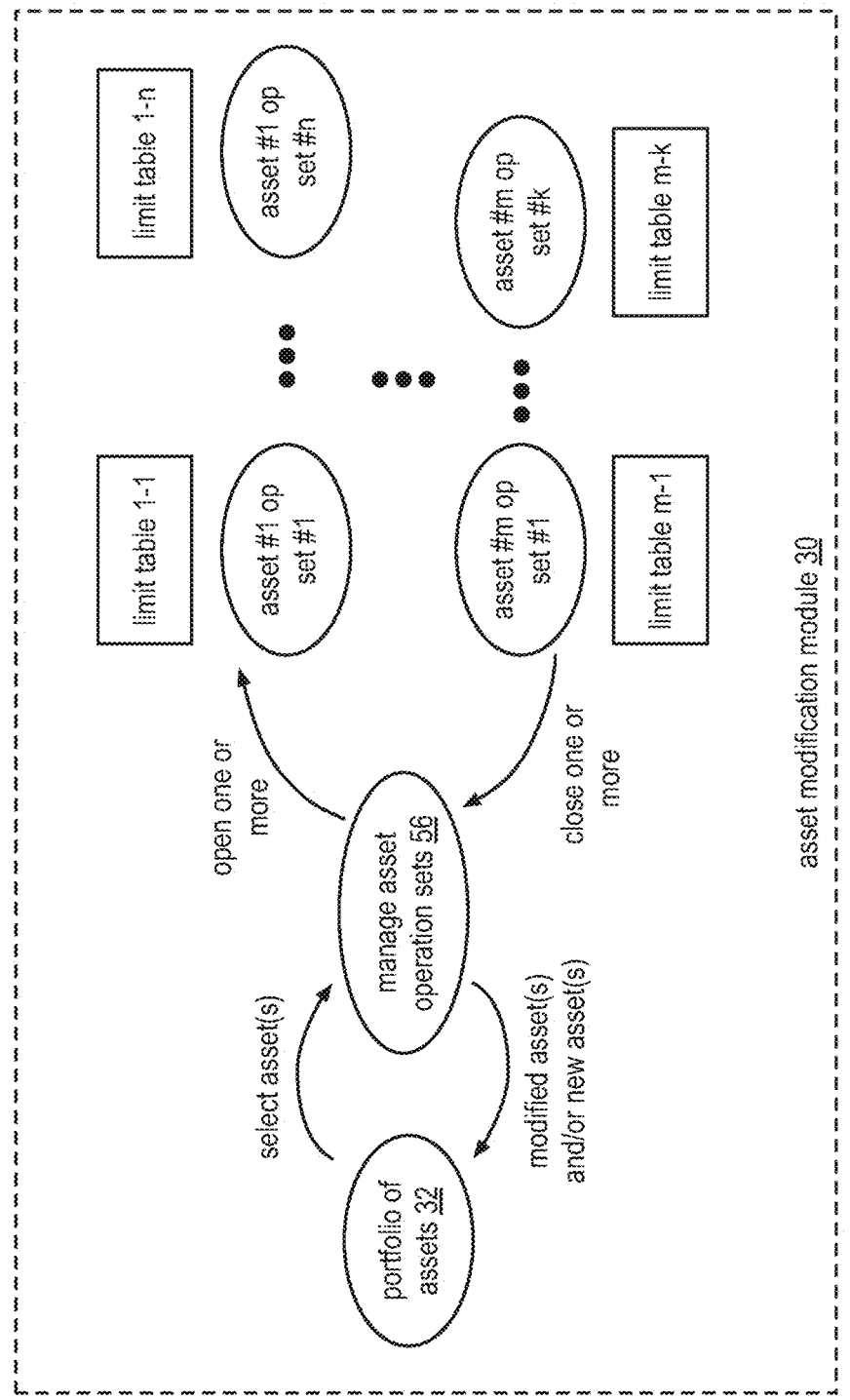
FIG. 2 is a schematic block diagram of an embodiment of an asset modification module in accordance with the present invention.

FIG. 2 is a schematic block diagram of a functional embodiment of an asset modification module 30. The asset modification module 30 manages a portfolio of assets 32 using operation sets 56. For instance, for a particular asset (e.g., tangible property, financial capital, intangible assets, intelligence information, a rented asset, and/or a disposable asset), the asset modification module 30 selects a limit table from one or more limit tables for the asset. The limit table identifies an operation set 56 (e.g., a set of operations used to modify the asset in accordance with limits, conditions, parameters, etc., listed in the limit table. Note that one or more operations for modifying an asset may be in one or more operation sets 56.

As a specific example, assume that asset #1 is the selected asset and asset #1 operation (op) set #1 is identified via selection of the corresponding limit table 1-1. A first operation of the set of operations may be to "open" asset #1 for modification. This may be done at the selection of limit table 1-1 or it may be an operation within the limit table based on a condition of one or more evaluation data. Once the asset is open, an operation is evoked based on an entry of the limit table based on conditions of one or more evaluation data. For example, an entry may evoke an operation to buy a particular quantity of asset #1 (e.g., component of a manufactured product) at a best current price when a particular inventory level is reach. Another entry may evoke an operation to buy a particular quantity of the asset when a particular price is reached. Another entry may evoke an operation to determine when to buy a particular quantity when the evaluation data indicates that the supply of the asset may drop and the price may go up. Another entry may evoke an operation to track use of the asset and/or potential future use of the asset. Another entry may evoke an operation to close the asset when a certain level of inventory is reached. These are but a few examples of operations that may be evoked by entries in a limit table to manage the inventory of a component or of any other limit table.

When the asset is closed, the asset modification module returns it to the portfolio of assets (i.e., is no longer actively in a modification mode of the asset). The asset modification module 30 may modify one asset at a time or a plurality of assets concurrently. If the asset modification module 30 is modifying multiple assets, each asset is treated separately with respect to selection of a limit table and the corresponding operations as well as execution of the corresponding operations based on the limit table.

Figure 3:
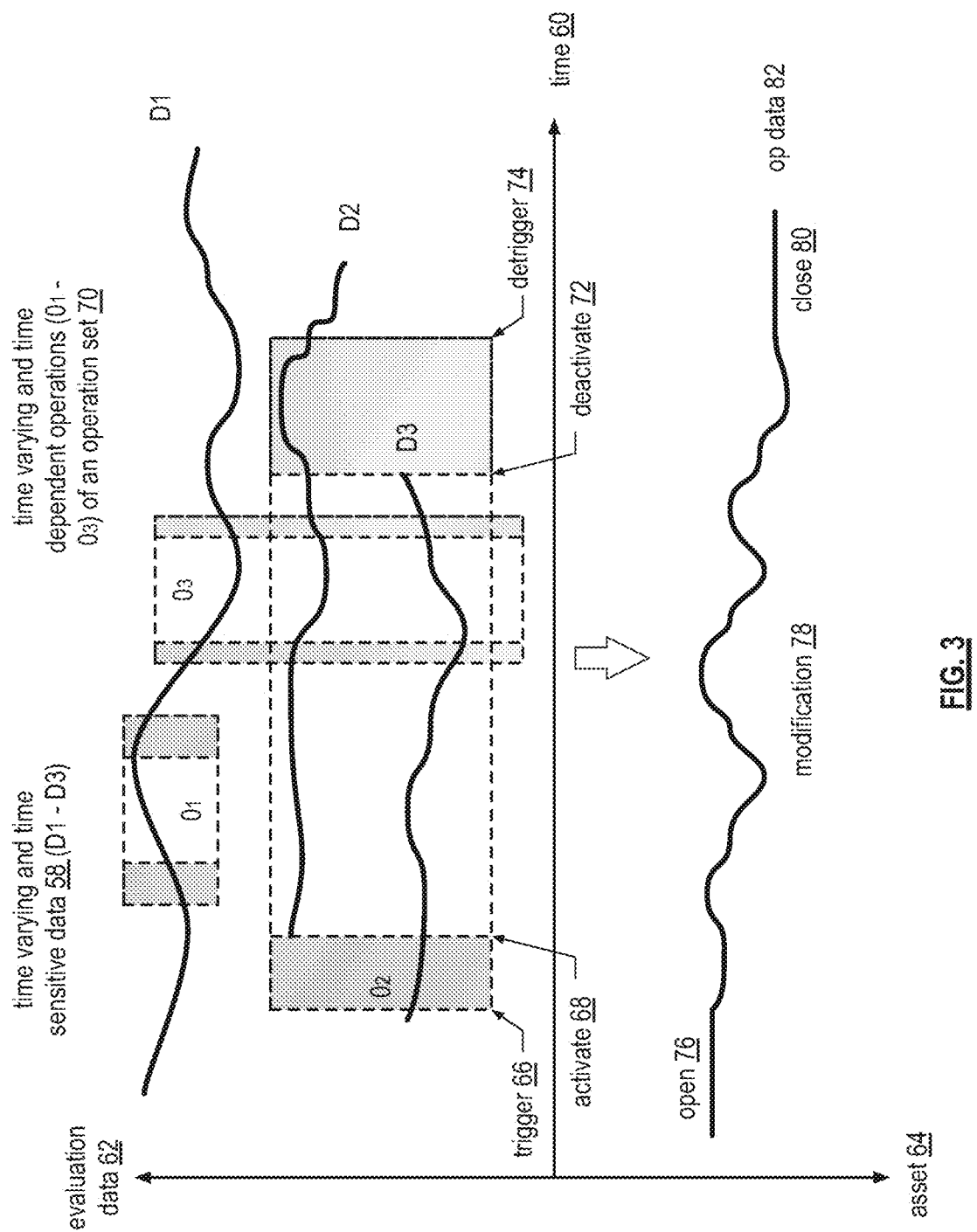
FIG. 3 is a diagram of an example of modifying an asset based on evaluation data in accordance with the present invention.

FIG. 3 is a diagram of an example of modifying an asset based on evaluation data 58 (D1, D2, and D3). Each of the evaluation data 58 is time varying and time sensitive, wherein the duration of variation may vary by the second, by the minute, by the hour, by the day, by the week, by the month, and/or by the year. For example, an evaluation data 58 may be a stock price, which varies at fractions of a second. As another example, an evaluation data 58 may be weather conditions, which varies by the minute, by the hour, by the day, by the week, by the month, and by the year, where its variation rate of interest depends how the weather data is being evaluated. For instance, if the weather data is being used as factor in determining the long-term availability of a resource (e.g., natural, element, component, etc.), then the variation rate may be months and/or years. Alternatively, if the weather data is being used as a factor in determining whether to sell tickets for tonight's baseball game, then the variation rate may be minutes and/or hours.

Other examples of evaluation data 58 are almost endless and correspond to data of interest regarding a particular asset.

In the diagram, the horizontal axis represents time 60 (which may be measured in seconds, minutes, hours, days, weeks, months, and/or years), the positive vertical axis represents evaluation data variations 62, and the negative vertical axis represents operation data of the asset 64. Operation data of the asset 64 may include quantity, price, data operands (e.g., opening price, baseline values, opening quantities, consumption quantities, etc.), data allotment (e.g., a percentage of the current asset to expose to modification), asset information, etc.

In an example of operation, once the asset is open 76 for modification 78, the evaluation data 58 is monitored to detect a triggering condition 66 (e.g., price increase to a certain level, price decrease to a certain level, supply-demand information at a certain level, combination of evaluation data trend and/or pattern detection, etc.). When a triggering condition 66 is met, the asset modification module then determines whether an activate condition 68 is met, which may be at the same threshold as the triggering condition 66 or at a different threshold. When the activation condition 68 is met, the corresponding operation 70 is activated until a deactivation condition 72 is met or the modification 78 of the asset is closed 80.

In this example, operation 2 (O2) is triggered by the opening of the asset and is activated when evaluation data D2 and D3 become available. With operation 2 active, evaluation data D3 is monitored for a particular condition to cause operation 2 to execute (e.g., buy when price is below $x.00). Alternatively, operation 2 may be continually executed based on evaluation data D3 (e.g., compare D3 with stored data to determine a variance). As operation 2 is executed, the operation data of the asset 64 is modified. Operation 2 is deactivated when evaluation data D3 is no longer available and is de-triggered 74 when the modification 78 of the asset is closed 80.

As is further included in this example, when evaluation data D1 begins to rise, operation 1 is triggered 66 and remains in the triggered state (e.g., grey shaded area) until it rises further. At this point, operation 1 is activated 68 and is executed when a particular condition of evaluation data D1 is met or is continually executed using evaluation data D1. Operation 3 is triggered 66, activated 68, deactivated 72, and de-triggered 74 based on factors, trends, and/or patterns of D1-D3.

Figure 3A:
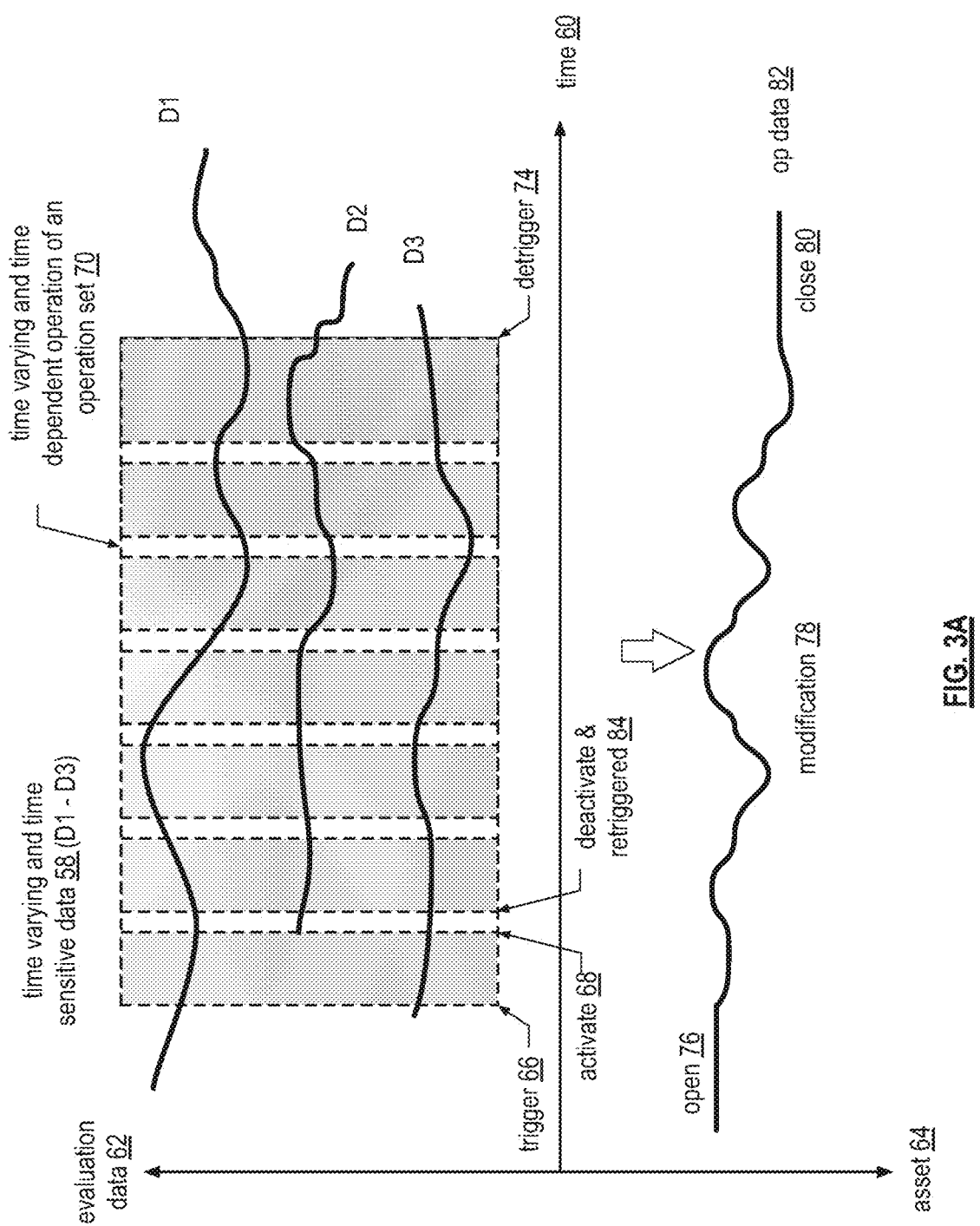
FIG. 3A is a diagram of an example of modifying an asset based on evaluation data in accordance with the present invention.

FIG. 3A is a diagram of another example of modifying an asset based on evaluation data 58 (D1, D2, and D3). Each of the evaluation data 58 is time varying and time sensitive. In the diagram, the horizontal axis represents time 60 (which may be measured in seconds, minutes, hours, days, weeks, months, and/or years), the positive vertical axis represents evaluation data variations 62, and the negative vertical axis represents operation data of the asset 64.

In an example of operation, once the asset is open 76 for modification 78, the evaluation data 58 is monitored to detect a triggering condition 66. When a triggering condition 66 is met, the asset modification module then determines whether an activate condition 68 is met, which may be at the same threshold as the triggering condition 66 or at a different threshold. When the activation condition 68 is met, the corresponding operation 70 is activated and executed. Once executed, the operation 70 is deactivated 72 and placed in the triggered state again. When the activation condition 68 is again met, the operation 70 is activated and executed; once executed it is again deactivated 72 and placed in the triggered state. This cycle of activate, execute, and re-trigger continues until a de-trigger condition 74 is met. For example, if the asset is a stock and the evaluation data 58 continues to show favorable conditions for purchasing additional shares of the stock, then the operation of purchasing shares will be repeated each time the activation condition 68 is met.

Figure 4:
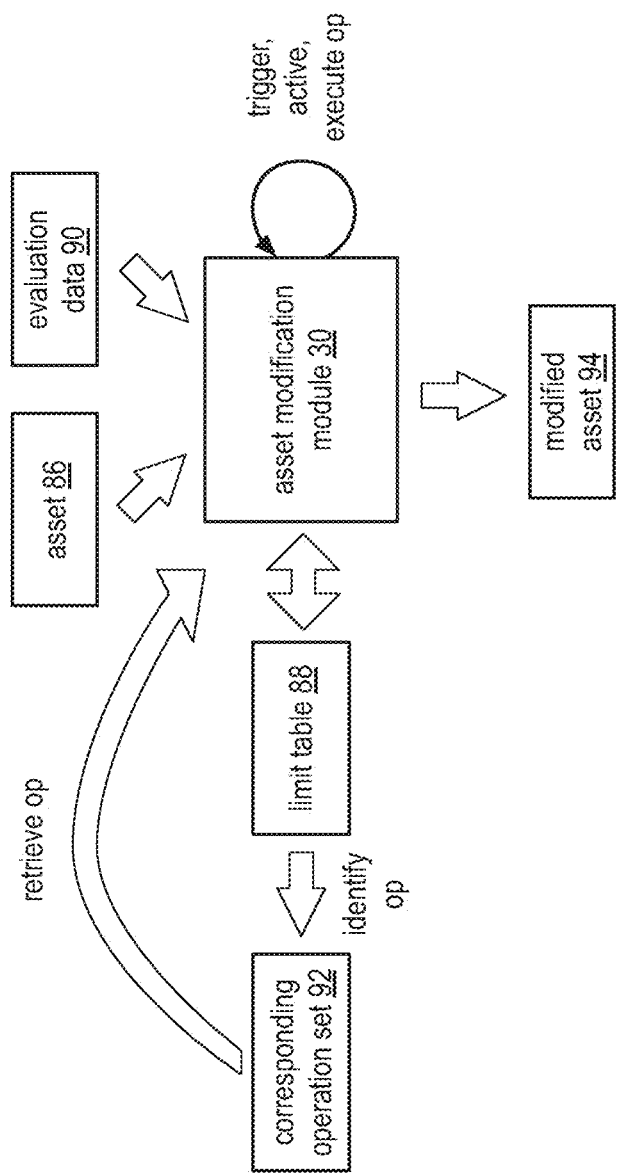
FIG. 4 is a schematic block diagram of an example of an asset modification module modifying an asset in accordance with the present invention.

FIG. 4 is a schematic block diagram of an example of an asset modification module 30 modifying an asset 86. In this example, the asset modification module 86 selects the asset 86 to modify and a limit table 88. In addition, the asset modification module 30 receives evaluation data 90, which may be received from one or more evaluation data content sources. The limit table 88 identifies a corresponding operation set 92 (e.g., the operations identified in the limit table 88).

In an example of operation, the asset module 30 monitors the evaluation data 90 in accordance with entries of the limit table 88 for a condition, pattern, trend, peak value, valley value, etc. to be met to trigger an operation. When an operation is triggered, the asset modification module 30 retrieves it from the corresponding operation set 92 and sets it in the triggered state. When an activation condition, pattern, trend, peak value, valley value, etc. is met, the asset modification module 30 changes the operation to an active state and executes the operation when appropriate based on the evaluation data analysis. This process continues until the asset modification module 30 closes modification of the asset and outputs a modified asset 94.

Figure 5:
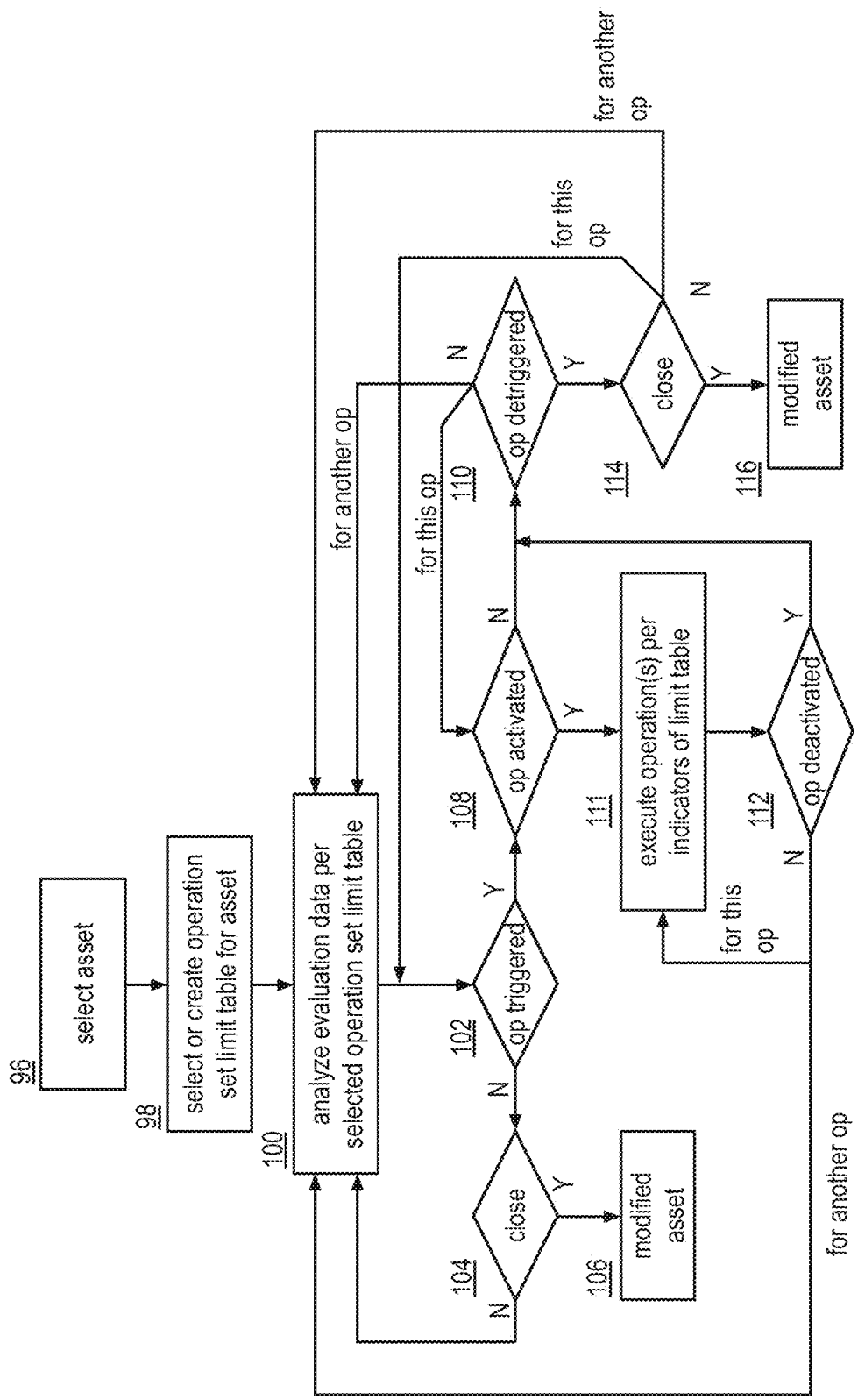
FIG. 5 is a logic diagram of a method for modifying an asset in accordance with the present invention.

FIG. 5 is a logic diagram of a method for modifying an asset that is executable by the asset modification module of a device 11. The method begins at step 96 the module selects an asset from a portfolio of assets. Recall that an asset may tangible property (e.g., real estate, inventory, energy (e.g., gas, electric, etc.), financial capital (e.g., money, stock, bonds, precious metals, etc.), etc.), intangible assets (e.g., patents, copyrights, trademarks, good will, trade secrets, etc.), intelligence information (e.g., personal data, person of interest data, weather data, sports data, traffic data, competitor information, etc.), a rented asset, and/or a disposable asset (e.g., tickets). The selection of an asset may be based on factors associated with the asset, where the factors includes a type of asset, modification timing (e.g., time of day, inventory depletion, etc.), evaluation data sources of interest availability, evaluation data analysis (e.g., pattern mapping, trend detection, value thresholds, comparative analysis, etc.).

The method continues at step 98 where the module selects or creates an operation set limit table for the asset 98 to be modified. For example, a plurality of operation set limit tables may exist for a particular asset. Each of the operation set limit tables is developed based on different attributes (e.g., risk level, evaluation data relevancy, asset modification philosophy, reliability level (e.g., proven, unproven, works sometimes, etc.), favorable evaluation data patterns and/or trends, performance information, etc.). Accordingly, for this example, the operation set limit table is selected based on its attributes aligning with the desires of the user. Alternatively, the asset modification module may create an operation set limit table, which is discussed with reference to one or more subsequent figures.

The method continues at step 100 where the module analyzes time-varying and time-sensitive data based on evaluation criteria of interest identified by the operation set limit table (examples are discussed with reference to one or more subsequent figures). The method continues at step 102 where the module determines whether analysis of the time-varying and time-sensitive data in view of a particular criteria of the evaluation criteria is favorable for triggering an operation. If not, the process continues at step 104 where the module determines whether modification of the asset is being closed (e.g., user initiated, evaluation data determined, limit table indicator, etc.). If the modification is being closed, the method continues at step 106 where the asset modification module outputs a modified asset. Note that the asset may not be modified if the modification process was closed before an operation was executed. If the modification is not being closed, the method repeats at the analyze evaluation data step 100.

If the time-varying and time-sensitive data in view of a particular criteria of the evaluation criteria is favorable for triggering the operation, the operation is triggered and the method continues at step 108 where the module further analyzes the time-varying and time-sensitive data based on correlated evaluation criteria of the evaluation criteria to determine whether the operation is to be activated. Note that the evaluation criteria provides one or more of a desired trend, a desired pattern, a desired slope, a desired value, a desired indicator, a desired threshold, a desired deviation over time, etc. Further note that the particular criteria and the correlated criteria may be the same desired evaluation criteria such that an operation is triggered and activated substantially simultaneously or may be different desired evaluation criteria such that the operation is triggered at one level of the desired evaluation criteria and activated at another level.

If the operation is not to be activated, the method continues at step 110 where the module determines whether the evaluation data analysis indicates that the operation is to be detriggered. If not, the method repeats in a loop for this operation between the activating step 108 and the detriggering 110. The method also branches back to the analyze evaluation data step 100 for another operation. Accordingly, the module may be executing the method of FIG. 5 for multiple operations in view of the same or different evaluation data and/or criteria to modify the selected asset.

If the operation is activated, the method continues at step 111 where the module executes the operation in accordance with operation data indicators of the operation set limit table. The method continues at step 112 where the module determines whether the operation is to be deactivated. The operation may be deactivated upon execution of the operation or based upon an indicator of the evaluation data analysis indicating deactivation of the operation. If not, the method repeats at the operation execution step 111. The method also branches back to the analyze evaluation data step 100 for another operation. If the operation is being deactivated, the method continues at the detrigger determination step 110. Note that when the operation is deactivated, it is placed back in the triggered state unless otherwise indicated in the operation set limit table.

If an indicator of the evaluation data analysis indicates detriggering the operation, the method continues at step 114 where the module determines whether the modification of the asset is to be closed. If the modification is to be closed, the method continues at step 116 where the asset modification module outputs a modified asset. If the modification is not being closed, the method repeats, for this operation, at the trigger determination step 102 and repeats at the evaluation data step 100 for another operation.

Figure 5A:
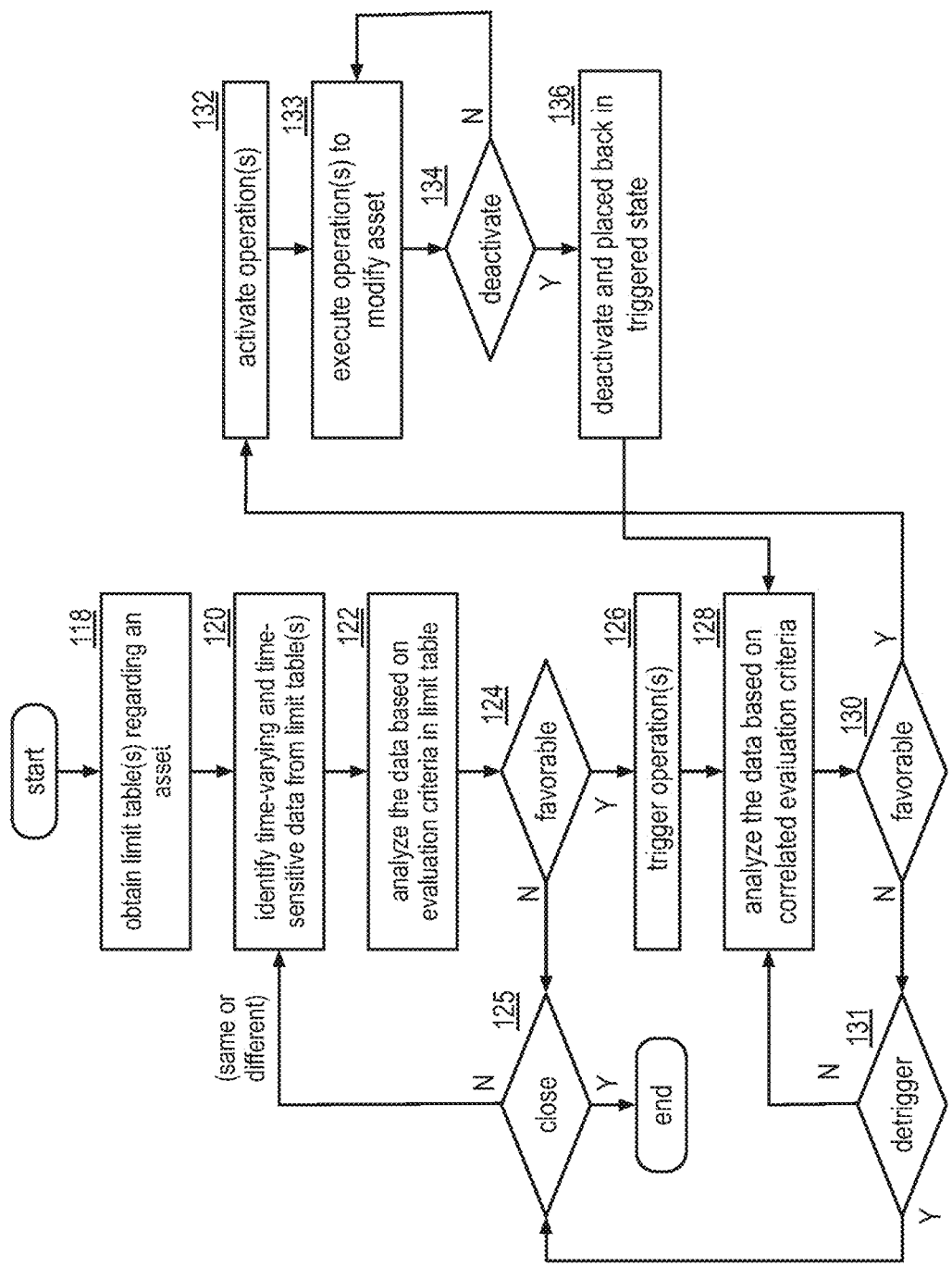
FIG. 5A is a logic diagram of a method for modifying an asset in accordance with the present invention.

FIG. 5A is a logic diagram of a method for modifying an asset that is executable by the asset modification module within the processing module of the user and/or service provider device. The method begins at step 118 where the module obtains, by selecting from stored limit tables or creating a new one) one or more limit tables regarding an asset to be modified. The method continues at step 120 where the asset modification module identifies time-varying and time-sensitive data from the one or more limit tables regarding the asset to be modified 120. The time-varying and time-sensitive data may be obtained from one or more wide area network (WAN), local area network (LAN) data sources (e.g., news, weather, sports, credit tracking, criminal records, financial information, real estate information, data collection, marketing information, sales information, forecasting, vendor web pages, governmental, etc.) via network interface(s) on a free or subscription basis.

The method continues at step 122 where the asset modification module analyzes the time-varying and time-sensitive data based on evaluation criteria from the one or more limit tables. In general, the analysis of the data is based on evaluation criteria that includes, but is not limited to, detecting predictable patterns, trends, factors, values, slopes, deviations, indicators, thresholds, comparative analysis, etc. of the current evaluation data. For example, the analysis is based on a particular one or more of the evaluation criteria such as a particular pattern mapping, a particular trend, a particular value, a particular threshold, a particular comparative analysis, a particular slope, a particular word content, a particular phrase content, a particular time stamp, a particular data of interest identifiers, etc. as is described in greater detail with reference to one or more of FIGS. 7, 21, and 24. The analysis may further include a level of favorability (or unfavorability), which indicates how closely the detected patterns, trends, factors, values, etc. match past patterns, trends, factor values, etc. and the likelihood they will continue to match. The level of favorability (or unfavorability) is a factor in determining the predictability that the asset will be modified in a desired manner. For example, when the analysis yields patterns, trends, etc. that don't particularly match the predictable patterns, trends, etc., the favorability may be indeterminate as is described in greater detail with reference to FIG. 54.

The method branches at step 124 based on whether analysis of step 122 is favorable. When the analysis is unfavorable, the method continues at step 125 where the asset modification module determines whether to close the modification of the asset. If the asset modification is to be closed, the method ends for modification of the selected asset. If the modification is not to be closed, the method repeats at step 120 where the asset modification module identifies new evaluation data (e.g., the time-varying and time sensitive data) or uses the previously selected evaluation data.

When the analysis of step 124 is favorable, the method continues at step 126 where the asset modification module triggers one or more operations of a set of operations, which is identified in the limit table(s). The method continues at step 128 where the asset modification module further analyzing the evaluation data based on correlated evaluation criteria. In an example, the correlated evaluation criteria correlates to the particular evaluation criteria, but a different desired level, value, threshold, etc.

The method branches at step 130 depending on whether the analysis of step 128 is favorable. When the analysis is unfavorable, the method continues at step 131 where the asset modification module determines whether to detrigger the operation. The asset modification module may detrigger the operation when the analysis of the evaluation data compares unfavorably to the particular evaluation criteria, a time period elapses, as an auto-response to an unfavorable correlated evaluation criteria analysis, etc. If the operation is not to be detrigger, the method repeats at step 128. If the operation is to be detrigger, the asset modification module detriggers it and the method repeats at step 125.

If the further analysis based on the correlated evaluation criteria is favorable, the method continues at step 132 where the asset modification module activates the operation is activated. The method continues at step 133 where the asset modification module executes the operation on the operational data corresponding to the asset to produce an intermediate modified asset. The execution of the operation may occur substantially immediately after activation, after a predetermined period of, after the evaluation data remains in a favorable relation to the correlated evaluation criteria for a given period of time, etc. In another example, the particular criteria and the correlated criteria may be the same. In this case, step 126, where the operation is triggered, and step 132, where the operation is activated and executed are the same time; thus, the operation is triggered, activated, and executed in the same step.

The method continues at step 134 where the asset modification module determines whether to deactivate the operation and place it in a triggered state. The asset modification module may deactivate the operation as an auto-response to executing the operation, when the analysis of the evaluation data in view of the correlated evaluation criteria is unfavorable, after elapse of a time period, after the operation has been executed a given number of times, etc. If the operation is to be deactivated, the method continues at step 136 where the module deactivates the operation, places it back in the triggered state, and the method repeats at step 128. If the operation is not to be deactivated, the method repeats at step 133. Note that the repeating of execution of the operation may be substantially continual or may include some delay or hysteresis. Further note that the repeating of the execution of the operation may produce a cumulative modification of the asset or a superseding modification of the asset.

Figure 5B:
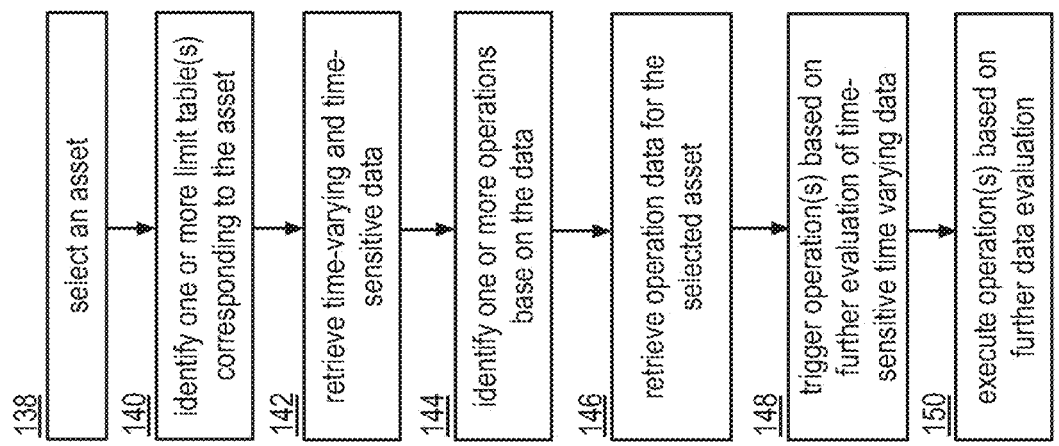
FIG. 5B is a logic diagram of a method for modifying an asset in accordance with the present invention.

FIG. 5B is a logic diagram of a method for modifying an asset that is executable by the asset modification module within the processing module of the user or service provider device. The method begins at step 138 where the asset modification module selects an asset from a plurality of assets. The method continues at step 140 where the asset modification module identifies one or more limit tables of a plurality of limit tables corresponding to the selected asset. The method continues at step 142 where the module retrieves, via the network interface module, time-varying and time-sensitive data (e.g., evaluation data) based on information from the one or more limit tables.

The method continues at step 144 where the module identifies one or more operations of a plurality of operations based on evaluation of the time-varying and time-sensitive data as indicated in the one or more limit tables. The method continues at step 146 where the module retrieves operation data corresponding to the selected asset. The operational data may include the selected asset, an asset identifier (ID), information regarding the selected asset (e.g., quantity, value, use rate, etc.), and/or other data regarding the asset.

The method continues at step 148 where the module triggers the one or more operations based on further evaluation of the time-varying and time-sensitive data. The method continues at step 150 where the module executes the one or more operations on the operation data for the selected asset based on further evaluation of the time-varying and time-sensitive data.

Figure 6:
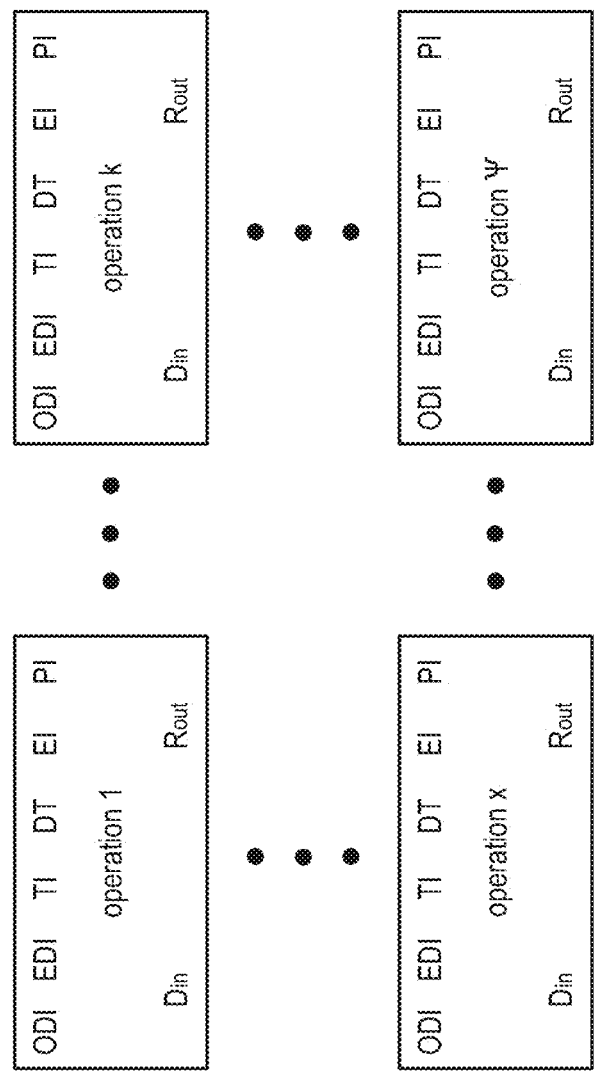
FIG. 6 is a schematic block diagram of an example of asset modification operations in accordance with the present invention.

FIG. 6 is a schematic block diagram of an example of a set of operations for modifying an asset. Each of the operations may be an operation module (e.g., software and/or hardware) that includes a plurality of inputs and one or more outputs. The inputs include operation data indicator, or indicators, (ODI), evaluation data indicator, or indicators, (EDI), trigger indicator, or indicators, (TI), de-trigger indicator, or indicators, (DT), activate for execution indicator, or indicators, (EI), pause or deactivate indicator, or indicators, (PI), and/or data input (Din). The output includes a resultant output (Rout).

For an operation, the operation data indicator(s) provide indications regarding operation data of the asset. Such indicators may include an operation data identifier (ID), a data allotment, and one or more data operands. For example, the operation data ID identifies the asset, or data regarding the asset. As a more specific example, the operation data ID may identify a stock for trading, a person for collecting information about him or her, employment data of a person, a part number of a component, a region for weather information, sporting event tickets, etc.

The data allotment provides operational limits on the operation data being modified. For example, the data allotment may indicate how much of the identified stock is to be executed upon by the operation, what years to obtain information regarding a person, certain employers of a person for employment data, a quantity of an identified part, an amount of time for collecting weather data of a region, dates for the sporting event tickets, etc. Note that the data allotment may be predetermined via the operation set limit table or it may be a calculation of the operation and/or another operation.

The one or more data operands, if included, provide operand information regarding the operation data. For example, a data operand may be an initial value of the operation data, baseline data for the operation data, data conditions (e.g., limits, thresholds, rounding preferences, etc.) regarding the operation data, data formatting (e.g., units, number of decimal places, date format, font, etc.), and/or calculation parameters (e.g., function to perform to determine baseline data, initial data, etc.). As a more specific example, the data operand may indicate currency of the identified stock, date format for the years to obtain information regarding a person, certain employers of a person for employment data, quantity units (e.g., per piece, per dozen, per lots of 100, etc.) of an identified part, a start time for collecting weather data of the region, quantity of tickets for the specific dates regarding the sporting event, etc.

Continuing with inputs for the operation, each of the evaluation data indicator(s) (EDI) includes an evaluation data identifier (ID) and one or more evaluation data factors. The evaluation data ID identifies one or more evaluation data sources of interest for the particular operation. For example, the evaluation data of interest for a stock may be one or more of line price data, candlestick data, average position price, simple moving average, exponential moving average, Bollinger bands, money flow, MACD, parabolic SAR, rate of change, relative strength, slow Stochastic, fast Stochastic, volume, volume+moving average, William % R, etc. As a further example, the evaluation data of interest for information regarding a person may be specific newspapers, specific magazines, credit rating information, criminal history, financial information, published patent applications, articles authorized by the person, etc. As another example, the evaluation data of interest for employment data of a person may be tax returns, information regarding the employer, personnel files, etc. As yet another example, the evaluation data of interest for weather of a particular region may be local forecasts, national weather service advisories, video data, informant information, etc.

An evaluation data factor for evaluation data of interest includes one or more of a time frame for the evaluation data (e.g., data of May 12, 2012), source filtering information, evaluation data manipulation requirements, etc. For example, the source filtering information may be used to weight information from one source as more relevant than from another source, to filter out information from a particular source, to pass only information from one or more selected authors, etc. As another example, the evaluation data manipulation requirements provide information regarding changing format of the evaluation data (e.g., language translation, font, spacing, size, paragraph structure, tabular form, spreadsheet form, etc.); performing a function on the evaluation data (e.g., a mathematical function (e.g., an average function, an RMS function, etc.), graphing, scaling, compressing, etc.); performing a function of the evaluation data with other evaluation data (e.g., comparing, adding, subtracting, multiplying, dividing, averaging, statistical analysis, etc.).

Continuing with inputs for the operation, the trigger indicator(s) indicate when the operation is to be triggered (e.g., awaken and ready for execution) based on analysis of the identified evaluation data. For example, the trigger indicator may indicate that, when the evaluation data reaches a certain value, the operation is to be triggered. As another example, the trigger indicator may indicate that, when the evaluation data exhibits a certain pattern and/or trend, the operation is to be triggered. As yet another example, the trigger indicator may indicate that, when a combination of evaluation data exhibits a certain pattern and/or trend, the operation is to be triggered. The de-trigger indicator(s) indicate when the operation is to be detriggered (e.g., put into a sleep mode or disabled).

Continuing with inputs for the operation, the activate for execution indicator(s) indicate when a triggered operation is to be activated (e.g., enabled for execution) based on analysis of the identified evaluation data. For example, the activate for execution indicator may indicate that, when the evaluation data reaches a certain value, the triggered operation is to be activated. As another example, the activate for execution indicator may indicate that, when the evaluation data exhibits a certain pattern and/or trend, the triggered operation is to be activated. As yet another example, the activate for execution indicator may indicate that, when a combination evaluation data exhibits a certain pattern and/or trend, the operation is to be activated. The de-activate for execution indicator(s) indicate when the operation is to be deactivated (e.g., put back into the triggered mode).

Figure 7:
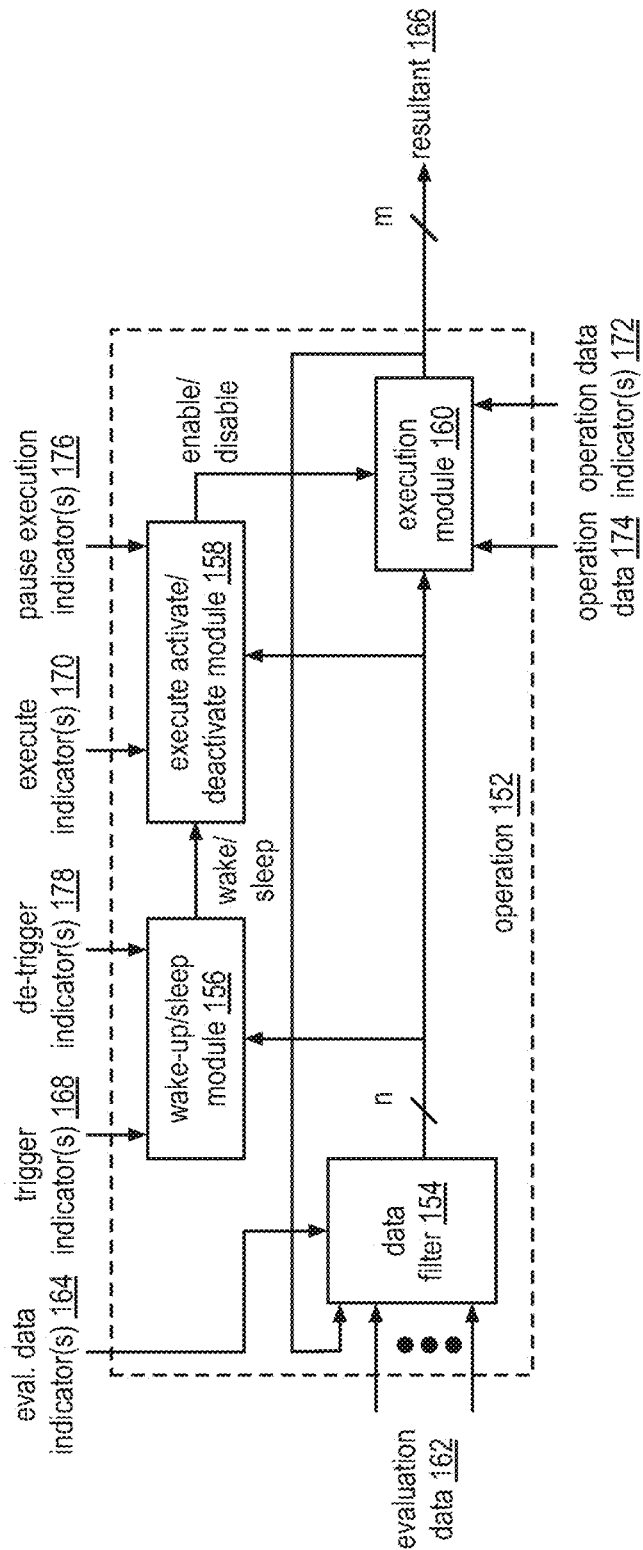
FIG. 7 is a schematic block diagram of an embodiment of asset modification operation in accordance with the present invention.

FIG. 7 is a schematic block diagram of an embodiment of asset modification operation module 152 that includes a data filter 154, a wake-up/sleep module 156, an execute activate/deactivate module 158, and an execution module 160. The operation module 152 may be implemented as a software module executable by a processing module, may be implemented as a hard coded module, and/or may be implemented as a firmware module (e.g., a combination of software and hardware).

In an example of operation, the data filter 154 filters one or more evaluation data 162 based on one or more evaluation data indicators 164 to produce one or more filtered evaluation data outputs. Since the evaluation data 162 is time varying and time sensitive, the one or more filtered evaluation data outputs are a continuous stream of data, a continuous stream of data samples, and/or a combination thereof. Note that the evaluation data 162 may include an output of one or more other operations. Further note that the evaluation data 162 may include the output resultant 166 of the operation module 152.

The wake-up/sleep module 156 (which could also be called a trigger/detrigger module) receives the one or more filtered evaluation data outputs and analyzes them in view of the one or more trigger indicators 168. When the analysis is favorable, the wake-up/sleep module 156 wakes up, or triggers, the operation module 152. A favorable analysis may result by detecting a trigger signal; by detecting the filtered evaluation data includes a data aspect (e.g., value, trend, pattern, slope, word content, phrase content, time stamp, data of interest identifier, etc.) that compares favorably to a trigger indicator 168; by detecting a desired result of another operation; and/or by detecting one or more other factors within the filtered evaluation data.

When the operation is triggered (e.g., awake), the execute activate/deactivate module 158 is engaged to analyze the one or more filtered evaluation data outputs in view of one or more execute (or activate) indicators 170. When the analysis is favorable, the execute activate/deactivate module 158 enables, or activates, the operation module 152. A favorable analysis may result by detecting an activate signal; by detecting the wake up signal (e.g., an execute indicator is the same as a trigger indicator); by detecting the filtered evaluation data includes a data aspect (e.g., value, trend, pattern, slope, word content, phrase content, time stamp, data of interest identifier, etc.) that compares favorably to an execute (or activate) indicator; by detecting a desired result of another operation; and/or by detecting one or more other factors within the filtered evaluation data.

With the operation active, the execution module 160 is enabled to perform its operation on the operation data 174 and/or on the evaluation data 162 in view of the operation data indicators 172. For example, the operation may be a logic function, a mathematical function, an algorithm, and/or an operational instruction. As a more specific example, the operation is an algorithm to purchase stock, which is identified by the operation data 174 and/or the operation data indicators 172. As another more specific example, the operation is an algorithm to sell sporting event tickets, which are identified by the operation data and/or the operation data indicators. As yet another more specific example, the operation is an algorithm to update a file on a person with newly found evaluation data. As a furthermore specific example, the operation is an algorithm to determine when to place a purchase order for a component of a manufactured product. As an even furthermore specific example, the operation is an algorithm to generate an alarm when the national weather service has issued a severe storm warning for a region. As a still furthermore specific example, the operation is a function to change the formatting of a selected evaluation data.

When the operation is active, the execute activate/deactivate module 158 is analyzing the one or more filtered evaluation data outputs in view of one or more pause (or deactivate) indicators 176 to determine whether to deactivate, or disable, the operation module 152. When the analysis is favorable, the execute activate/deactivate module 158 disables, or deactivates, the operation module 152, which places the operation module 152 back in the triggered state. A favorable analysis may result by detecting an deactivation signal; by detecting completion of the execution module performing its operation; by detecting the filtered evaluation data includes a data aspect (e.g., value, trend, pattern, slope, word content, phrase content, time stamp, data of interest identifier, etc.) that compares favorably to an pause (or deactivate) indicator 176; by detecting a desired result of another operation; and/or by detecting one or more other factors within the filtered evaluation data.

With the operation module 152 back in the triggered state, the execute activate/deactivate module 158 analyzes the one or more filtered evaluation data outputs in view of one or more execute (or activate) indicators 170 to determine if the operation module 152 should be activated. Also, the wake-up/sleep module 156 analyzes the one or more filtered evaluation data outputs in view of the one or more detrigger indicators 178. When the analysis is favorable, the wake-up/sleep module 156 places the operation module 152 in a sleep, or detriggered state. A favorable analysis may result by detecting a detrigger signal; by detecting the filtered evaluation data includes a data aspect (e.g., value, trend, pattern, slope, word content, phrase content, time stamp, data of interest identifier, etc.) that compares favorably to a detrigger indicator 178; by detecting a desired result of another operation; and/or by detecting one or more other factors within the filtered evaluation data.

Figure 8:
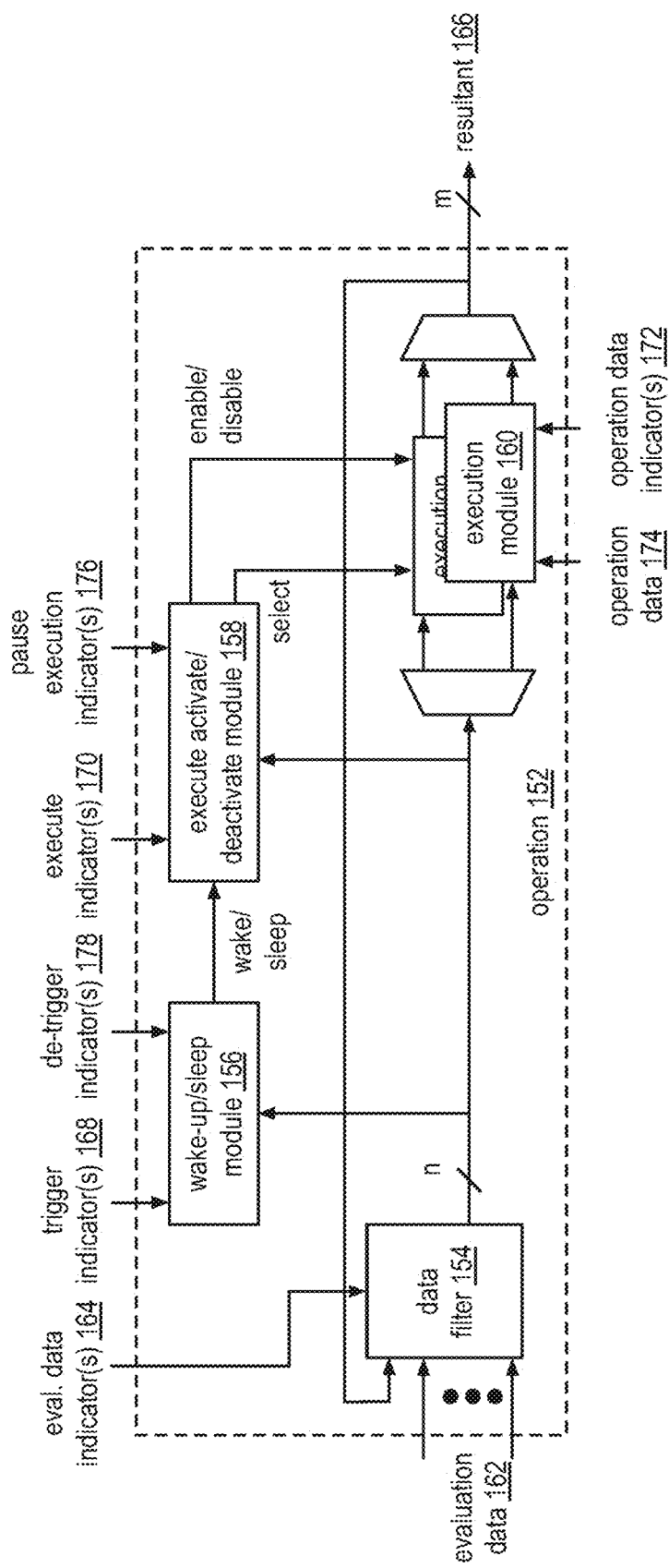
FIG. 8 is a schematic block diagram of another embodiment of asset modification operation in accordance with the present invention.

FIG. 8 is a schematic block diagram of another embodiment of asset modification operation module 152 includes a data filter 154, a wake-up/sleep module 156, an execute activate/deactivate module 158, and a plurality of execution modules 160. The operation module 152 may be implemented as a software module executable by a processing module, may be implemented as a hard coded module, and/or may be implemented as a firmware module (e.g., a combination of software and hardware).

In an example of operation, the data filter 154 and the wake-sleep module 156 function as discussed with reference to FIG. 7. The execute activate/deactivate module 158 functions similarly to the execute activate/deactivate module 158 of FIG. 7 with the additional function of selecting one or more of the plurality of execution modules 160. The execute activate/deactivate module 158 selects an execution module 160, or multiple execution modules 160, in accordance with information within the execute (or activate) indicators 170. For example, if the indicators indicate purchasing a stock, the execution module 160 that performs the algorithm to purchase a stock is selected. If, however, the indicators indicate selling a stock, the execution module 160 that performs the algorithm to sell a stock is selected.

Figure 8A:
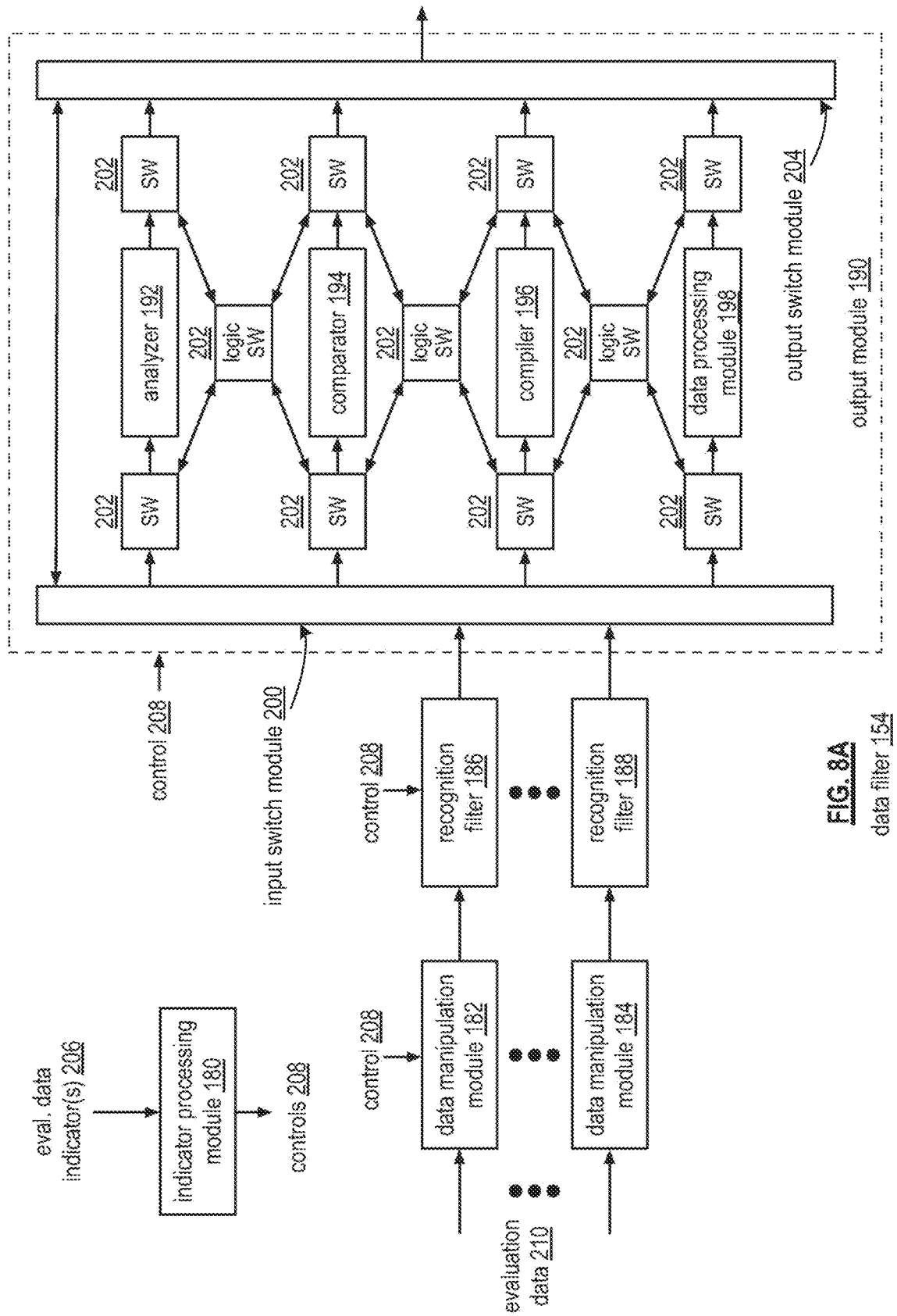
FIG. 8A is a schematic block diagram of an embodiment of evaluation data filter in accordance with the present invention.

FIG. 8A is a schematic block diagram of an embodiment of evaluation data filter 154 that includes an indicator processing module 180, a plurality of data manipulation modules 182-184, a plurality of recognition filters 186-188, and an output module 190. The output module 190 includes a plurality of functional blocks 192-198 and a programmable switching network 200-204. The functional blocks include, but are not limited to, an analyzer 192, a comparator 194, a compiler 196, a data processing module 198, etc. The programmable switching network includes an input switch module 200, a plurality of switches (SW) 202, and an output switch module 204. Note that the evaluation filter 154 may be implemented as a software module executable by a processing module, may be implemented as a hard coded module, and/or may be implemented as a firmware module (e.g., a combination of software and hardware).

In an example of operation, the indicator processing module 180 receives the evaluation data indicator(s) 206 and may further receive configuration information for a corresponding limit table. From the evaluation data indicator(s) 206 and/or the configuration information, the indicatory processing module generates control signals 208. For instance, the indicator processing module 180 generates control signals 206 to enable one or more of the data manipulation modules 182-184 and to configure, if needed, the enable data manipulation module(s) 182-184. For example, an evaluation data indicator 206 identifies a particular evaluation data 210 and, based on the identity, the indicator processing module 180 assigns a data manipulation module 182-184 to the particular evaluation data 210. In addition, the indicator processing module 180 may generate a configuration control signal 208 to configure the data manipulation module 182-184 to compress, scale, buffer, transform format, etc. of the particular evaluation data 210. Alternatively, the indicator processing module 180 may generate a control signal 206 to bypass a data manipulation module 182-184 such that evaluation data 210 is provided directly to a recognition filter 186-188.

The indicator processing module 180 also generates control signals 208 to enable one or more of the recognition filters 186-188 and may further generate control signals 208 to configure filtering of an enabled recognition filter 186-188. For example, at some of the recognition filters 186-188 have different and fixed filtering functions. An example of fixed filtering functions includes, for a particular publication as the evaluation data 210, passing articles regarding a particular subject, passing articles written by a particular author, passing articles written in a particular time frame, etc. Another example of fixed filter functions includes, for a particular evaluation data 210, passing the evaluation data 210 during a particular time window (e.g., from 9 AM-4 PM eastern time). A further example of fixed function functions includes a first filter function of passing data regarding a particular subject (e.g., a component for a manufactured product, information regarding a person, weather, traffic, a sporting event, etc.) and a second filter function of passing a subset of data based on one or more of the source of the data, timeliness of the data (e.g., if not current, which is a relative term, the data is filtered out), a particular geographic region, etc.

The indicator processing module 180 further generates control signals 208 to configure the output module 190. For example, the output module 190 may be configured to output filtered evaluation data without further processing. As another example, one or more of the functional blocks 192-198 of the output module 190 may be enabled to process filtered evaluation data. As a specific example, the analyzer 192 may be enabled to analyze the filtered evaluation data to extract, highlight, etc. certain aspects of it. As another specific example, the comparator 194 may be enabled to compare two or more filtered evaluation data for redundancy, relevancy, timeliness, etc. and to output one of the compared evaluation data. As a further specific example, the compiler 196 may be enabled to compile two or more filtered evaluation data into compiled evaluation data. As a further specific example, the data processing module 198 may be enabled and configured to further process the evaluation data. Such further processing may include compression, scaling, format transformation, combining multiple evaluation data into a combined evaluation data (e.g., multiple weather reports from different sources into a single weather report), sort evaluation data, de-duplicate evaluation data, prioritize evaluation data, etc.

As yet another example of configuring the output module 190, multiple functional blocks 192-198 may be enabled such that an output of one functional block provides an input to another functional block. As a further example of configuring the output module 190, a functional block may be configured to provide a loop function for a certain number of loops and/or until a condition is met (e.g., the output of a functional block is fed back as the input of the functional block). Note that the input switch module 200-204 includes sufficient buffering to temporarily store filtered evaluation data.

FIG. 9 is a diagram of an example of an operation set limit table 212 that includes a plurality of columns and one or more rows. The columns correspond to particular aspects of the operation set limit table 212 such as sequence (ordering) 214, operation identifier (ID) 216, one or more trigger indicators 218, one or more detrigger indicators 220, evaluation data indicators 224, execute (or activate) indicators 226, pause (or deactivate) indicators 228, operational data indicators 230, current operation status 232, and execution module selection 234. Note that an operation limit table may include more or less columns (i.e., aspects). For example, the execution module selection 234 may be omitted. As another example, the sequence column 214 may be omitted. As yet another example, a column or aspect may be added to indicate configuration information for the evaluation data filter.

Each row of the operation set limit table 212 corresponds to an identified operation and its operating conditions. For example, a first row below the header includes an entry in the sequence (ordering) field 214 of 0 (1,x) and an entry in the operation ID 216 field of "A", which identifies operation module A. In this example, the 0 represents that operation A is an initializing operation to begin modifying a particular asset. For example, operation A may be detecting an initialize asset modification signal; may be detecting a certain condition of evaluation data, etc. The (1,x) indicates the next sequence numbers that the asset modification process may transition to after successful execution of an operation having a sequence number of 0. In this example, operations having a sequence number of 1 or a sequence number of x are the next possible operations of the asset modification process.

Continuing with the example for operation "A", the remaining fields includes entries for triggering indicator(s) 218, detriggering indicator(s) 220, evaluation data indicators 224 (which includes evaluation data ID 236 and may further include evaluation data factors 238), execute (or activate) indicator(s) 226, pause (or deactivate) indicator(s) 228, operational data indicators 230 (which includes operational data ID 240, data allotment 242, and/or data operands 244), current operation status 232, and execution module selection 234. The current operation status 232 includes whether the operation is waiting, in execution, completed, etc. The execution module selection 234 is used to select an execution module of the operation module if it includes more than one execution module.

The second row of the table includes an entry in the sequence (ordering) field 214 of 0 (1,x) and an entry in the operation ID field of "B", which identifies operation module B. In this example, the 0 represents that operation B is an initializing operation to begin modifying a particular asset. In this example, operations A and B are each initializing operations and either one of the operations may be executed to transition the asset modification process to the next sequence. The remaining rows have information regarding other operations for the asset modification process, with one of them being a closing operation of the asset modification process.

Figures 10A, 10B, 10C:
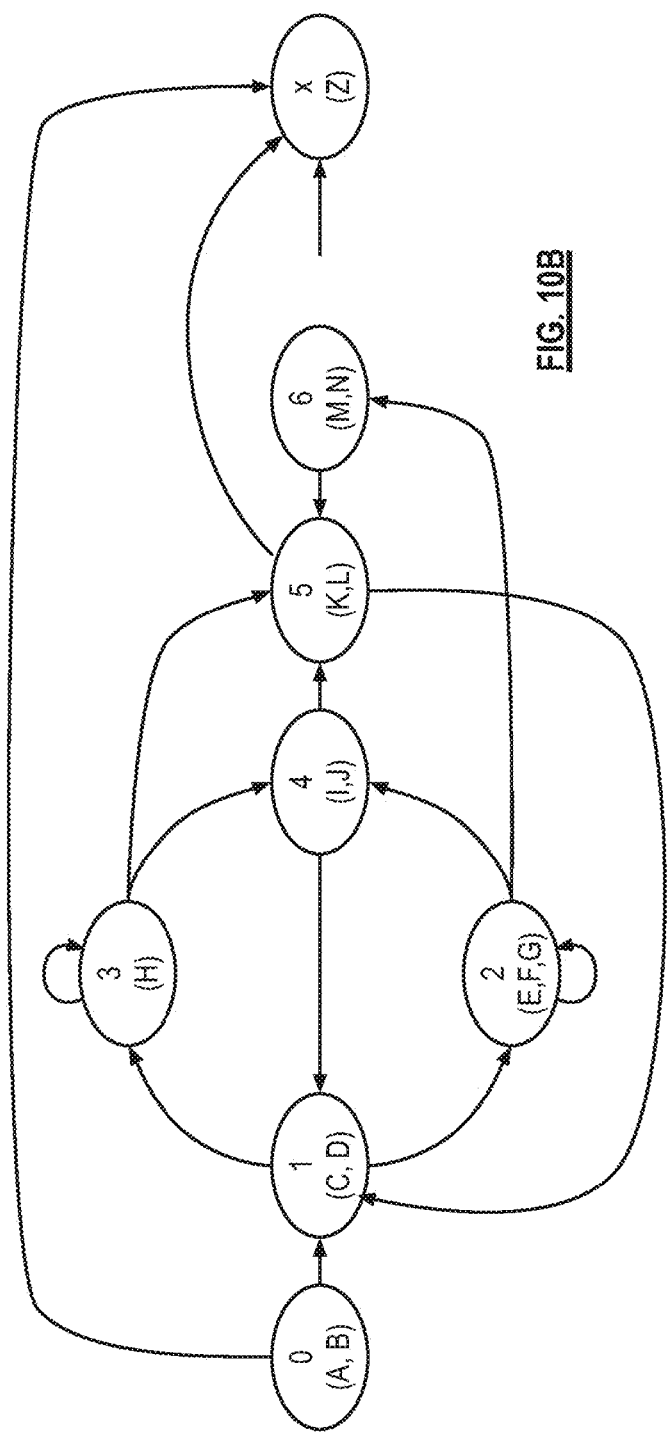
FIGS. 10A-10C are diagrams of an example of asset modification in accordance with the present invention.

FIGS. 10A-10C are diagrams of an example of asset modification. FIG. 10A illustrates the first two columns of an operation set limit table (i.e., sequence (ordering) 214 and operation ID 216); FIG. 10B illustrates the sequence transitions for operation set limit table; and FIG. 10C illustrates the states of the operations for the sequencing of the operation set limit table. In this example, the operation set limit table includes x number of sequences 246 and identifies Z operations. At the opening of the asset modification process of the operation set limit table, it starts in sequence state 0 and ends in sequence state x.

In the sequence 0 state, operations A and B are executable 250 (i.e., can be triggered, activated, and/or executed), operations C, D, and Z are triggerable 248 (e.g., if the asset modification process transitions out of sequence 0, these are the operations that may be executable), and operations E-N are inactive 252 (e.g., are not executable when the asset modification process transitions out of sequence 0). When operation A or B is successfully executed, the asset modification is process is in a transitional state (e.g., it can transition to sequence 1 or to sequence x). In this transitional state, operations C, D, and Z become executable 250.

When a triggering condition for operation C or D occurs, the asset modification process transitions from sequence 0 to sequence 1. In this sequence state 246, operations C and D are executable 250, operations E, F, G, and H are triggerable 248, and operations A, B, and I-Z are inactive 252. The asset modification process remains in sequence state 1 as long as operation C or D is triggered and can execute operation C or D as often as indicated by the other field entries for the operation as set in the operation set limit table (e.g., the various indicators). When operations C and D become detriggered, the asset modification process is again in a transitional state. From sequence 1, the asset modification process may be transition to sequence 2 or to sequence 3 (as indicated by the parenthetical 2, 3 in the sequence ordering column 214 in rows having a sequence number of 1).

The asset modification process will transition to sequence 2 if operations E, F, and/or G become triggered and will transition to sequence 3 if operation H becomes triggered. If the asset modification process transitions to sequence 2, operations E, F, and G are executable 250, operations E, F, G, I, J, M, and N are triggerable 248, and operations A-D, H, K, L, and O-Z are inactive 252. The asset modification process remains in sequence state 2 until operations E, F, and G are detriggered in accordance with a detrigger indicator (which may result for a triggering of an operation in a next sequence state). Once detriggered, the asset modification process is again in the transition state and may transition back into sequence state 2, transition to sequence state 4, or transition to sequence state 6 (e.g., as indicated by the parenthetical 2, 4, 6 in the sequence ordering column 214).

If the asset modification process transitions from sequence 1 to sequence 3, operation H is executable 250, operations H, J, K, L, and I are triggerable 248, and operations A-G, M-Z are inactive 252. The asset modification process remains in sequence state 3 until operation H is detriggered in accordance with a detrigger indicator. Once detriggered, the asset modification process is again in the transition state and may transition back into sequence state 3, transition to sequence state 4, or transition to sequence state 5 (e.g., as indicated by the parenthetical 2, 4, 5 in the sequence ordering column 214).

If the asset modification process transitions to sequence 4 from either sequence 2 or 3, operations I and J are executable 250, operations C, D, K, and L are triggerable 248, and operations A, B, E-G, and O-Z are inactive 252. The asset modification process remains in sequence state 4 until operations I and J are detriggered in accordance with a detrigger indicator. Once detriggered, the asset modification process is again in the transition state and may transition to sequence state 1 or transition to sequence state 5 (e.g., as indicated by the parenthetical 1, 5 in the sequence ordering column 214).

If the asset modification process transitions to sequence 5 from either sequence 3 or 4, operations K and L are executable 250, operations C, D, and Z are triggerable 248, and operations A, B, E-J, and M-Z are inactive 252. The asset modification process remains in sequence state 5 until operations K and L are detriggered in accordance with a detrigger indicator. Once detriggered, the asset modification process is again in the transition state and may transition to sequence state 1 or transition to sequence state z (e.g., as indicated by the parenthetical 1, z in the sequence ordering column 214).

If the asset modification process transitions to sequence 6 from sequence 2, operations M and N are executable 250, operations K and L are triggerable 248, and operations A-J and O-Z are inactive 252. The asset modification process remains in sequence state 6 until operations M and N are detriggered in accordance with a detrigger indicator. Once detriggered, the asset modification process is again in the transition state and may transition to sequence state 5 (e.g., as indicated by the parenthetical 5 in the sequence ordering column 214).

As an example, assume that the asset being modified is season tickets to a sporting event. Various operations for modifying season tickets include, but are not limited to, opening season ticket asset modification process, buy tickets for a particular sporting event, sell tickets for a particular sporting event, keep the tickets for a particular sporting event, determining a selling price, determining a purchasing price, determining a selling quantity, determining a purchasing quantity, closing the season ticket asset modification process, etc.

For this example, sequence state 0 may correspond to opening the season ticket asset modification process, which may be done by detecting an opening signal (e.g., operation A) or by detecting a trigger and execute condition for operation B (e.g., current date is 3 weeks prior to sporting event). When the season ticket asset modification process is opened, it is in a transition state waiting for a trigger condition to occur, which may indicate to keep the tickets for the particular sporting event, buy more tickets to the sporting event, or sell tickets to the sporting event. If a trigger condition occurs indicating keep the tickets (e.g., in town, good opponent, etc.), the asset modification process for this particular sporting event is closed, but other particular sporting events may still be open.

If a trigger condition indicates buying more tickets (e.g., family or friends in town), the asset modification process transitions to a sequence for purchasing additional tickets. This sequence of purchasing additional tickets may include several sequences (e.g., determining whether adjacent seats are available for purchase, determining an acceptable price, determining a quantity of extra tickets, purchasing the extra tickets, etc.). The sequence of purchasing additional tickets may take a turn if adjacent seats are not available. In this instance, a sequence for purchasing a group of best available tickets may be evoked and, if successful, then a sequence is evoked to sell the season ticket holder's tickets for the particular sporting event.

If a trigger condition indicates selling the tickets (e.g., out of town, event sold out, (opportunity to sell at greater than face value), etc.), the asset modification process transitions to a sequence, or series of sequences to sell the tickets. The operations of the sequence or series of sequences include determining a number of tickets to sell, a selling price (which may change the closer to the event), fund distribution, etc.

Figure 11:
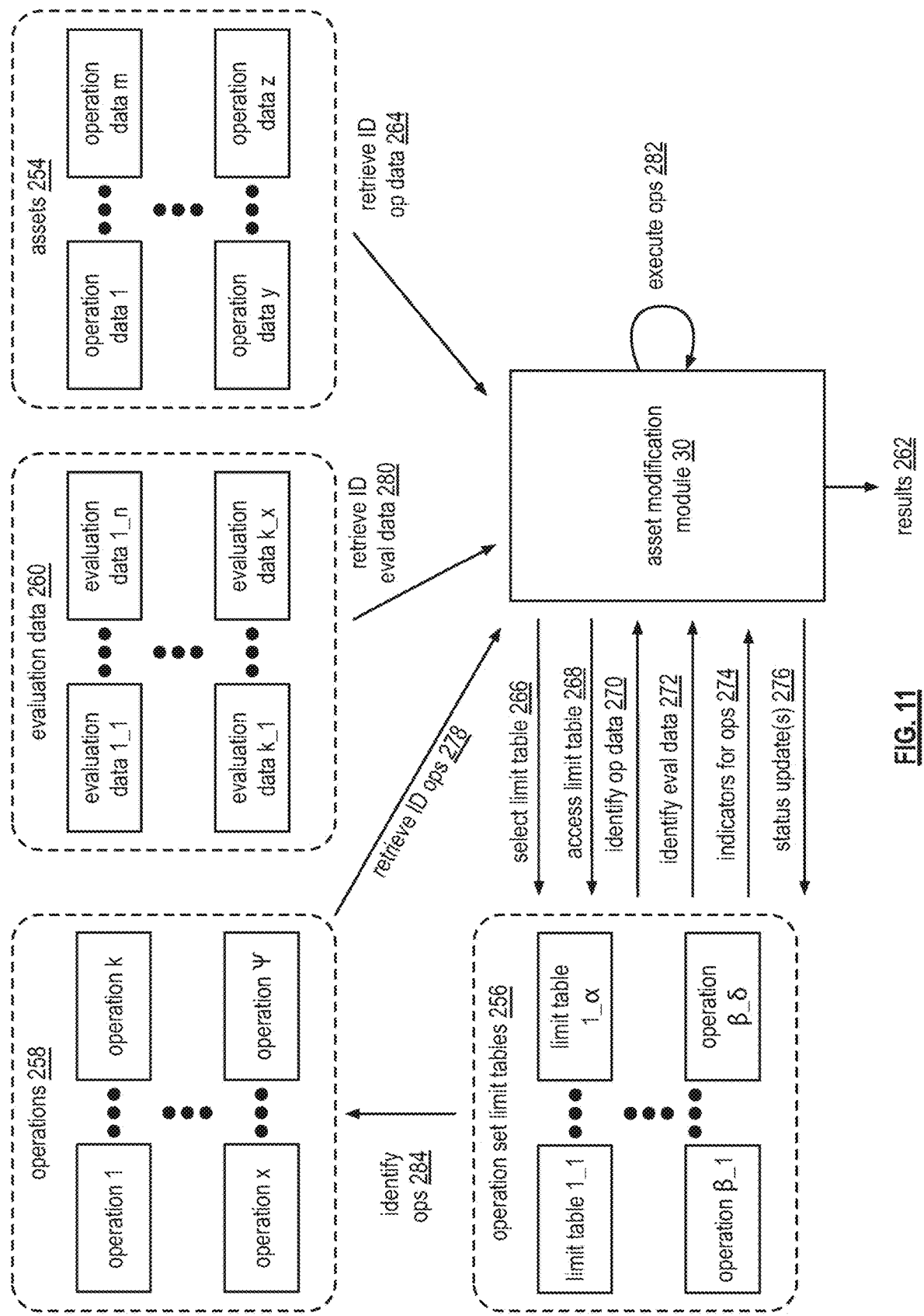
FIG. 11 is a schematic block diagram of another example of an asset modification module modifying an asset in accordance with the present invention.

FIG. 11 is a schematic block diagram of another example of an asset modification module 30 modifying an asset. In this example, the asset modification module 30 selects one of the assets 254 to manage and retrieves the operational data 264 regarding the asset in accordance with a selection process (e.g., user selection, automated determination process, default selection, etc.). The operation data 264 of an asset includes an asset ID, the asset, and/or information regarding the asset (e.g., quantity, value, use rate, etc.).

Once the asset modification module 30 selects an asset 254 for modification, it selects an operation set limit table 266 from a plurality of limit tables 256. In this example, asset 1 has limit tables 1_1 through 1_α available and the asset modification module 30 selects one of them based on attributes and/or factors of the limit tables (e.g., risk levels, reliability, etc.) in accordance with user preferences or a calculated preference.

The asset modification module 30 accesses the selected limit table to retrieve one or more rows of information 268 (e.g., a row of information corresponds to information regarding an operation, which may be in a particular sequence order). The asset modification module 30 interprets the information 270 to identify one or more evaluation data 272 and retrieves the corresponding evaluation data 280. The asset modification module 30 further interprets the information to identify indicators 274 (e.g., trigger, detrigger, activate, deactivate, etc.). The asset modification module 30 also interprets the information to identify, and retrieve, one or more operations 278 from a pool of operations 258.

Having retrieved indicators and the operation(s), the asset modification module 30 analyzes the retrieved evaluation data 260, which is data that is time varying and time sensitive and may further be streaming data, in light of the indicators. When a trigger indicator is met, the operation 258 is triggered and the status of the operation within the limit table 256 is updated accordingly 276. When an activate indicator is met, the operation 258 is activated for execution and the status of the operation within the limit table 256 is updated accordingly 276. The asset modification module 30 executes an activated operation 282 in accordance with the indicators of the limit table 256 to produce a partial modification resultant.

The asset modification module 30 continues to access the limit table 266, identify operation data 270, identify evaluation data 272, retrieve indicators 274, identify operations 284, and execute the operations 282 in accordance with the identifiers. Once the modification of the asset is closed, the asset modification module 30 outputs an asset modification result 262.

Figure 12:
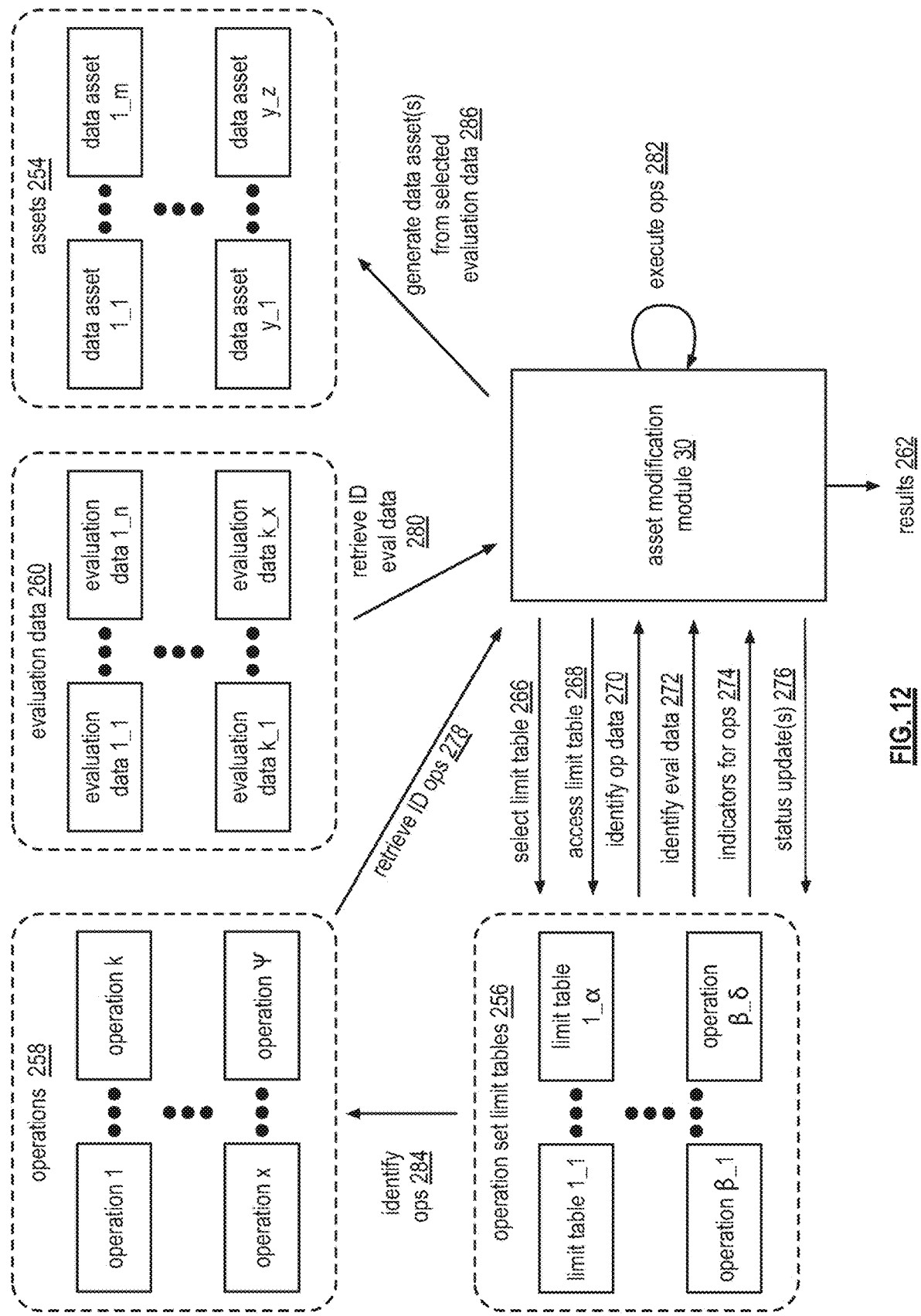
FIG. 12 is a schematic block diagram of another example of an asset modification module modifying an asset in accordance with the present invention.

FIG. 12 is a schematic block diagram of another example of an asset modification module 30 modifying an asset 254 (e.g. creating the asset or adding to the asset 286). In this example, the asset modification module 30 selects one of the assets 254 to create, or add to, and uses this information to select an operation set limit table 266 from a plurality of limit tables 256.

The asset modification module 30 accesses the selected limit table 268 to retrieve one or more rows of information 270 (e.g., a row of information corresponds to information regarding an operation, which may be in a particular sequence order). The asset modification module 30 interprets the information to identify one or more evaluation data 272 and retrieves the corresponding evaluation data 280.

The asset modification module 30 further interprets the information to identify indicators 274 (e.g., trigger, detrigger, activate, deactivate, etc.). The asset modification module 30 also interprets the information to identify 284, and retrieve 278, one or more operations from a pool of operations 258.

Having retrieved indicators and the operation(s) 258, the asset modification module 30 analyzes the retrieved evaluation data 260. When a trigger indicator is met, the operation 258 is triggered and the status of the operation within the limit table 256 is updated accordingly 276. When an activate indicator is met, the operation 258 is activated to create and/or add to the asset 254 and the status of the operation within the limit table 256 is updated accordingly 276.

The asset modification module 30 continues to access the limit table 256, identify operation data 270, identify evaluation data 272, retrieve indicators 274, identify operations 284, and execute the operations 282 in accordance with the identifiers to create and/or add to the asset. Once the modification of the asset is closed, the asset modification module 30 outputs an asset modification result 262 (e.g., the generated or updated asset).

Figure 13:
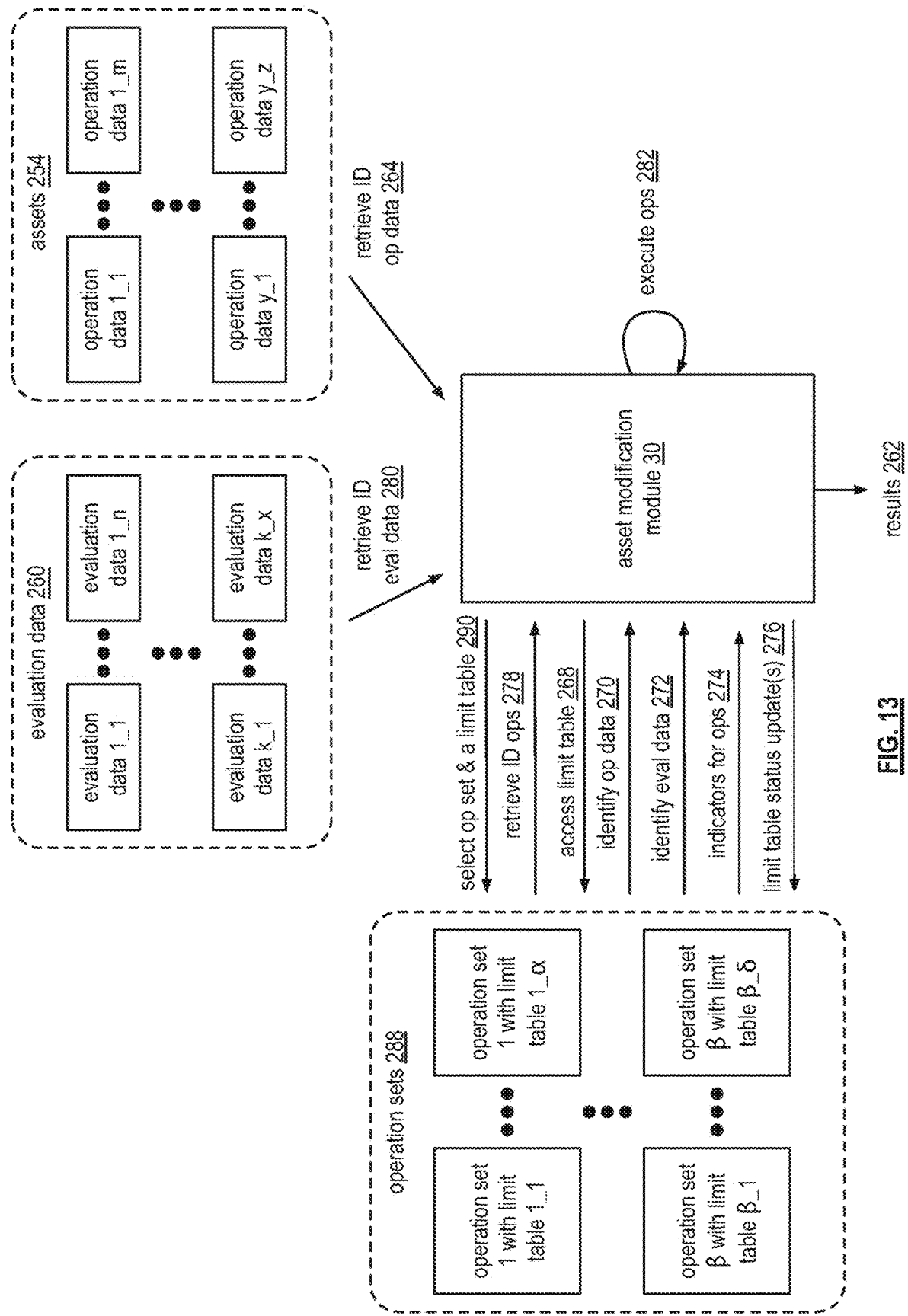
FIG. 13 is a schematic block diagram of another example of an asset modification module modifying an asset in accordance with the present invention.

FIG. 13 is a schematic block diagram of another example of an asset modification module 30 modifying an asset. In this example, the asset modification module 30 selects one of the assets 254 to manage and retrieves the operational data 264 regarding the asset in accordance with a selection process. The asset modification module 30 also selects 290 an operation set 288 with included limit table from a plurality of operation sets with included limit tables. In this example, an operation set 288 has its own limit table, as such the operation set (e.g., set of operations that may be performed) is paired with a limit table.

The asset modification module 30 accesses the selected limit table 268 to retrieve one or more rows of information 270 (e.g., a row of information corresponds to information regarding an operation, which may be in a particular sequence order). The asset modification module 30 interprets the information to identify one or more evaluation data 272 and retrieves 280 the corresponding evaluation data 260. The asset modification module 30 further interprets the information to identify indicators 274 (e.g., trigger, detrigger, activate, deactivate, etc.). The asset modification module 30 also interprets the information to identify one or more operations from the operation set 288.

Having retrieved indicators and the operation(s), the asset modification module 30 analyzes the retrieved evaluation data 260 in light of the indicators. When a trigger indicator is met, the operation is triggered and the status of the operation within the limit table is updated accordingly 276. When an activate indicator is met, the operation is activated for execution and the status of the operation within the limit table is updated accordingly 276. The asset modification module 30 executes an activated operation 282 in accordance with the indicators of the limit table to produce a partial modification resultant.

The asset modification module 30 continues to access the limit table, identify operation data 270, identify evaluation data 272, retrieve indicators 274, identify operations, and execute the operations 282 in accordance with the identifiers. Once the modification of the asset is closed, the asset modification module 30 outputs an asset modification result 262.

Figure 14:
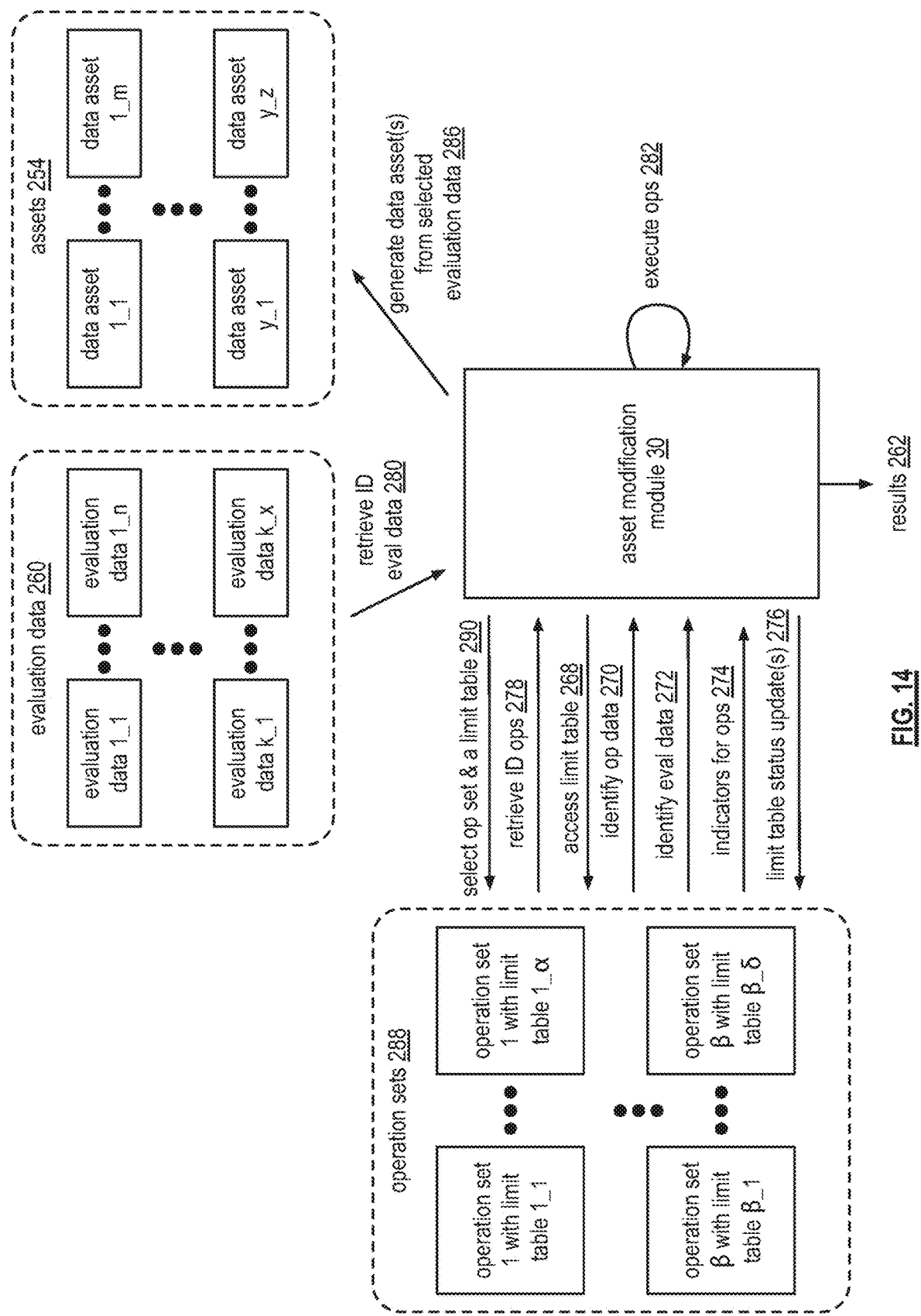
FIG. 14 is a schematic block diagram of another example of an asset modification module modifying an asset in accordance with the present invention.

FIG. 14 is a schematic block diagram of another example of an asset modification module 30 modifying an asset (e.g. creating the asset or adding to the asset 286). In this example, the asset modification module 30 selects one of the assets 254 to create or add to and uses this information to select an operation set and corresponding limit table 290 from a plurality of operation sets and corresponding limit tables 288.

The asset modification module 30 accesses the selected limit table 268 to retrieve one or more rows of information 270 (e.g., a row of information corresponds to information regarding an operation, which may be in a particular sequence order). The asset modification module interprets the information to identify one or more evaluation data 272 and retrieves the corresponding evaluation data 280. The asset modification module 30 further interprets the information to identify indicators 274 (e.g., trigger, detrigger, activate, deactivate, etc.). The asset modification module 30 also interprets the information to identify one or more operations from the set of operations 288.

Having retrieved indicators and the operation(s), the asset modification module 30 analyzes the retrieved evaluation data. When a trigger indicator is met, the operation is triggered and the status of the operation within the limit table is updated accordingly 276. When an activate indicator is met, the operation is activated to create and/or add to the asset and the status of the operation within the limit table is updated accordingly 276.

The asset modification module 30 continues to access the limit table 268, identify operation data 270, identify evaluation data 272, retrieve indicators 274, identify operations, and execute the operations 282 in accordance with the identifiers to create and/or add to the asset. Once the modification of the asset is closed, the asset modification module 30 outputs an asset modification result 282 (e.g., the generated or updated asset).

Figure 15:
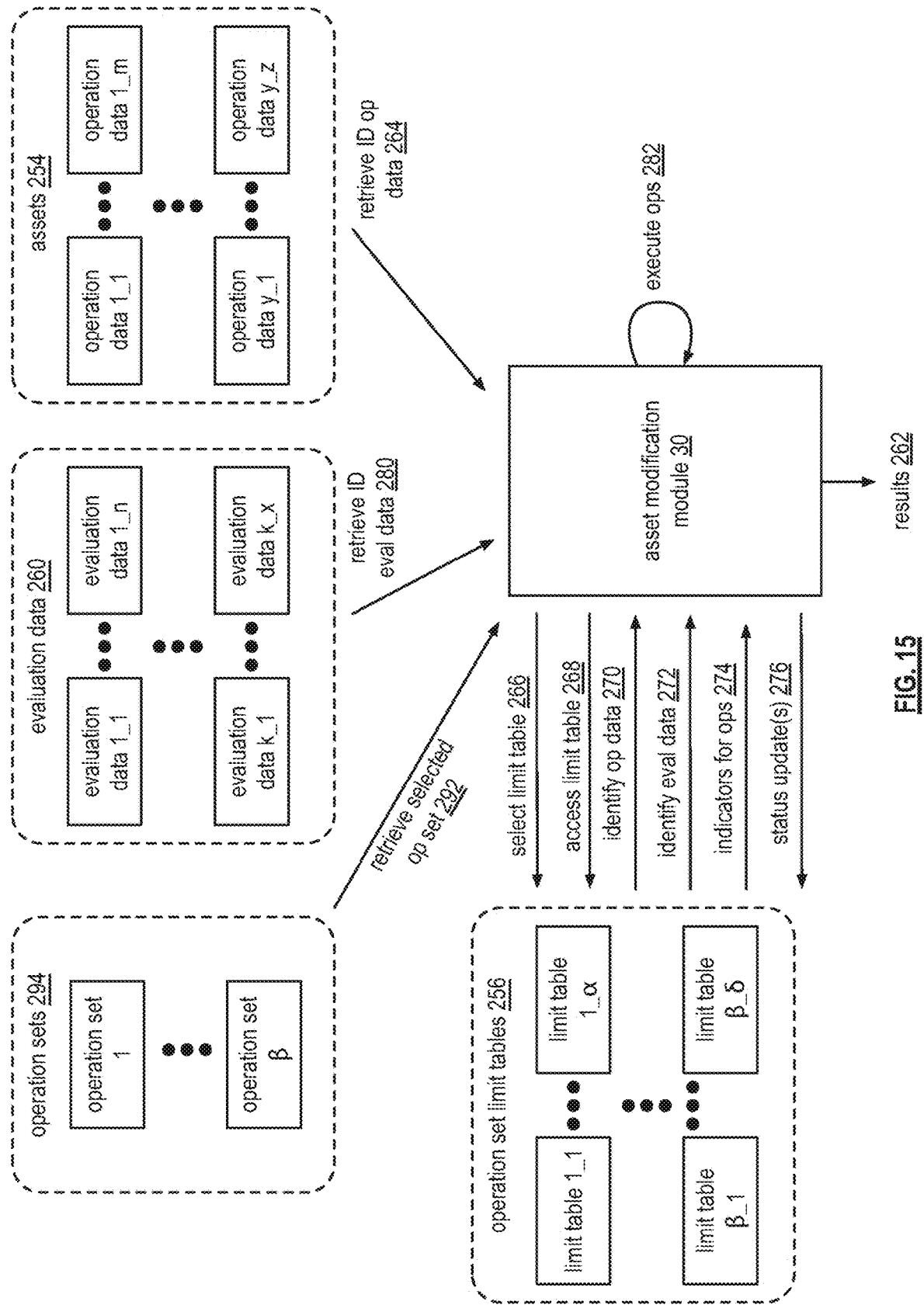
FIG. 15 is a schematic block diagram of another example of an asset modification module modifying an asset in accordance with the present invention.

FIG. 15 is a schematic block diagram of another example of an asset modification module 30 modifying an asset. In this example, the asset modification module 30 selects one of the assets 254 to manage and retrieves the operational data 264 regarding the asset in accordance with a selection process. The asset modification module 30 also selects an operation set from a pool or operation sets 294 and selects a limit table 266 from a pool of limit tables 256.

The asset modification module 30 accesses the selected limit table 268 to retrieve one or more rows of information 270 (e.g., a row of information corresponds to information regarding an operation, which may be in a particular sequence order). The asset modification module interprets the information to identify one or more evaluation data 272 and retrieves the corresponding evaluation data 280. The asset modification module 30 further interprets the information to identify indicators 274 (e.g., trigger, detrigger, activate, deactivate, etc.). The asset modification module 30 also interprets the information to identify one or more operations from the selected operation set 294.

Having retrieved indicators and the operation(s), the asset modification module 30 analyzes the retrieved evaluation data 260 in light of the indicators. When a trigger indicator is met, the operation is triggered and the status of the operation within the limit table is updated accordingly 276. When an activate indicator is met, the operation is activated for execution and the status of the operation within the limit table is updated accordingly 276. The asset modification module 30 executes an activated operation 282 in accordance with the indicators of the limit table to produce a partial modification resultant.

The asset modification module 30 continues to access the limit table 268, identify operation data 270, identify evaluation data 272, retrieve indicators 274, identify operations, and execute the operations 282 in accordance with the identifiers. Once the modification of the asset is closed, the asset modification module 30 outputs an asset modification result 262.

Figure 16:
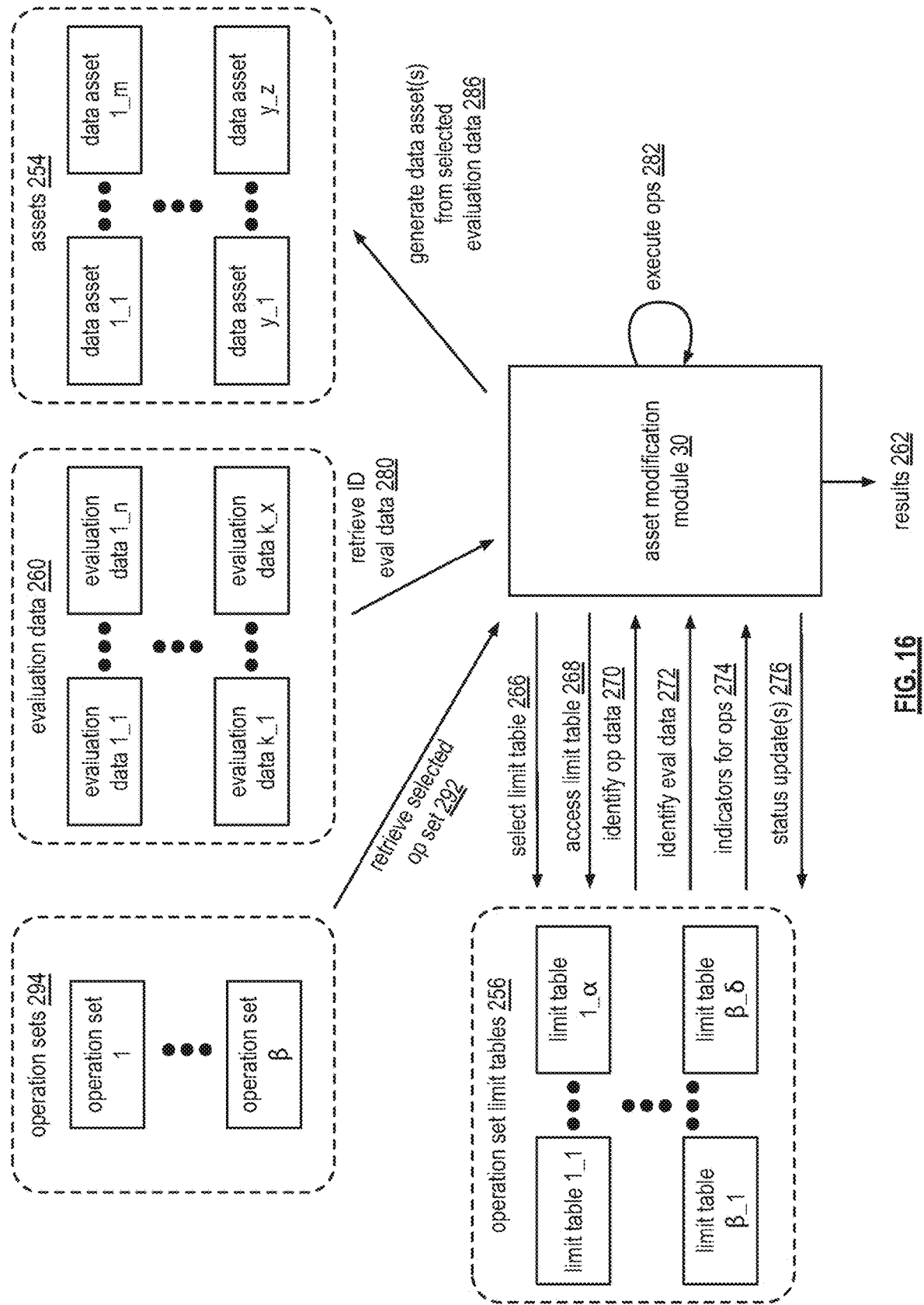
FIG. 16 is a schematic block diagram of another example of an asset modification module modifying an asset in accordance with the present invention.

FIG. 16 is a schematic block diagram of another example of an asset modification module 30 modifying an asset (e.g. creating the asset or adding to the asset 286). In this example, the asset modification module 30 selects one of the assets 254 to create or add to and uses this information to select an operation set from a pool of operation sets 294 and to select a limit table 266 from a pool of limit tables 256.

The asset modification module 30 accesses the selected limit table 268 to retrieve one or more rows of information 270 (e.g., a row of information corresponds to information regarding an operation, which may be in a particular sequence order). The asset modification module 30 interprets the information to identify one or more evaluation data 272 and retrieves the corresponding evaluation data 280. The asset modification module 30 further interprets the information to identify indicators 274 (e.g., trigger, detrigger, activate, deactivate, etc.). The asset modification module 30 also interprets the information to identify one or more operations from the set of operations 294.

Having retrieved indicators and the operation(s), the asset modification module 30 analyzes the retrieved evaluation data 260. When a trigger indicator is met, the operation is triggered and the status of the operation within the limit table is updated accordingly 276. When an activate indicator is met, the operation is activated to create and/or add to the asset and the status of the operation within the limit table is updated accordingly 276.

The asset modification module 30 continues to access the limit table 266, identify operation data 270, identify evaluation data 272, retrieve indicators 274, identify operations 270, and execute the operations 282 in accordance with the identifiers to create and/or add to the asset. Once the modification of the asset is closed, the asset modification module 30 outputs an asset modification result 262 (e.g., the generated or updated asset).

Figure 17:
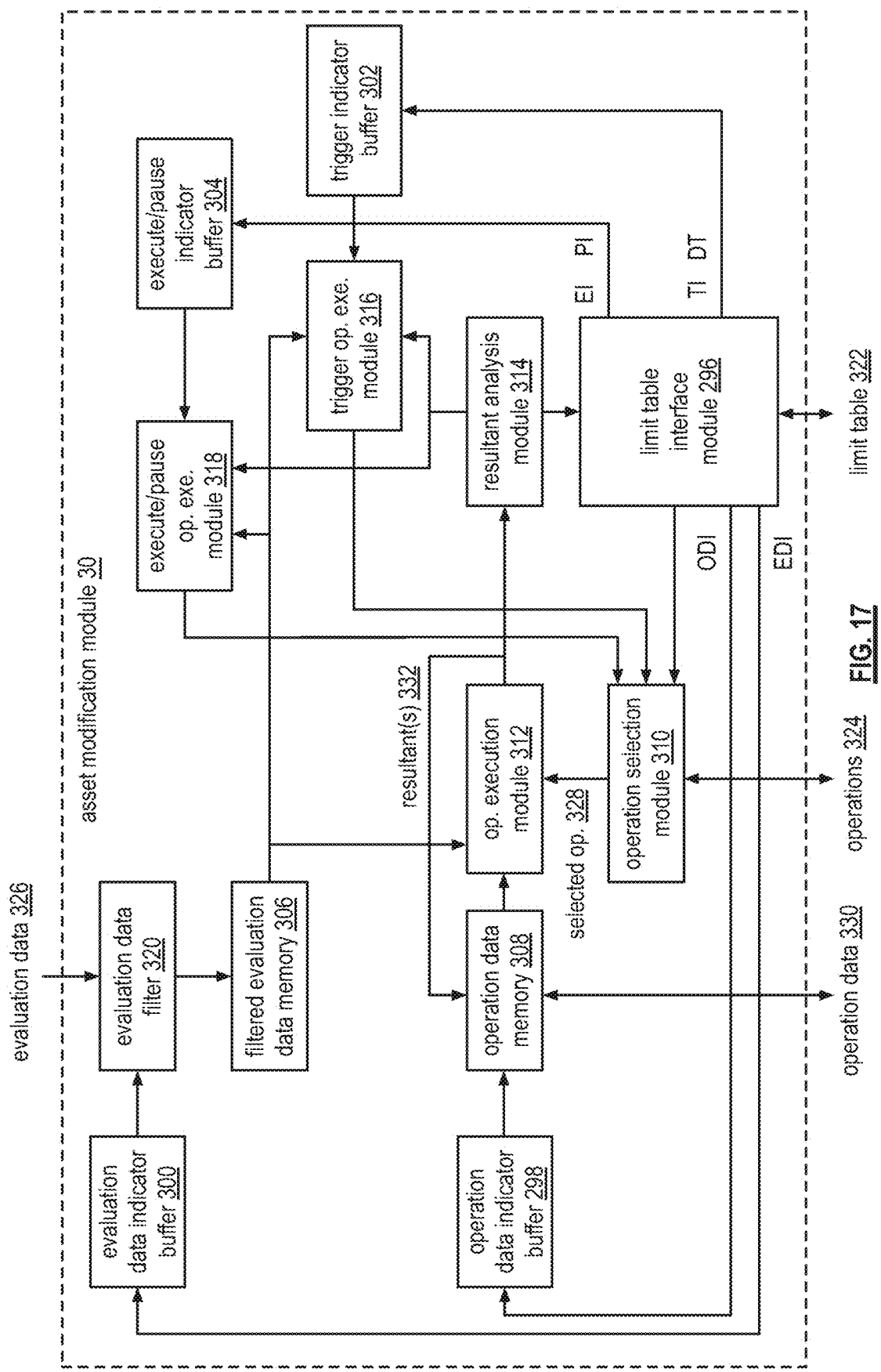
FIG. 17 is a schematic block diagram of another example of an asset modification module modifying an asset in accordance with the present invention.

FIG. 17 is a schematic block diagram of another embodiment of an asset modification module 30 that includes a limit table interface module 296, a plurality of indicator buffers 298-304, memory 306-308, an operation selection module 310, an operation execution module 312, a resultant analysis module 314, a trigger operation execution module 316, an execute/pause (activate/deactivate) operation execution module 318, and an evaluation data filter 320. The indicator buffers 298-304 include an operation data indicator buffer 298, an evaluation data indicator buffer 300, a trigger indicator buffer 302, and an execute/pause (activate/deactivate) indicator buffer 304. The memory 306-308 stores filtered evaluation data 306, operation data 308, and may further store the resultant(s) of the operation execution module 312. Note that each of the modules may be implemented as a software module executable by a processing module, may be implemented as a hard coded module, and/or may be implemented as a firmware module (e.g., a combination of software and hardware).

In an example of operation, the limit table interface module 296 interfaces with a selected limit table 322 to retrieve one or more rows of information, where the per row information includes sequence (ordering), operation identifier (ID), one or more trigger indicators (TI), one or more detrigger indicators (DT), evaluation data indicators (EDI), execute (or activate) indicators (EI), pause (or deactivate) indicators (PI), operational data indicators (ODI), current operation status, and/or execution module selection. The one or more rows of information will correspond to the present and/or next sequences of the asset modification process. For example, when commencing the asset modification process, the limit table interface module 296 will retrieve the one or more rows of information with a sequence number of 0. As another example, when the asset modification process is in a sequence transition state, the limit table interface module 296 will retrieve the one or more rows of information for the next possible sequence, or sequences. Alternatively, the limit table interface module 296 may retrieve row information from the limit table 322 from one row at a time to all rows of the limit table 322.

The limit table interface module 296 provides the retrieved indicators to the respective indicator buffers 298-304 for temporary storage therein. For example, the limit table interface module 296 provides the trigger indicator(s) and the detrigger indicator(s) to the trigger indicator buffer 302; provides the execute (activate) indicator(s) and the pause (deactivate) indicator(s) to the execute/pause indicator buffer 304; provides the evaluation data indicator(s) to the evaluation data buffer 300; and provides the operation data indicator(s) to the operation data indicator buffer 298. The limit table interface module 296 provides the operation ID of the operation data indicator(s) to the operation selection module 310.

The operation selection module 310 retrieves one or more operations 324 based on the operation ID(s) and temporarily stores them. The operation selection module 310 may retrieve the operation(s) 324 from a pool of operations, from the limit table that includes in the operations, and/or from an operation set identified by the limit table. Further, the operation selection module 310 may retrieve the operation 324 as an algorithm for execution by the operation execution module 312. For example, the operation 324 may be a logic function, a mathematical function, an algorithm, and/or an operational instruction. As more specific examples but far from an exhaustive list, the operation 324 is an algorithm to purchase stock; is an algorithm to sell sporting event tickets; is an algorithm to update a file on a person with newly found evaluation data; is an algorithm to determine when to place a purchase order for a component of a manufactured product; is an algorithm to generate an alarm when the national weather service has issued a severe storm warning for a region; and/or is a function to change the formatting of a selected evaluation data.

The evaluation data filter 320 retrieves evaluation data 326 based on the evaluation data indicator(s) and filters the data in accordance with the evaluation data indicator(s). The evaluation data filter 320, which functions as previously described with reference to FIGS. 7-8A, provides filtered evaluation data to the filtered evaluation data memory 306 for storage therein.

The trigger operation execution module 316 functions like the wake-up sleep module of FIGS. 7 and 8 to interpret the filtered evaluation data in light of the trigger indicator(s) to determine whether to trigger an operation. When the operation is to be triggered, the trigger operation execution module 316 provides a trigger indicator to the operation selection module 310. The operation selection module 310 records the triggering of the operation and may load the operation into the operation execution module 312 depending on current use of the operation execution module 312. For instance, if this is the only operation triggered and no other operations are activated, then the operation selection 310 may load the operation 328 into the execution module 312. If, however, the execution module 312 is executing an operation, the operation selection module 310 will wait to load the operation 328 into the execution module 312.

The execute/pause operation execution module 318 functions like the execute activate/deactivate module of FIGS. 7 and 8 to interpret the filtered evaluation data in light the activate (execute) indicator(s) to determine whether to activate an operation. When the operation is to be activated, the execute/pause operation execution module 318 provides an activation indicator to the operation selection module 310, which it records. The operation selection module 310 controls program execution, interrupts, and multitasking for the operation execution module, such that the operation execution module 310 may execute one or more operations efficiently. As such, when an operation is activated, the operation selection module 310 enables the operation execution module 312 to execute the operation. Alternatively, the asset modification module 30 may include a plurality of operation execution modules, where the operation selection module 310 selects with operation execution module to execute which activated operation.

The operation execution module 312 executes a selected operation 328 on operation data 330, filtered evaluation data, and/or a previous resultant to produce a resultant 332. The resultant 332 corresponds to a modification of the asset. For example, purchase stock, sell stock, sell sporting event tickets, buy sporting event tickets, update a person's file, issue a severe weather warning, etc.

The resultant analysis module 314 analyzes the resultant 332 to determine whether to deactivate and/or detrigger the present operation, to place the asset modification process in a transition state, to transition the asset modification process to a next sequence state, etc. In addition, the resultant analysis module 314 provides status information to the limit table interface module 296 such that it can update the status field within the limit table 322 regarding the present operation.

For multitasking of several rows of information of a limit table 322, a user device or service provider device may include multiple asset modification modules 30, each processing one or more assigned rows of information. Additionally, or in the alternative, the asset modification module 30 manages multitasking of the operations at each level of the module (e.g., the evaluation data filter 320, operation execution module 312, the execute/pause operation execution module 318, the trigger operation execution module 316, etc.). As another alternative, the asset modification module 30 includes a plurality of evaluation data filters, a plurality of operation execution modules, a plurality of execute/pause operation execution modules, and/or a plurality of trigger operation execution modules.

Figure 17A:
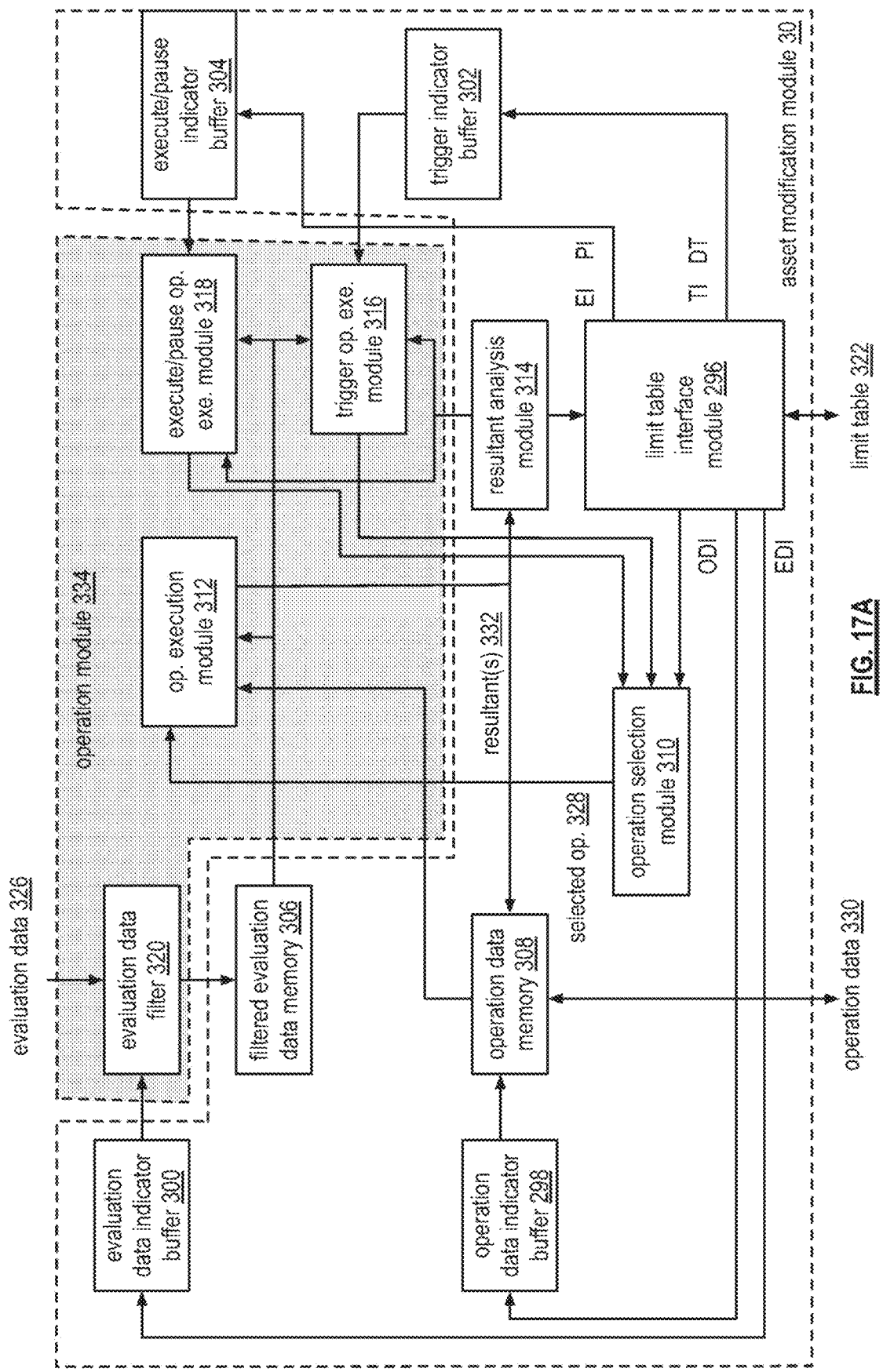
FIG. 17A is a schematic block diagram of another embodiment of an asset modification module coupled to an operation module in accordance with the present invention.

FIG. 17A is a schematic block diagram of another embodiment of an asset modification module 30 operably coupled to an operation module 334. The asset modification module 30 includes a limit table interface module 296, a plurality of indicator buffers 298-304, memory 306-308, an operation selection module 310, and a resultant analysis module 314. The indicator buffers 298-304 include an operation data indicator buffer 298, an evaluation data indicator buffer 300, a trigger indicator buffer 302, and an execute/pause (activate/deactivate) indicator buffer 304. The memory 306-308 stores filtered evaluation data 306, operation data 308, and may further store the resultant(s) of the operation execution module 312. Note that each of the modules may be implemented as a software module executable by a processing module, may be implemented as a hard coded module, and/or may be implemented as a firmware module (e.g., a combination of software and hardware). The operation module 334 includes an operation execution module 312, a trigger operation execution module 316, an execute/pause (activate/deactivate) operation execution module 318, and an evaluation data filter 320.

In an example of operation, the asset modification module 30 identifies a selected operation module 334 and interfaces with it. The interfacing may be locally (e.g., via a computing device bus structure, an application program interface (API), etc.) or may be remotely (e.g., via a WLAN interface, a LAN interface, a WAN interface, an Internet interface, etc.). Once the asset modification module 30 is operably coupled to the selected operation module 334, the coupled pair functions in a similar manner as the asset modification module 30 of FIG. 17. Note that the asset modification module 30 may be operably coupled to multiple selected operation modules at a given time using a multitasking function.

Figure 18:
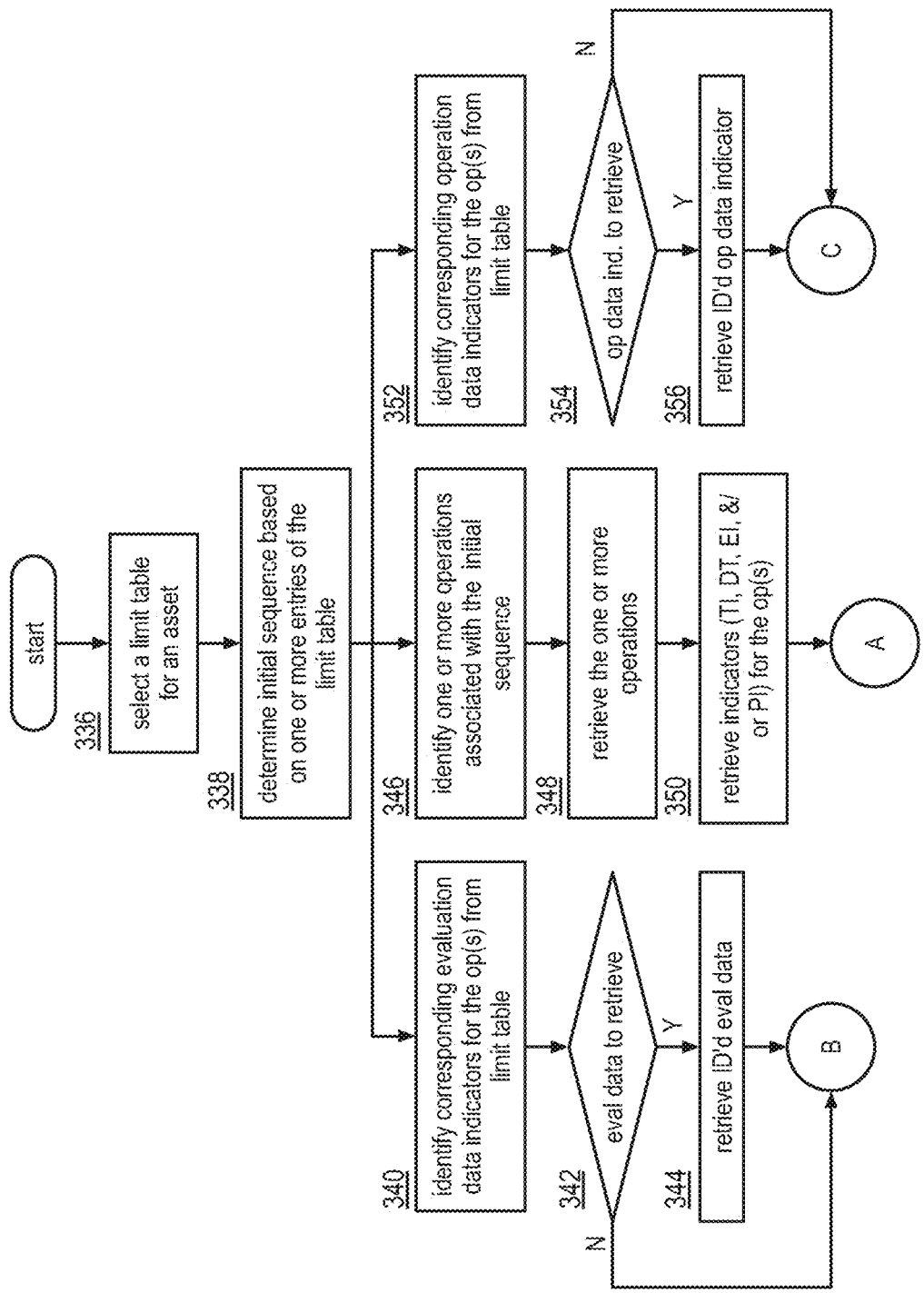
FIGS. 18-20 are a logic diagram of another method for modifying an asset in accordance with the present invention.
Figure 19:
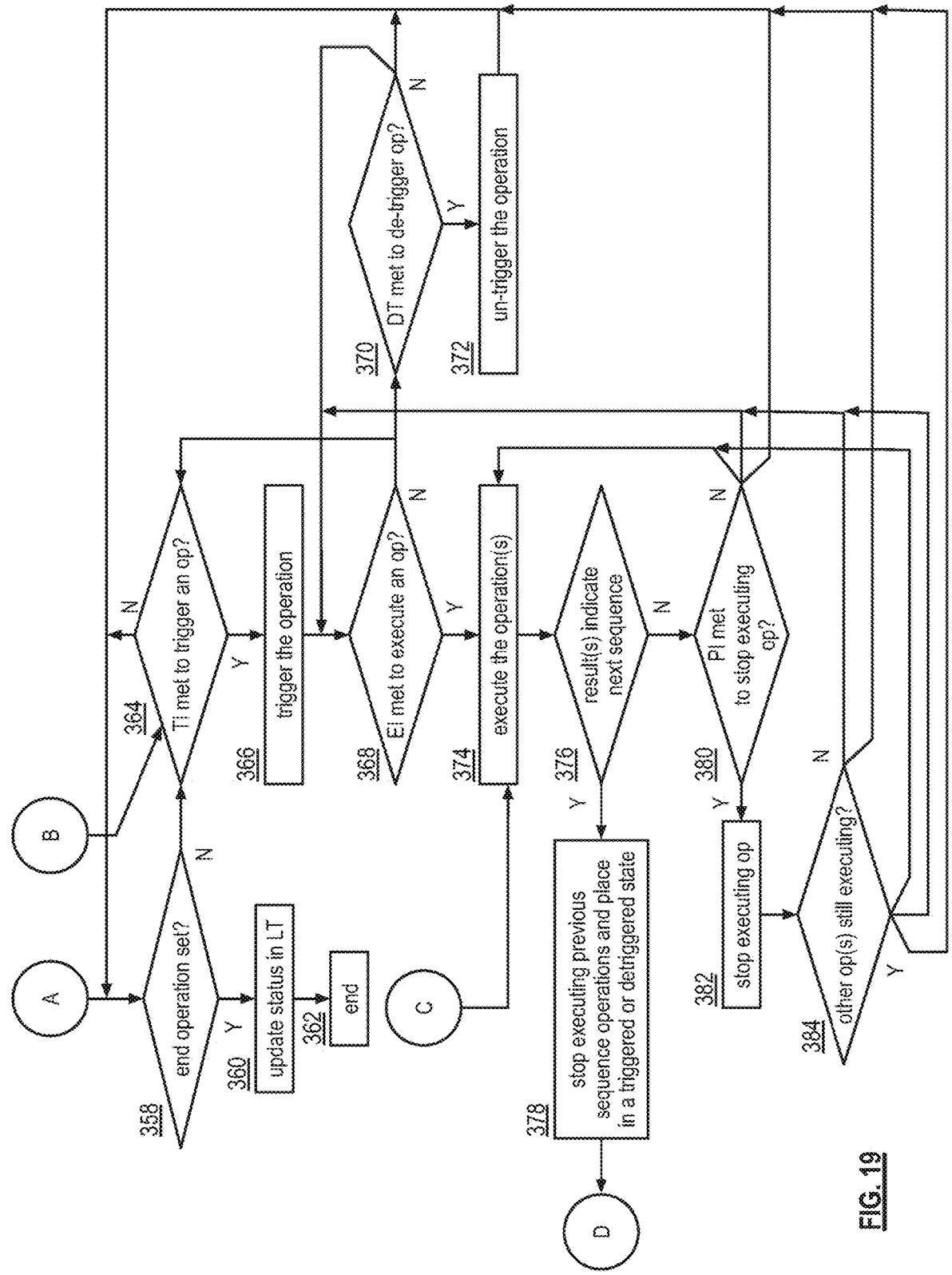
Figure 20:
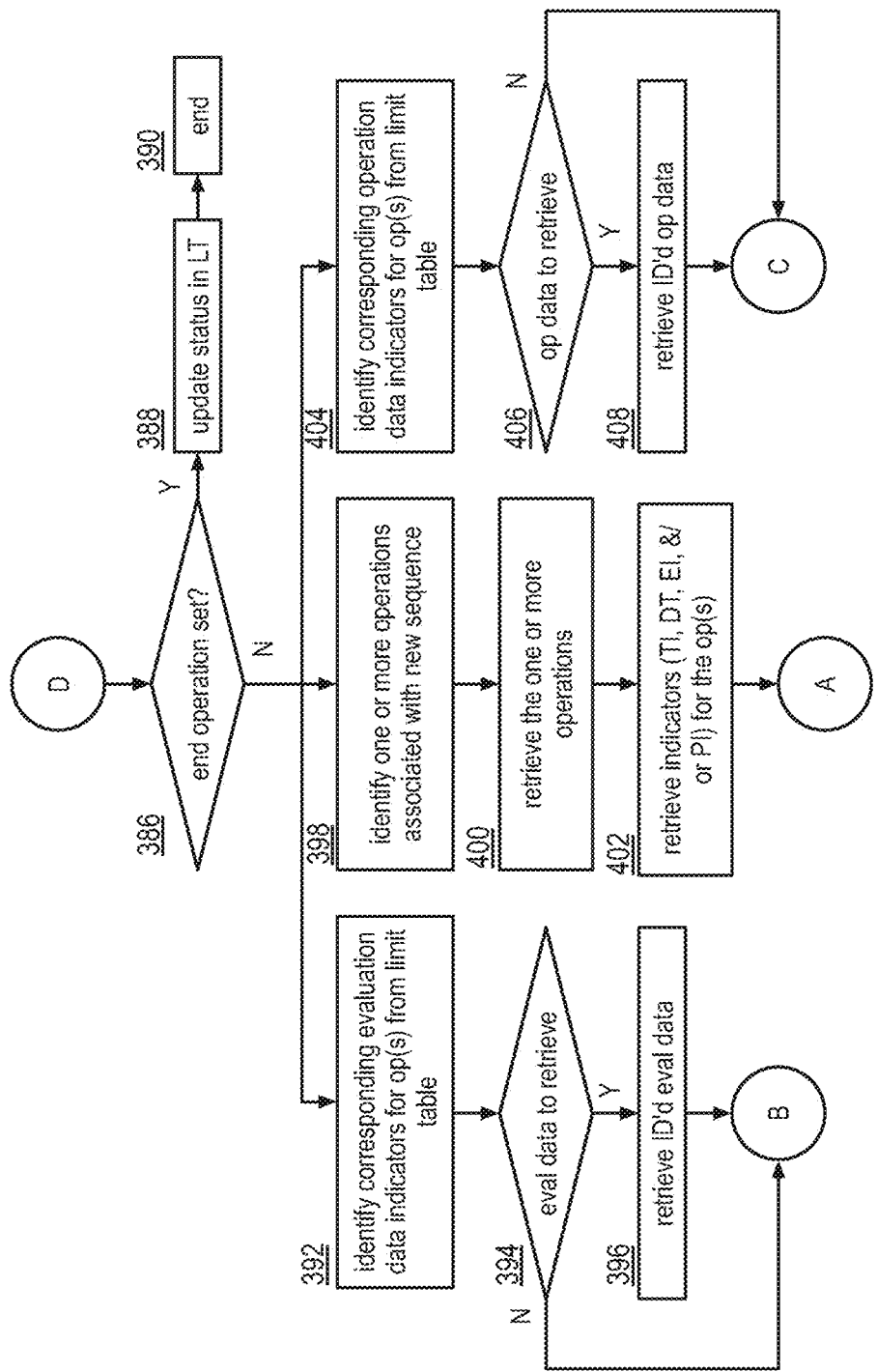

FIGS. 18-20 are a logic diagram of another method for modifying an asset in accordance that may be performed by the asset modification module of FIGS. 17 and/or 17A. The method begins with the asset modification module selecting a limit table for a particular asset 336. The method continues with the asset modification module determining an initial sequence based on one or more entries of the limit table 338. For example, the asset modification module identifies the operations having a sequence number of 0 and may further identify the operations having the next one or more sequence numbers. As a specific example, the asset modification module may identify the sequence number and ordering from information contained in the limit table or it may determine it based on the operations, evaluation data being analyzed, and/or the indicators.

The method then branches into three branches. In the first branch, the asset modification module identifies evaluation data indicators for the operation(s) of the initial sequence (e.g., sequence 0) from the limit table 340. This branch continues with the asset modification module determining whether there is evaluation data to retrieve 342. If yes, the branch continues with the asset modification module retrieving the identified evaluation data 344. If not, or after the evaluation data is retrieved, this branch continues on FIG. 19.

In the second branch, the asset modification module identifies one or more operations associated with the initial sequence 346. For example, and with reference to FIGS. 10A-10C, the asset modification module identifies operations A and B. This branch continues with the asset modification module retrieving the one or more operations 348. For example, the asset modification module of FIG. 17 may retrieve operation instructions of an algorithm corresponding to the operation(s) of the initial sequence. As another example, the asset modification module of FIG. 17A establishes an operable coupling with the operation modules of the initial sequence. This branch continues with the asset modification module retrieving the indicators (trigger, detrigger, activate, and deactivate) for each of the operations 350. This branch then continues on FIG. 19.

In the third branch, the asset modification module identifies operation data indicators for the selected operations of the initial sequence 352. This branch continues with the asset modification module determine whether there is at least one operation data indictor (e.g., operation data ID, data allotment, and/or data operands) to retrieve 354. For example, if the operations for the initial sequence are to open an asset modification process of the limit table, there may not be any operation data indicators to retrieve. If there is an operation data indicator to retrieve, this branch continues with the asset modification module retrieving it 356. Once the asset modification module has, or if there are no operation data indicators to retrieve, this branch continues on FIG. 19.

On FIG. 19, the second branch continues with the asset modification module determining whether the operation set is complete 358. For example, the asset modification module is determining whether the asset modification process for the selected asset is being closed. If yes, the method continues with the asset modification module updating 360, if needed, status fields in the limit table indicating that the asset modification process is being closed 362. If the asset modification process is not being closed, the method continues with the asset modification module and/or the selected operation module determining whether a trigger indicator for an operation is met 364. If not, the method remains in a loop until the asset modification process is closed or an operation is triggered. Note that the first branch of FIG. 18 ties into the step of determining whether a trigger indicator is met.

When a trigger indicator is met, the method continues with the asset modification module and/or selected operation module triggering the operation 366. The method continues with the asset modification module and/or selected operation module determining whether an execution (or activate) indicator is met 368. If not, the method branches back to the step of determining whether a trigger indicator is met for another operation 364. Also, for the current triggered operation, the method continues with the asset modification module and/or selected operation determining whether a detriggering indicator is met 370. If yes, the current operation is detriggered 372. If not, the method loops back to determining whether an activate indicator is met 368.

When, for a triggered operation, an activate indicator is met, the method continues with the asset modification module and/or selected operation executing the operation to produce a result 374. The method continues with the asset modification module (via the results analysis module) determining whether the results indicate whether the asset modification process should proceed to the next sequence 376. If yes, the method continues with the asset modification module and/or selected operation module stopping execution of the operations of the current sequence state and placing them in a triggered state or a detriggered state depending on the next sequence 378. For example, if the next sequence could be a repeat of the current sequence, then the operations are placed in the triggered state. If, however, the next sequence could not be a repeat of the current sequence, then the operations are placed in a detriggered state. Regardless of the state of the operations are placed in, the method continues on FIG. 20.

If the results of the executed operation do not indicate transitioning to the next sequence state, the method continues with the asset modification module and/or the selected operation module determining whether a deactivate (or pause) indicator is met for the operation 380. If not, the method continues in three branch back paths. The first branch back path is for the operation being executed, which loops back to the step of executing the operation 374. The second branch back path is for triggered operations, which loops back to the step of determining whether an activation indicator is met 368. The third branch back path is for other operations of the current sequence that are not yet triggered, which loops back to the step of determining whether a trigger indicator is met 358.

If a deactivate indicator is met, the method continues with the asset modification module and/or the selected operation module stopping execution of the operation 382. The method then continues with the asset modification module determining whether other operations are still executing (e.g., are still activated) 384. If not, the method continues in two branch back paths. The first branch back path is for triggered operations, which loops back to the step of determining whether an activation indicator is met 368. The second branch back path is for other operations of the current sequence that are not yet triggered, which loops back to the step of determining whether a trigger indicator is met 358.

When another operation is still executing, the method continues in three branch back paths. The first branch back path is for the operation being executed, which loops back to the step of executing the operation 374. The second branch back path is for triggered operations, which loops back to the step of determining whether an activation indicator is met 368. The third branch back path is for other operations of the current sequence that are not yet triggered, which loops back to the step of determining whether a trigger indicator is met 358.

When the asset modification process is in a transition state, the method continues on FIG. 20 with the asset modification module determining whether end the operation set (e.g., close the asset modification process) 386. If yes, the method continues with the asset modification module updating status 388 in the limit table and outputting a resultant, if any 390.

If the asset modification process is not being closed, the method continues with the asset modification module transitioning the process to the next sequence, which branches into three branches. In the first branch, the asset modification module identifies evaluation data indicators for the operation(s) of the next sequence, or sequences, from the limit table 392. This branch continues with the asset modification module determining whether there is evaluation data to retrieve 394. If yes, the branch continues with the asset modification module retrieving the identified evaluation data 396. If not, or after the evaluation data is retrieved, this branch continues on FIG. 19.

In the second branch, the asset modification module identifies one or more operations associated with the next sequence(s) 398. This branch continues with the asset modification module retrieving the one or more operations 400. For example, the asset modification module of FIG. 17 may retrieve operation instructions of an algorithm corresponding to the operation(s) of the initial sequence. As another example, the asset modification module of FIG. 17A establishes an operable coupling with the operation modules of the initial sequence. This branch continues with the asset modification module retrieving the indicators (trigger, detrigger, activate, and deactivate) for each of the operations 402. This branch then continues on FIG. 19.

In the third branch, the asset modification module identifies operation data indicators for the selected operations of the next sequence(s) 404. This branch continues with the asset modification module determine whether there is at least one operation data indictor (e.g., operation data ID, data allotment, and/or data operands) to retrieve 406. If there is an operation data indicator to retrieve, this branch continues with the asset modification module retrieving it 408. Once the asset modification module has, or if there are no operation data indicators to retrieve, this branch continues on FIG. 19.

Figure 21:
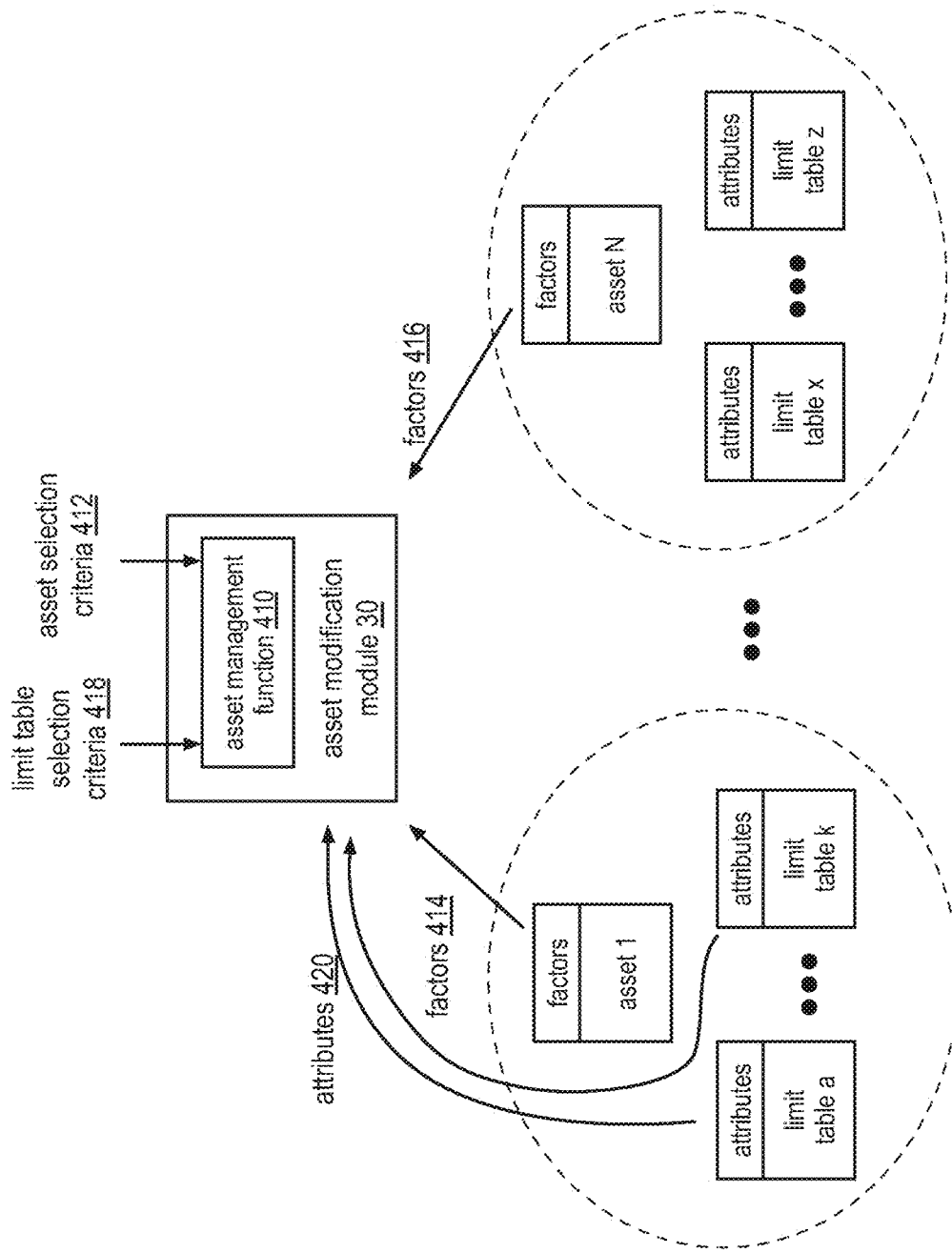
FIG. 21 is a schematic block diagram of an example of an asset modification module selecting a limit table for asset modification in accordance with the present invention.

FIG. 21 is a schematic block diagram of an example of an asset modification module 30 selecting a limit table for asset modification. The asset modification module 30 includes an asset management function 410 (e.g., software and/or hardware module), which functions to select an asset to modify and a limit table to provide the asset modification process.

In an example of selecting an asset, the asset management function 410 receives asset selection criteria 412, which includes, but is not limited to, an asset ID, time of day, a time period, evaluation data analysis for a particular result, etc. The asset selection criteria 412 may be a user input and/or may be automatically generated. For example, asset selection criteria 412 may include an asset ID, a start time of day, an end time of day, and day of week. As a more specific example, the asset selection criteria 412 may include an asset ID for a particular stock for which an asset modification process is to be engaged from 9 AM to 4 PM eastern time on Monday through Friday. As another example, the asset selection criteria 412 may include analysis of an inventory list for a product, where, when an inventory level falls below a certain threshold for a particular component, identify the particular component as the asset for an asset modification process. As yet another example, asset selection criteria 412 may include availability of certain evaluation data and may further include an evaluation data analysis criterion.

The asset management function 410 compares the asset selection criteria 412 with factors for assets 414-416 of a pool of assets to determine whether an asset modification process should be engaged for a particular asset. The factors 414-416 include, but are not limited to, a type of asset, modification timing (e.g., time of day, inventory depletion, etc.), evaluation data sources of interest availability, evaluation data analysis result (e.g., pattern mapping, trend detection, value thresholds, comparative analysis, etc.). As an example, asset selection criteria 412 may include availability of a particular evaluation data source(s) and an asset factor includes, when the particular evaluation data is available, engage an asset modification process for the asset. As another example, asset selection criteria 412 include an evaluation data analysis that produces a result that correlates with an evaluation data analysis result of the factors of an asset 414-416.

Once an asset is selected for modification, the asset management function 410 selects a limit table based on limit table selection criteria 418 and attributes of limit tables 420 associated with the selected asset. The limit table selection criteria 418 include user inputs and/or auto-generated inputs regarding, but not limited to, desired risk level, desired level of evaluation data relevancy, asset modification philosophy, desired reliability level, desired level of evaluation data mapping (to trends, patterns, values, transitions, slopes, quantities, pricing, availability, etc.), a desired level of performance, etc. The attributes of a limit table 420 include one or more of, but not limited to, risk level, evaluation data relevancy, asset modification philosophy, reliability level, evaluation data mapping accuracy, performance information, etc.

The risk level corresponds to a risk-reward relationship of modifying the asset. A low risk level indicates a relatively low risk that the asset will be modified in a modest favorable manner. As an example, for inventory control of a manufacturing process, the risk-reward relationship will vary based on whether price, on-hand availability, shipping, suppliers, etc. is/are a primary priority. As such, the risk level corresponds to how willing a user is to compromise adversely affecting the manufacture of a product to get a desired reward for a particular aspect of a component, or components.

The relevancy of evaluation data corresponds to how relevant the evaluation data has been in the past as a source for a predictable modification of an asset. The more predictable the modification of asset is based on analysis of a particular evaluation data, the more relevant the particular evaluation data. The relevancy of evaluation data may also include a weighting factor based on how many times the evaluation data has been accessed for modifying an asset and/or, of the times accessed, how many times has it been used to provide a predictable modification of the asset.

The reliability level corresponds to how reliable the limit table has been in producing a favorable asset modification. The more consistently the limit table produces similar asset modification results, the more reliable it is. Conversely, the more varied the asset modification results, the lower the reliability is of the limit table.

The evaluation data mapping corresponds to how close aspects (e.g., trends, patterns, values, waveform, transitions, slopes, quantities, pricing, availability, etc.) of evaluation data are to be mapped to trip a trigger indicator and/or an activation indicator. For example, if an evaluation data is being analyzed for a specific waveform, the attributed indicates how closely the waveform of the evaluation data needs to match the specific waveform to trip an indicator.

The performance level corresponds to previous performances of the limit table. The performance level may include information regarding amount of previous asset modifications, variations of previous asset modifications, average of previous asset modifications, etc.

Accordingly, for a selected asset, the asset management function 410 selects a limit table having attributes 420 that correlate to the limit table selection criteria 418. When a near exact match cannot be made (e.g., with acceptable tolerances of a few percent to tens of percent), the asset modification function 410 selects a limit table having a most favorable correlation of its attributes 420 to the limit table selection criteria 418. Further, the asset modification function 410 may have a threshold for determining a most favorable correlation of a limit table's attributes to the limit table selection criteria 418. If the threshold is not met, then the asset modification module 410 does not select a limit table. If this occurs, the asset modification module 410 may trigger generating a limit table that has attributes 420 that more favorably correlate to the limit table selection criteria 418.

Figure 22:
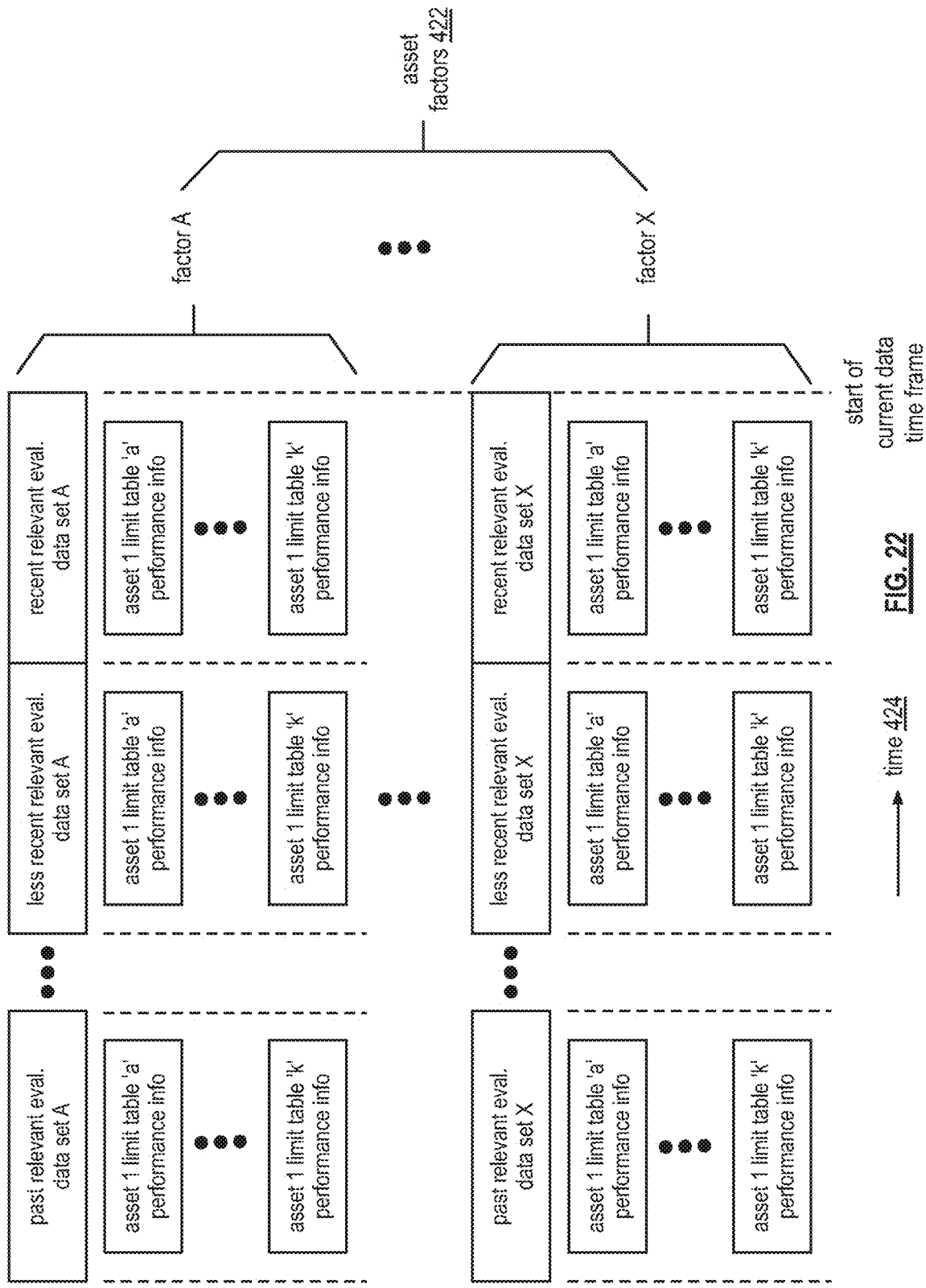
FIG. 22 is a diagram of an example of asset factors in accordance with the present invention.

FIG. 22 is a diagram of an example of an asset's factors 422, which are time varying and updated on a regular basis (e.g., by the minute, hourly, daily, etc.) based on evaluation data. In this example, the asset includes a plurality of factors 422 (A through X). A factor 422 may be determined based on performance information of various limit tables over time, where each factor corresponds to a particular evaluation data set A-X (which includes one or more evaluation data). For a given evaluation data set, its affects on each limit table for a given asset is analyzed to produce limit table performance information. As is shown in this example, limit tables "a" through 'k' for asset 1 are being processed. Note that similar processing may be done for one or more other limit tables of one or more other assets.

As is also shown, time 424 goes from left to right of the illustration (e.g., older data to the right and newer data to the left). The time is divided into frames, where the evaluation data is analyzed during a particular time frame. The duration of a time frame may vary from microseconds, seconds, minutes, hours, days, weeks, and/or years. The contribution to a factor may be weighted by giving more or less weight to more recent data. Other weighting factors may include time of day, quantity of data, source, deviations from past patterns, etc.

For factor A, the more recent set of evaluation data is analyzed for each of the limit tables a-k for asset 1 to produce performance information. The performance information includes, for a limit table, data values, patterns, volatility, slopes, deviations, pattern repeating probabilities, pattern transition tendencies, trend probabilities, trend transition tendencies, etc. and how the modification of the asset is affected. For example, certain patterns may cause the asset to be consistently modified in a particular way, while other patterns have no predictable correlation to how the asset is modified. As another example, various combinations of the performance information provides predictable modifications of an asset at a given predictability rate (e.g., 75% of the time). Such information is compiled and interpreted to generate a corresponding factor, which may include a favorable pattern, an unfavorable pattern, a desire data value, a desired slope, acceptable data volatility, etc. Further, the various factors of an asset may be determined based on the performance information. For example, modification timing may be determined based on the performance information.

The other factors are processed in a similar way to produce limit table performance information for each of the limit tables a-k for asset 1. The factors can be used to select with evaluation data sets to use, which limit table to use, etc. Note that the factors are updated by adding more recent time of data sets, by deleting older times of data sets, changing evaluation data within a set of evaluation data, changing a limit table, adding a limit table, deleting a limit table, changing user performance preferences, etc.

Figure 23:
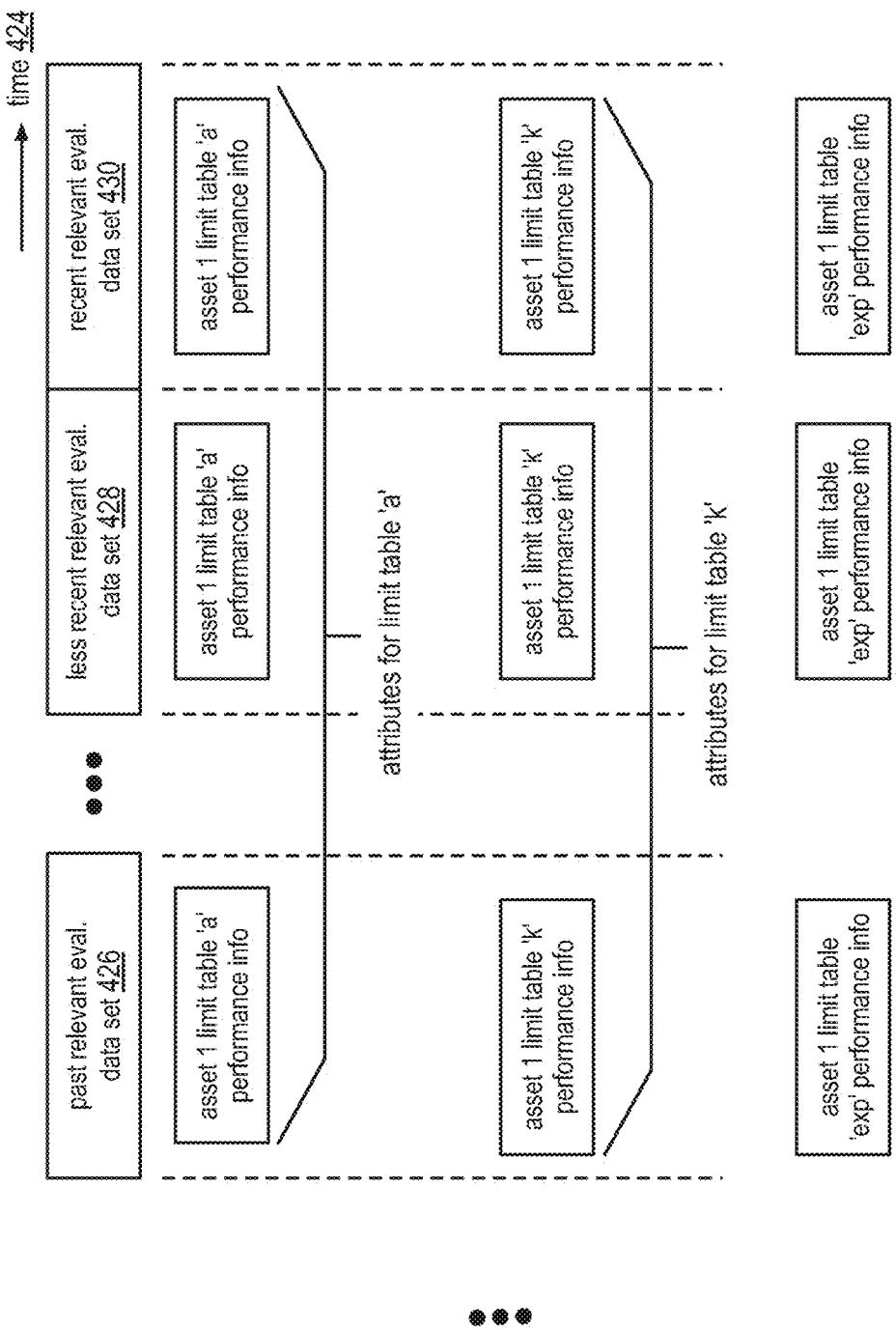
FIG. 23 is a diagram of an example of attributes in accordance with the present invention.

FIG. 23 is a diagram of an example of attributes of limit tables, which are time 424 varying and updated on a regular basis (e.g., by the minute, hourly, daily, etc.) based on evaluation data 426-430. In this example, the attributes for a limit table include a risk level, evaluation data relevancy, asset modification philosophy, reliability level, pattern mapping, etc., which, for each limit table, is determined based on the performance information of the limit table collected over time.

In addition, one or more experimental limit tables may be tested over time to determine its attributes. Depending on the quality of the attributes, the limit table may be added to a list of usable limit tables. If the quality of the attributes is not at a desired level, one or more entries of the limit may be changed, and further testing may be done to obtain a higher quality of the attributes.

Figure 24:
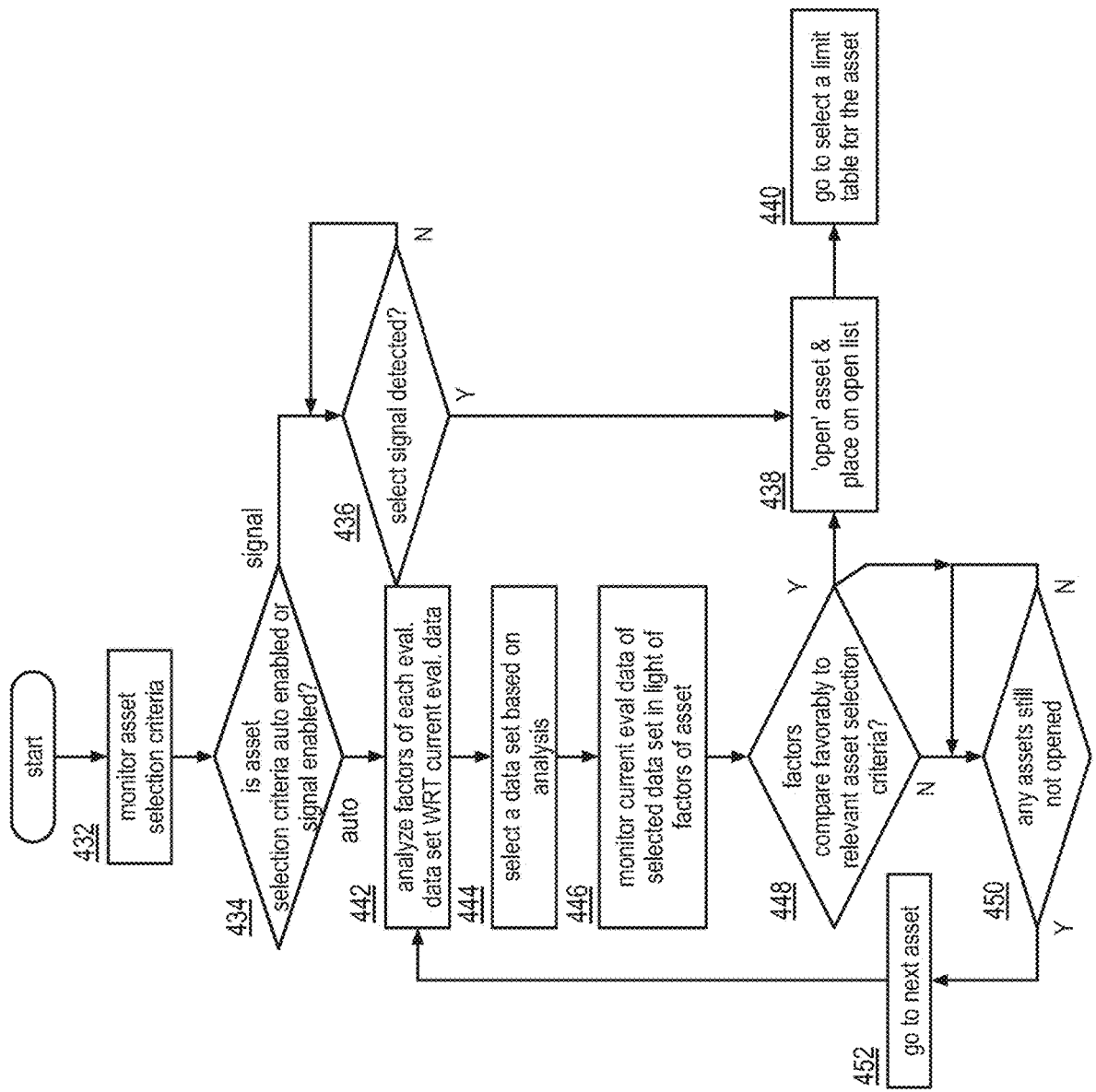
FIG. 24 is a logic diagram of a method of an asset management function in accordance with the present invention.

FIG. 24 is a logic diagram of a method of opening an asset as may be performed by an asset management function. The method begins with the asset management function monitoring asset selection criteria, which may be one or more of a user input, analysis of evaluation data, time of day, an evaluation data source, availability of new evaluation data, etc. 432. The method continues with the asset management function determining whether the asset selection is auto enabled, or signal enabled 434.

When the asset selection is signal enabled (e.g., a user provides an input to select a particular asset), the method continues with the asset management function determining whether the select signal is detected 436. Once the signal is detected, the method continues with the asset management function opening the asset and placing it on an open list (e.g., a list of assets that are currently open) 438. Alternatively, a status flag associated with the asset may be set to an open status. The method then proceeds to the selecting a limit table for the asset 440, which is discussed in FIG. 25.

When the asset selection is auto enabled, the method continues with the asset management function analyzing factors of each evaluation data set with respect to current evaluation data 442. Recall that factors include one or more of asset type, modification timing, evaluation data sources of interest, evaluation data pattern mapping, which includes favorable patterns, unfavorable patterns, desired data values, desired data slopes, acceptable data volatility, favorable comparison between evaluation data, and/or other favorable analysis of one or more evaluation data. The current evaluation data may include one or more of the data sets associated with an asset portfolio. As an example, the method may be configured to determine if a particular asset should be auto opened. In this instance, the evaluation data set(s) would be limited to the sets associated with the particular asset. As another example, the method may be configured to determine if any one or more of the assets should be opened. In this instance, the evaluation data sets would not be limited to a particular asset.

The analysis of the factors may include a mathematical operation, a logic operation, a filtering operation, a statistical operation, a combination thereof, multiple combinations thereof, and/or multiple iterations of one or more of the operations. For instance, the analysis may include an averaging function, a standard deviation function, a normalizing function, a root mean square function, weighting function, digital logic function (e.g., OR, AND, NOR, XOR, etc.), etc.

The method continues with the asset management function selecting an evaluation data set based on the analysis 444. For example, current evaluation data set A is tracking within desired tolerances of the factors for a given asset. If more than one evaluation data set is tracking within desired predictable aspects, one or more of them might be selected. For example, the asset management function may select the one that is more closely maps to desired patterns, trends, etc. As another example, the asset management function may select several evaluation data sets.

The method continues with the asset management function monitoring the current evaluation data of the selected evaluation data set(s) in light of the factors of an associated asset 446. For example, the current evaluation data is monitored for patterns, trends, etc. indicating that, in the near future (in the next few milliseconds, the next seconds, the next minutes, the next hours, the next days, the next weeks, the next months, etc.), that favorable asset modification is probable and may further indicate an indication as to a level of probability. For example, when, in the past, the evaluation data exhibited certain patterns, trends, etc. favorable asset modification occurred at a certain ratio (e.g., 10 out of 10, 6 out of 11, etc.).

The method continues with the asset management function determining whether the factors compare favorably to the relevant asset selection criteria (e.g., a set of criterion expressing a desired level of probability for each factor of interest, which may be weighted) 448. For instance, trends or patterns may be given more weight than the evaluation data being at a specific data value. When the comparison is favorable, the method continues with the asset management function opening the asset and placing it on an open list (or setting a status flag) 438. The method then proceeds to the selecting a limit table for the asset 440, which is discussed in FIG. 25.

If the comparison was not favorable, the method continues by determining whether there is another asset not open 450. If not, the method waits until one or more assets are not open. If there is at least one asset not open, the method goes to the next asset 452 and repeats the method at the analysis factors step 442.

Figure 25:
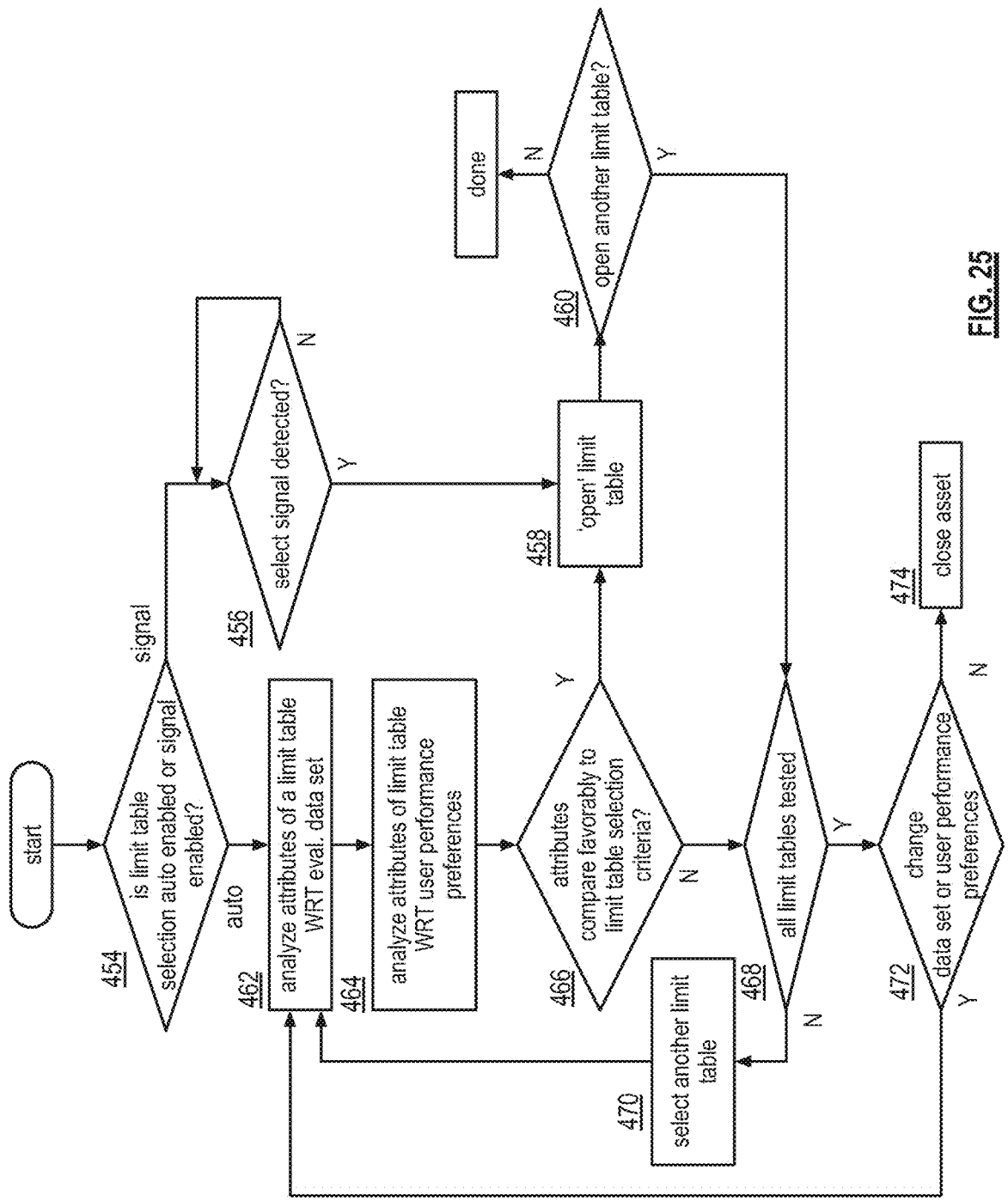
FIG. 25 is a logic diagram of a method of another asset management function in accordance with the present invention.

FIG. 25 is a logic diagram of a method of selecting a limit table for an asset as may be performed by an asset management function. The method begins with the asset management function determining whether the limit table selection is auto enabled, or signal enabled 454. When the limit selection is signal enabled (e.g., a user provides an input to select a particular asset), the method continues with the asset management function determining whether the select signal is detected 456. Once the signal is detected, the method continues with the asset management function opening the limit table 458. The method continues with the asset management function determining whether to open another limit table for the asset 460. If not, the method is complete for this asset modification process.

If the limit table selection is automated, the method continues with the asset management function analyzing attributes of one or more limit tables with respect to an evaluation data set (e.g., the selected evaluation data set) 462. Recall that the attributes include, but are not limited to, one or more of risk level, evaluation data relevancy, asset modification philosophy, reliability level (e.g., proven, unproven, works sometimes, etc.), favorable evaluation data patterns and/or trends, performance information, etc. The limit table to initially analyze may be randomly chosen, may be based on history of use for the asset, based on indicators, based on the selected evaluation data set, etc.

The method continues with the asset management function analyzing attributes of the one or more limit tables with respect to user performance preferences, which include, but are not limited to, a desired risk level, a specific asset modification philosophy, a desired reliability level, a desired level of evaluation data mapping, a desired performance level, etc. 464. Such a determination may be done by a table look up, a query-response process, receiving user inputs, etc.

The method continues with the asset management function determining whether the analysis was favorable 466. If yes, the method continues with the asset management function opening the limit table 458. The method continues with the asset management function determining whether to open another limit table for the asset 460. If not, the method is complete for this asset modification process.

If the attributes did not compare favorably, the method continues with the asset management function determining whether all limit tables have been tested 468. If not, another limit table is selected, and the process repeats as shown 470. If all of the limit tables have been tested, the method continues with the asset management function determining whether to select another evaluation data set and/or to change the user preferences 472. If not, the process is closed, and a limit table is not opened 474. If yes, the method repeats as shown.

Figure 26:
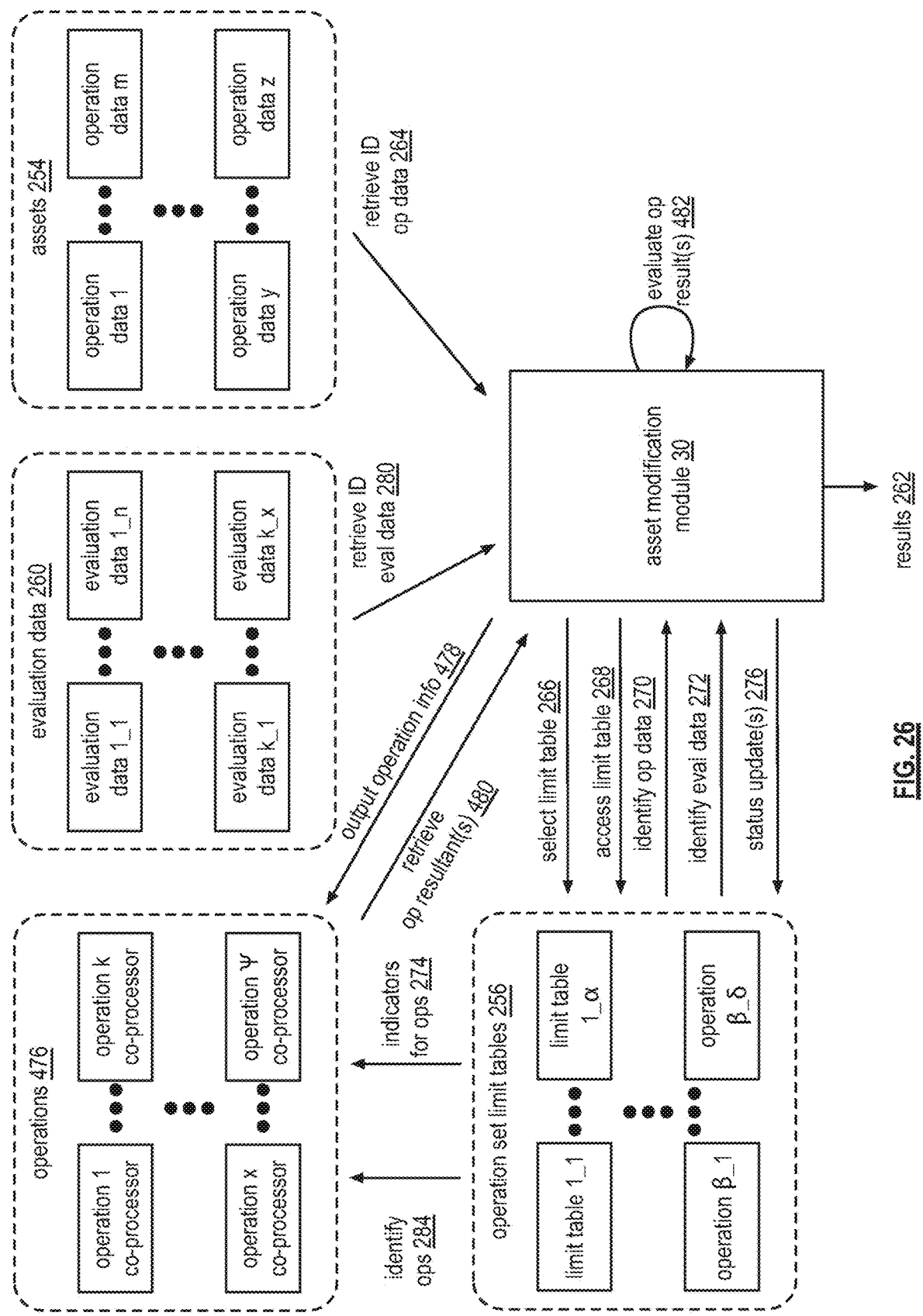
FIG. 26 is a schematic block diagram of another example of an asset modification module modifying an asset in accordance with the present invention.

FIG. 26 is a schematic block diagram of another example of an asset modification module 30 modifying an asset. In this example, the asset modification module 30 selects one of the assets 254 to manage and retrieves the operational data regarding the asset in accordance with a selection process 264. Once the asset modification module 30 selects an asset for modification, it selects an operation set limit table 266 from a plurality of limit tables 256. In this example, asset 1 has limit tables 1_1 through 1_α available and the asset modification module 30 selects one of them based on attributes and/or factors of the limit tables (e.g., risk levels, reliability, etc.) in accordance with user preferences or a calculated preference.

The asset modification module 30 accesses the selected limit table 268 to retrieve one or more rows of information 270 (e.g., a row of information corresponds to information regarding an operation, which may be in a particular sequence order). The asset modification module 30 interprets the information to identify one or more evaluation data 272 and retrieves the corresponding evaluation data 280. The asset modification module 30 further interprets the information to identify indicators 274 (e.g., trigger, detrigger, activate, deactivate, etc.). The asset modification module 30 also interprets the information to identify one or more co-processors from a pool of co-processors 476 to perform a particular operation (e.g., operation 1, k, x, Ψ).

Having retrieved indicators and identified the co-processor(s), the asset modification module 30 provides the retrieved evaluation data 260 and the indicators to the identified co-processor(s) for analysis 478. When a trigger indicator is met, the co-processor triggers an operation and informs the asset modification module 30 thereof. The asset modification module 30 updates the status of the operation within the limit table 276. When an activate indicator is met, the co-processor activates the operation for execution and informs the asset modification module 30 thereof. The asset modification module updates the status of the operation within the limit table 276. The co-processor executes an activated operation in accordance with the indicators of the limit table to produce a partial modification resultant 480, which it provides to the asset modification module 30. Alternatively, the asset modification module 30 analyzes the evaluation data 482 to determine the triggering and activation of an operation. In this alternative, the asset modification module 30 provides a trigger signal and an activation signal to co-processor regarding the operation.

The asset modification module 30 continues to access the limit table 266, identify operation data 270, identify evaluation data 272, retrieve indicators 274, identify co-processors 284, and receives resultants from the co-processors 480 in accordance with the identifiers. Once the modification of the asset is closed, the asset modification module outputs an asset modification result 262.

Figure 27:
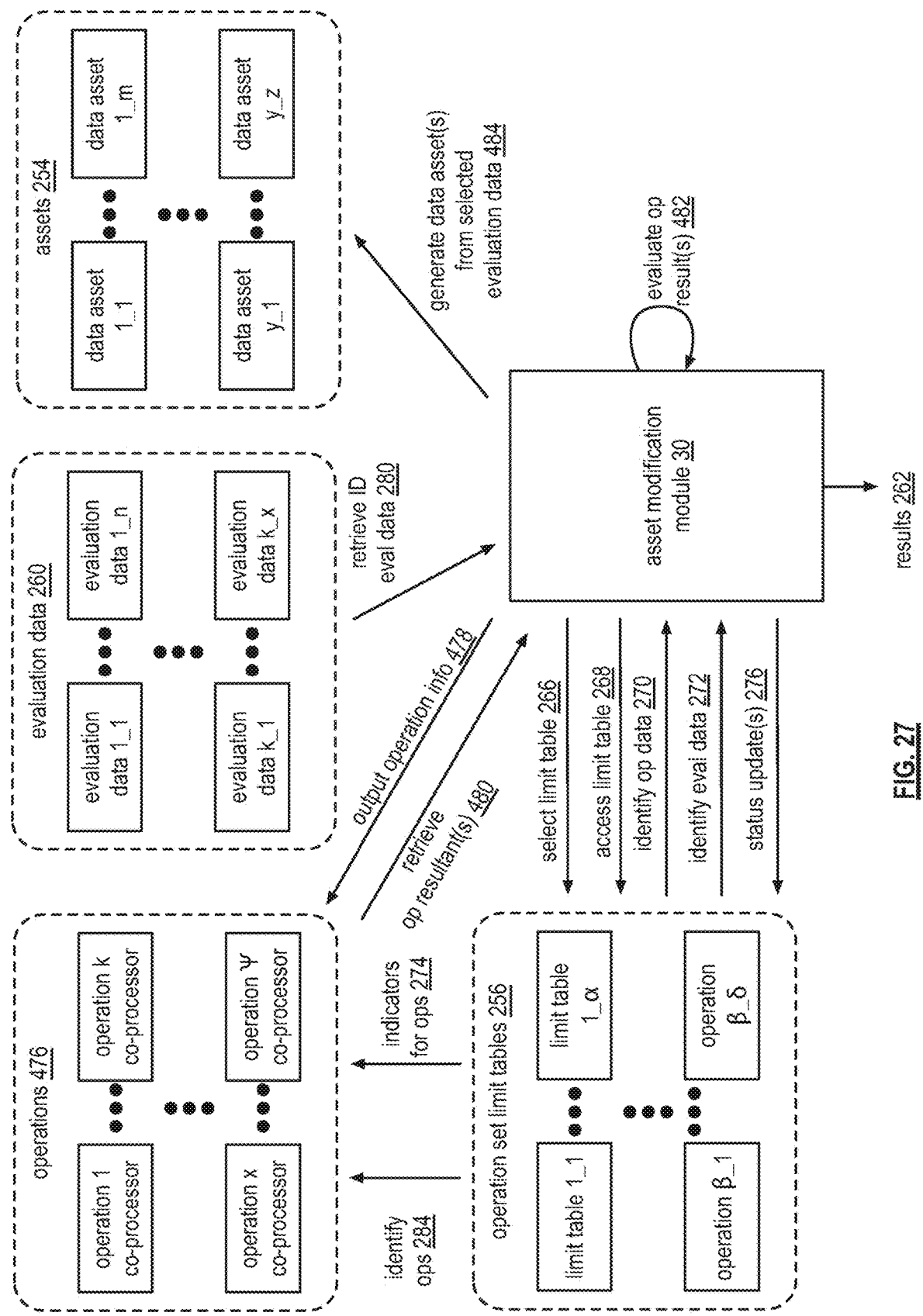
FIG. 27 is a schematic block diagram of another example of an asset modification module modifying an asset in accordance with the present invention.

FIG. 27 is a schematic block diagram of another example of an asset modification module 30 modifying an asset (e.g. creating the asset or adding to the asset 484). In this example, the asset modification module 30 selects one of the assets 254 to create, or add to, and uses this information to select an operation set limit table 266 from a plurality of limit tables 256.

The asset modification module 30 accesses the selected limit table 268 to retrieve one or more rows of information (e.g., a row of information corresponds to information regarding an operation, which may be in a particular sequence order). The asset modification module 30 interprets the information to identify one or more evaluation data and retrieves the corresponding evaluation data 272. The asset modification module 30 further interprets the information to identify indicators 274 (e.g., trigger, detrigger, activate, deactivate, etc.). The asset modification module 30 also interprets the information to identify one or more co-processors 284 from a pool of co-processors 476.

Having retrieved indicators and identified the co-processor(s), the asset modification module 30 forwards the indicators, the evaluation data, and operation data to the co-processor(s) 478 for analysis. When a trigger indicator is met, the co-processor triggers the operation and informs the asset modification module 30 thereof. The asset modification module 30 updates the status of the operation within the limit table 276. When an activate indicator is met, the co-processor activates the operation to create and/or add to the asset and informs the asset modification module 30 thereof. The asset modification module 30 updates the status of the operation within the limit table 276. Upon execution of the operation, the co-processor provides resultants 480 to the asset modification module 30. Alternatively, the asset modification module 30 analyzes the evaluation data 482 to determine the triggering and activation of an operation. In this alternative, the asset modification module 30 provides a trigger signal and an activation signal to co-processor regarding the operation.

The asset modification module 30 continues to access the limit table 266, identify operation data 268, identify evaluation data 272, retrieve indicators 274, identify co-processors 284, and receive resultants from the co-processors 480 in accordance with the identifiers to create and/or add to the asset. Once the modification of the asset is closed, the asset modification module 30 outputs an asset modification result 262 (e.g., the generated or updated asset).

Figure 28:
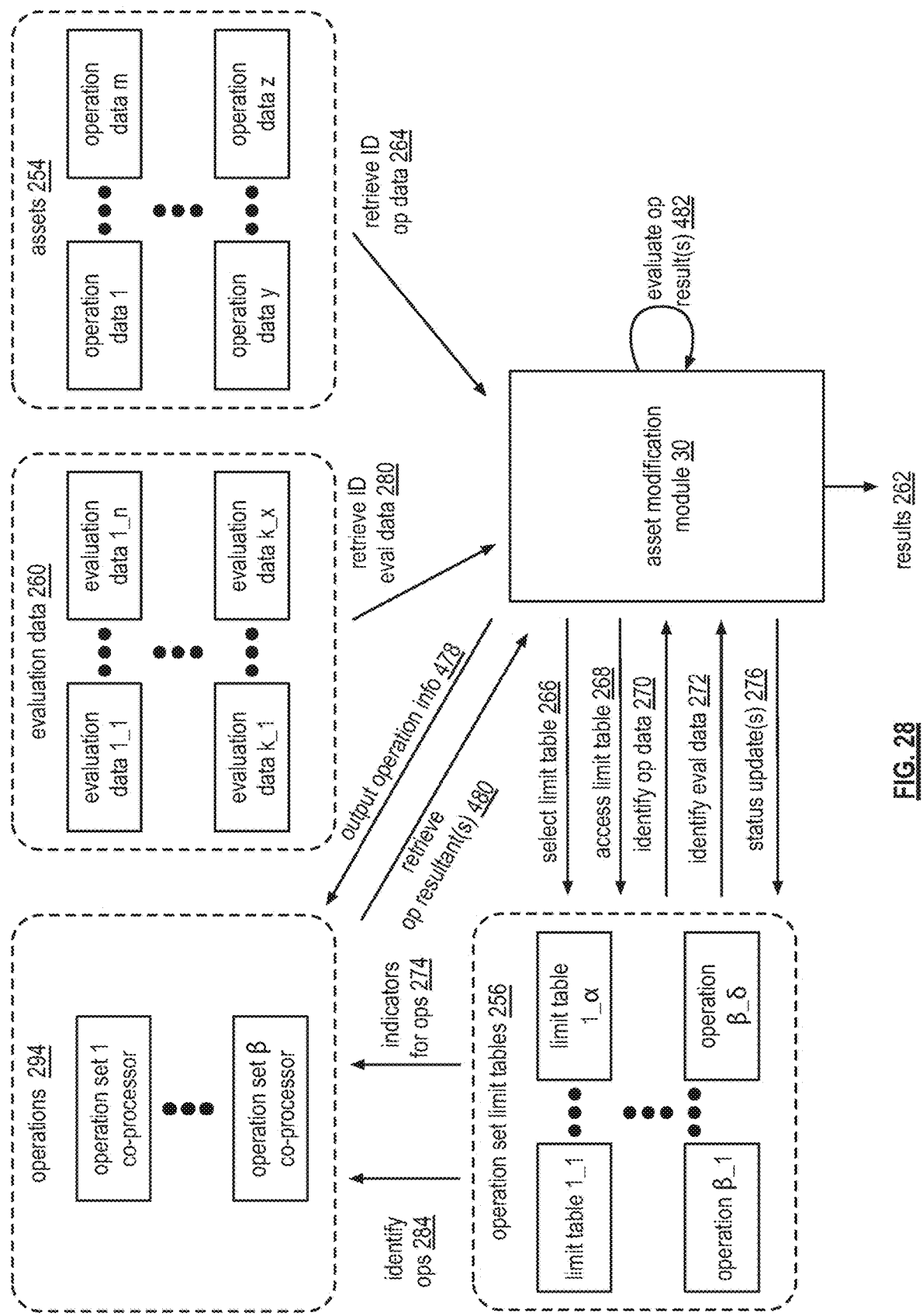
FIG. 28 is a schematic block diagram of another example of an asset modification module modifying an asset in accordance with the present invention.

FIG. 28 is a schematic block diagram of another example of an asset modification module 30 modifying an asset. In this example, the asset modification module 30 selects one of the assets to manage and retrieves the operational data regarding the asset 264 in accordance with a selection process. The asset modification module 30 also selects an operation set, which has associated therewith an operation set of co-processors 294. For instance, limit table 1_1 through 1_α have associated therewith, operation set 1 of co-processors.

The asset modification module 30 accesses the selected limit table 268 to retrieve one or more rows of information (e.g., a row of information corresponds to information regarding an operation, which may be in a particular sequence order). The asset modification module 30 interprets the information to identify one or more evaluation data and retrieves the corresponding evaluation data 272. The asset modification module 30 further interprets the information to identify indicators 274 (e.g., trigger, detrigger, activate, deactivate, etc.). The asset modification module 30 also interprets the information to identify one or more co-processors 284 from the operation set of co-processors 294.

Having retrieved the indicators and identified the co-processor(s), the asset modification module 30 provides the retrieved evaluation data and the indicators to the identified co-processor(s) for analysis 478. When a trigger indicator is met, the co-processor triggers an operation and informs the asset modification module 30 thereof. The asset modification module 30 updates the status of the operation within the limit table 276. When an activate indicator is met, the co-processor activates the operation for execution and informs the asset modification module 30 thereof. The asset modification module updates the status of the operation within the limit table 276. The co-processor executes an activated operation in accordance with the indicators of the limit table to produce a partial modification resultant, which it provides to the asset modification module. Alternatively, the asset modification module 30 analyzes the evaluation data 482 to determine the triggering and activation of an operation. In this alternative, the asset modification module 30 provides a trigger signal and an activation signal to co-processor regarding the operation.

The asset modification module 30 continues to access the limit table 266, identify operation data 268, identify evaluation data 272, retrieve indicators 274, identify co-processors 284, and receives resultants from the co-processors 480 in accordance with the identifiers. Once the modification of the asset is closed, the asset modification module outputs an asset modification result 262.

Figure 29:
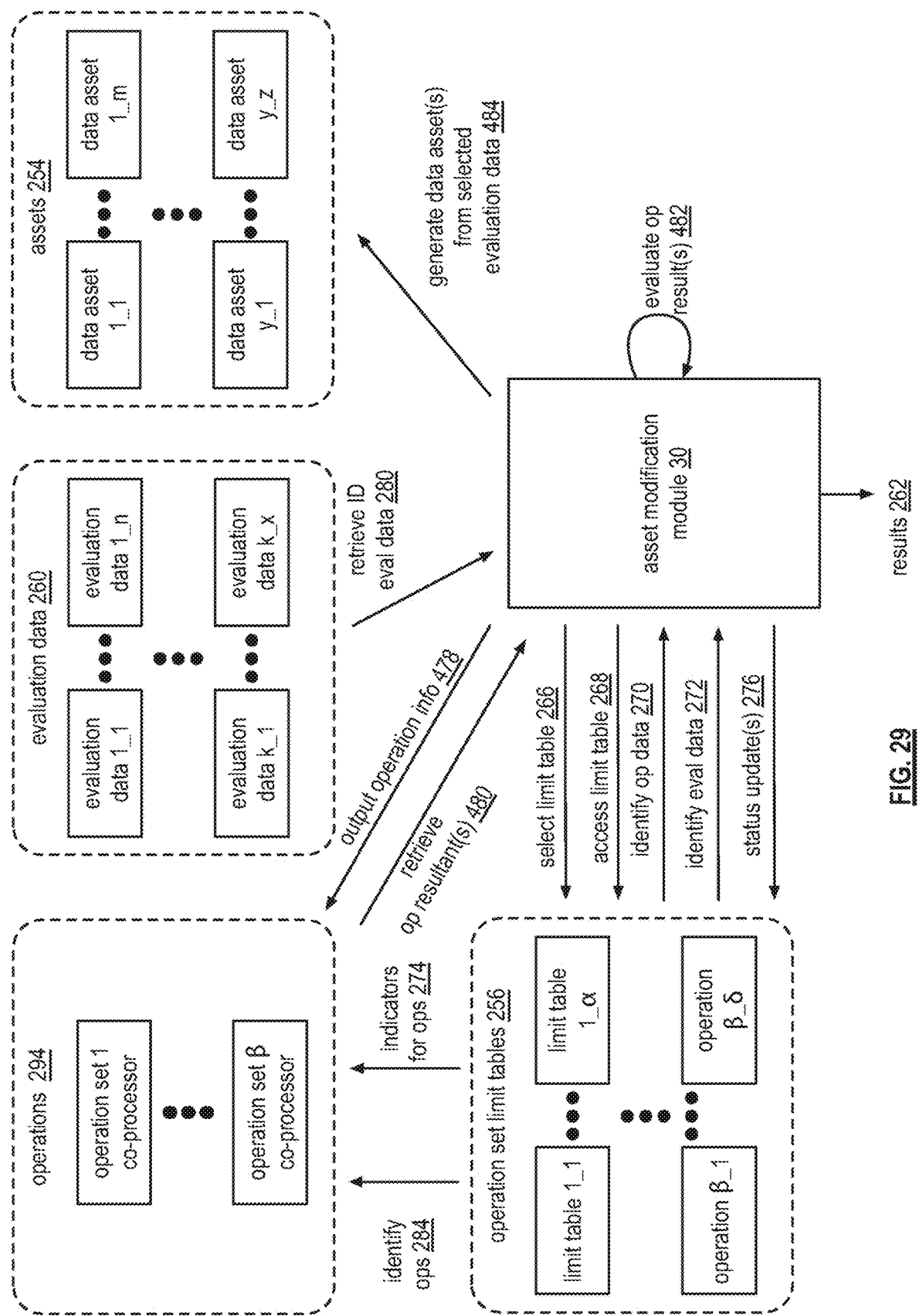
FIG. 29 is a schematic block diagram of another example of an asset modification module modifying an asset in accordance with the present invention.

FIG. 29 is a schematic block diagram of another example of an asset modification module 30 modifying an asset (e.g. creating the asset or adding to the asset 484). In this example, the asset modification module 30 selects one of the assets 254 to create, or add to, and uses this information to select an operation set limit table 266 from a plurality of limit tables 256, wherein each limit table has associated therewith an operation set of co-processors 294. For instance, limit table 1_1 through 1_α have associated therewith, operation set 1 of co-processors.

The asset modification module 30 accesses the selected limit table 268 to retrieve one or more rows of information (e.g., a row of information corresponds to information regarding an operation, which may be in a particular sequence order). The asset modification module 30 interprets the information to identify one or more evaluation data and retrieves the corresponding evaluation data 272. The asset modification module 30 further interprets the information to identify indicators 274 (e.g., trigger, detrigger, activate, deactivate, etc.). The asset modification module 30 also interprets the information to identify one or more co-processors 284 from a pool of co-processors 294.

Having retrieved indicators and identified the co-processor(s), the asset modification module 30 forwards the indicators, the evaluation data, and operation data to the co-processor(s) for analysis 478. When a trigger indicator is met, the co-processor triggers the operation and informs the asset modification module 30 thereof. The asset modification module 30 updates the status of the operation within the limit table 276. When an activate indicator is met, the co-processor activates the operation to create and/or add to the asset and informs the asset modification module 30 thereof. The asset modification module 30 updates the status of the operation within the limit table 276. Upon execution of the operation, the co-processor provides resultants 480 to the asset modification module. Alternatively, the asset modification module 30 analyzes the evaluation data 482 to determine the triggering and activation of an operation. In this alternative, the asset modification module 30 provides a trigger signal and an activation signal to co-processor regarding the operation.

The asset modification module 30 continues to access the limit table 266, identify operation data 270, identify evaluation data 272, retrieve indicators 274, identify co-processors 284, and receive resultants from the co-processors 480 in accordance with the identifiers to create and/or add to the asset. Once the modification of the asset is closed, the asset modification module 30 outputs an asset modification result 262 (e.g., the generated or updated asset).

Figure 30:
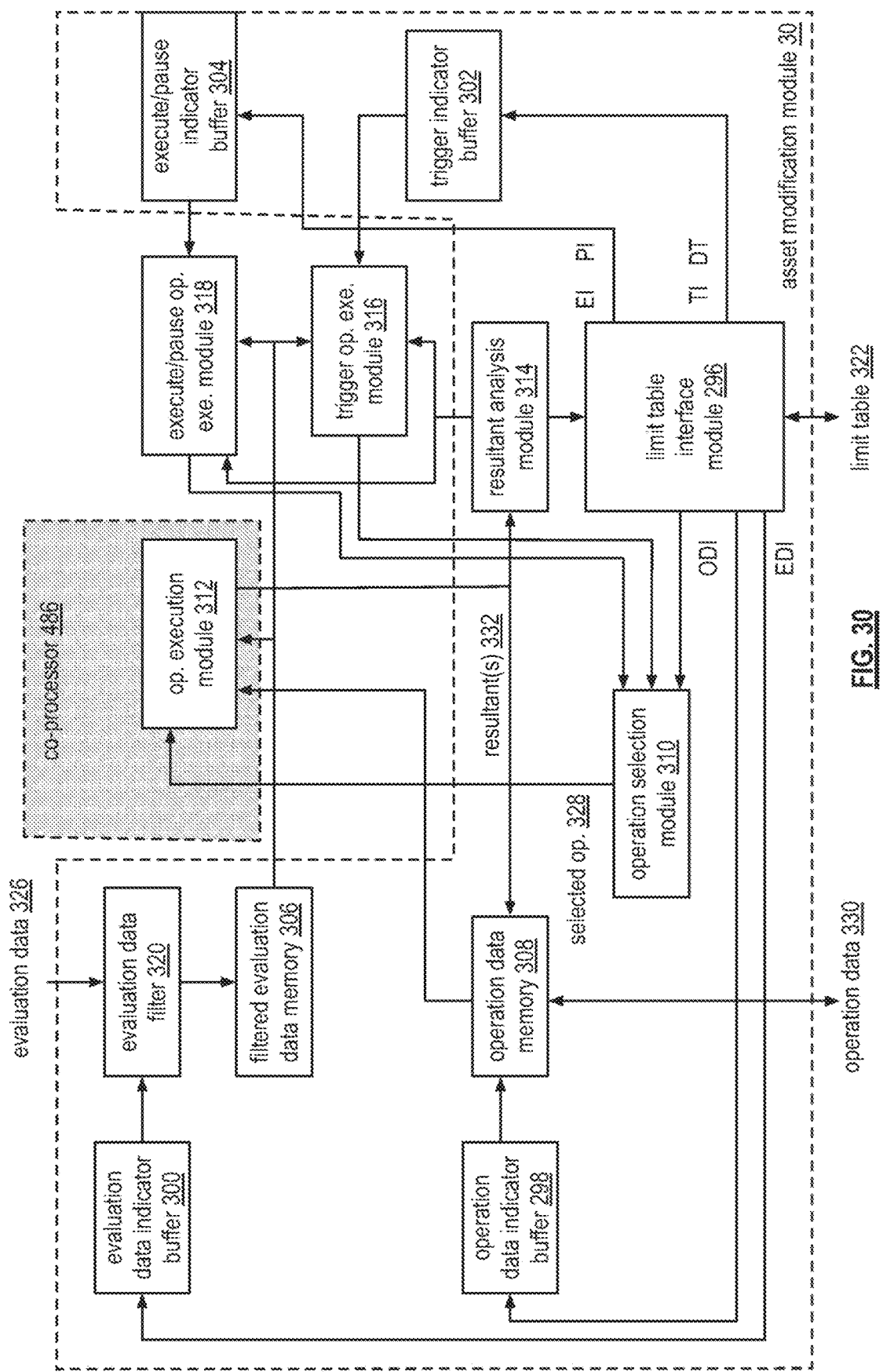
FIG. 30 is a schematic block diagram of another embodiment of an asset modification module in accordance with the present invention.

FIG. 30 is a schematic block diagram of another embodiment of an asset modification module 30 operably coupled to a co-processor 486. The asset modification module 30 includes a limit table interface module 296, a plurality of indicator buffers 298-304, memory 306-308, an operation selection module 310, a resultant analysis module 314, a trigger operation execution module 316, an execute/pause (activate/deactivate) operation execution module 318, and an evaluation data filter 320. The indicator buffers 298-304 include an operation data indicator buffer 298, an evaluation data indicator buffer 300, a trigger indicator buffer 302, and an execute/pause (activate/deactivate) indicator buffer 304. The memory 306-308 stores filtered evaluation data 306, operation data 308, and may further store the resultant(s) of the operation execution module 312. Note that each of the modules may be implemented as a software module executable by a processing module, may be implemented as a hard coded module, and/or may be implemented as a firmware module (e.g., a combination of software and hardware). The co-processor 486 includes an operation execution module 312.

In an example of operation, the asset modification module 30 identifies a selected co-processor 486 and interfaces with it. The interfacing may be locally (e.g., via a computing device bus structure, an application program interface (API), etc.) or may be remotely (e.g., via a WLAN interface, a LAN interface, a WAN interface, an Internet interface, etc.). Once the asset modification module 30 is operably coupled to the selected co-processor 486, the coupled pair functions in a similar manner as the asset modification module 30 of FIG. 17. Note that the asset modification module 30 may be operably coupled to multiple selected co-processors 486 at a given time using a multitasking function.

Figure 31:
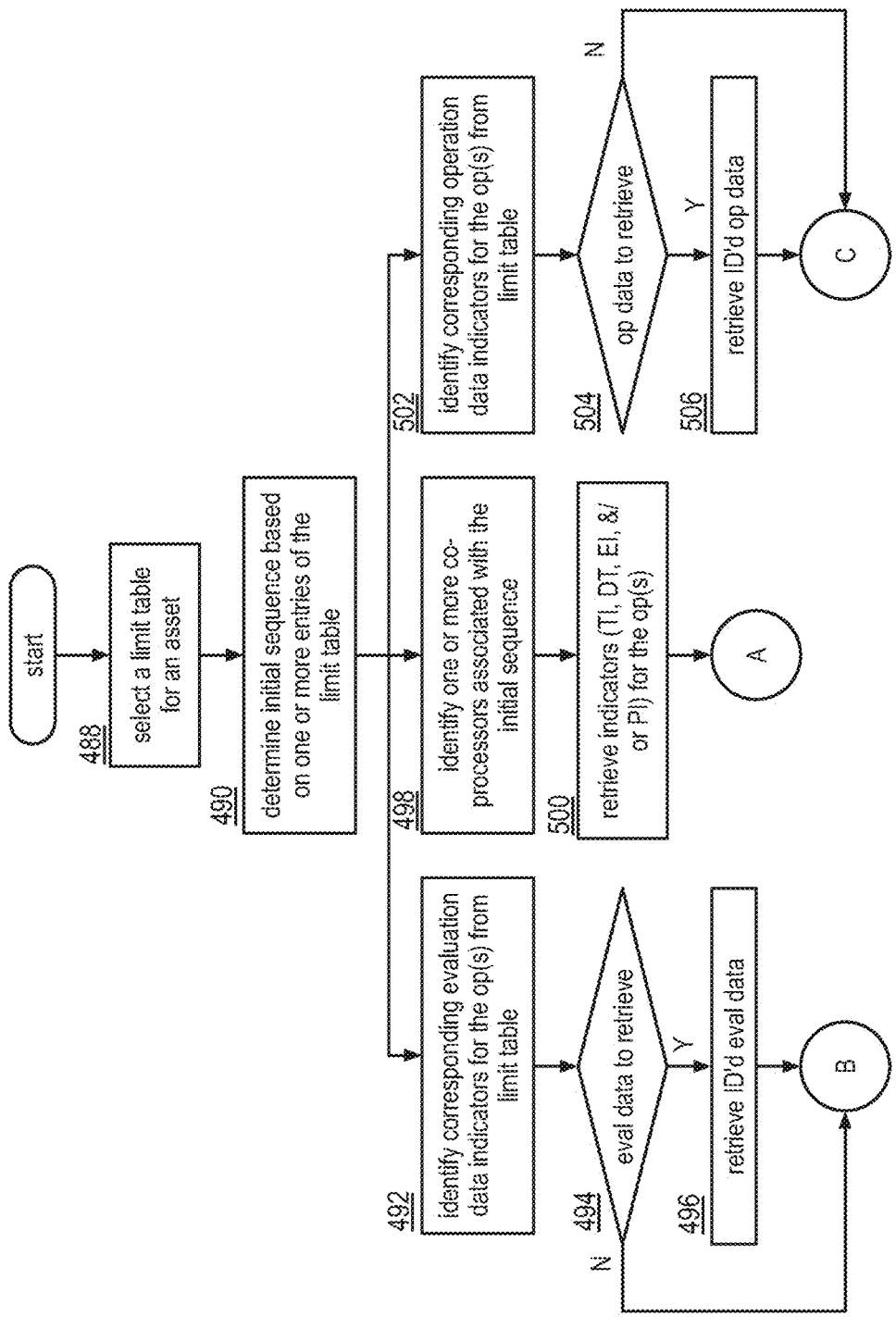
FIGS. 31-33 are a logic diagram of another method for modifying an asset in accordance with the present invention.
Figure 32:
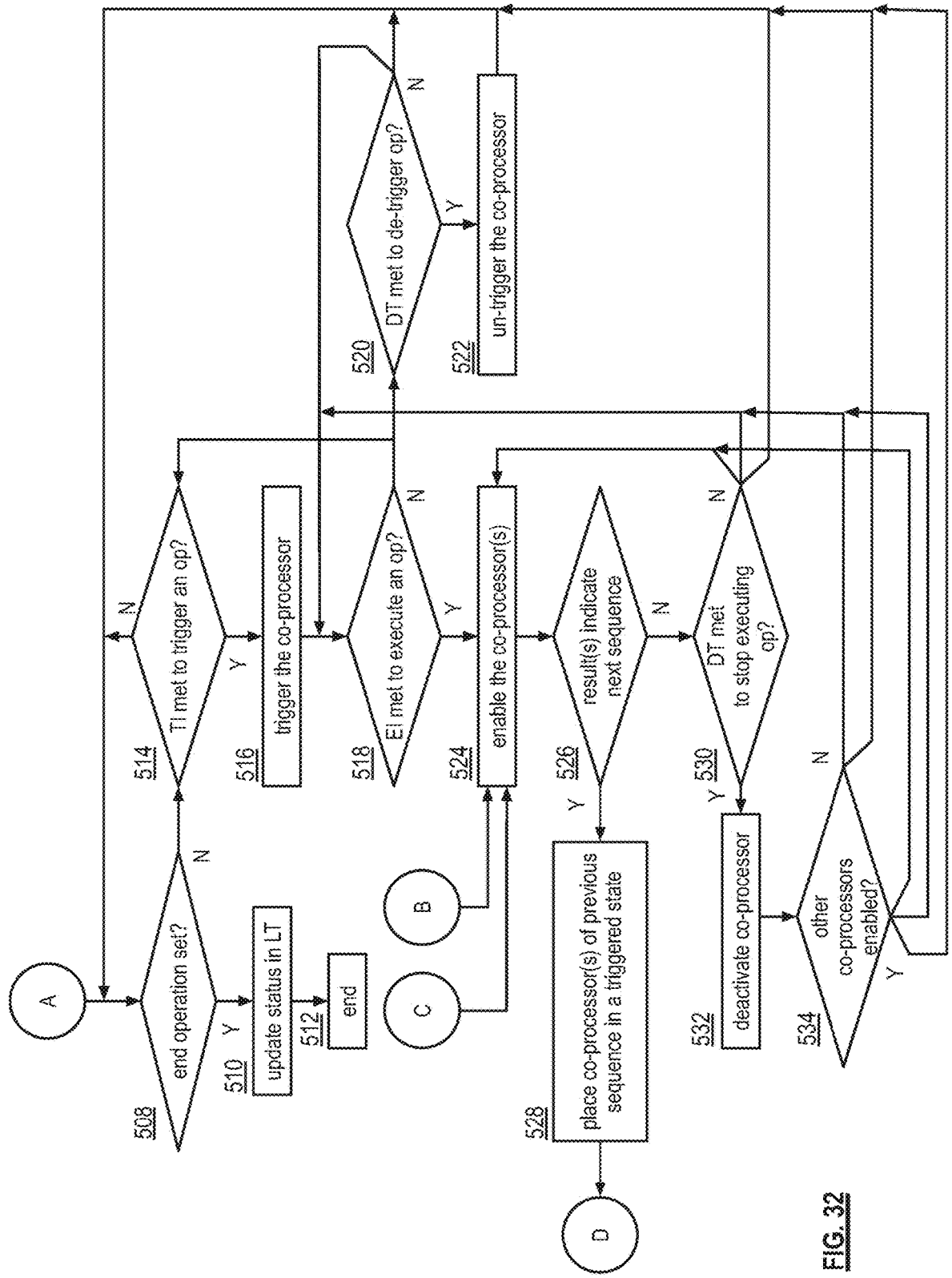
Figure 33:
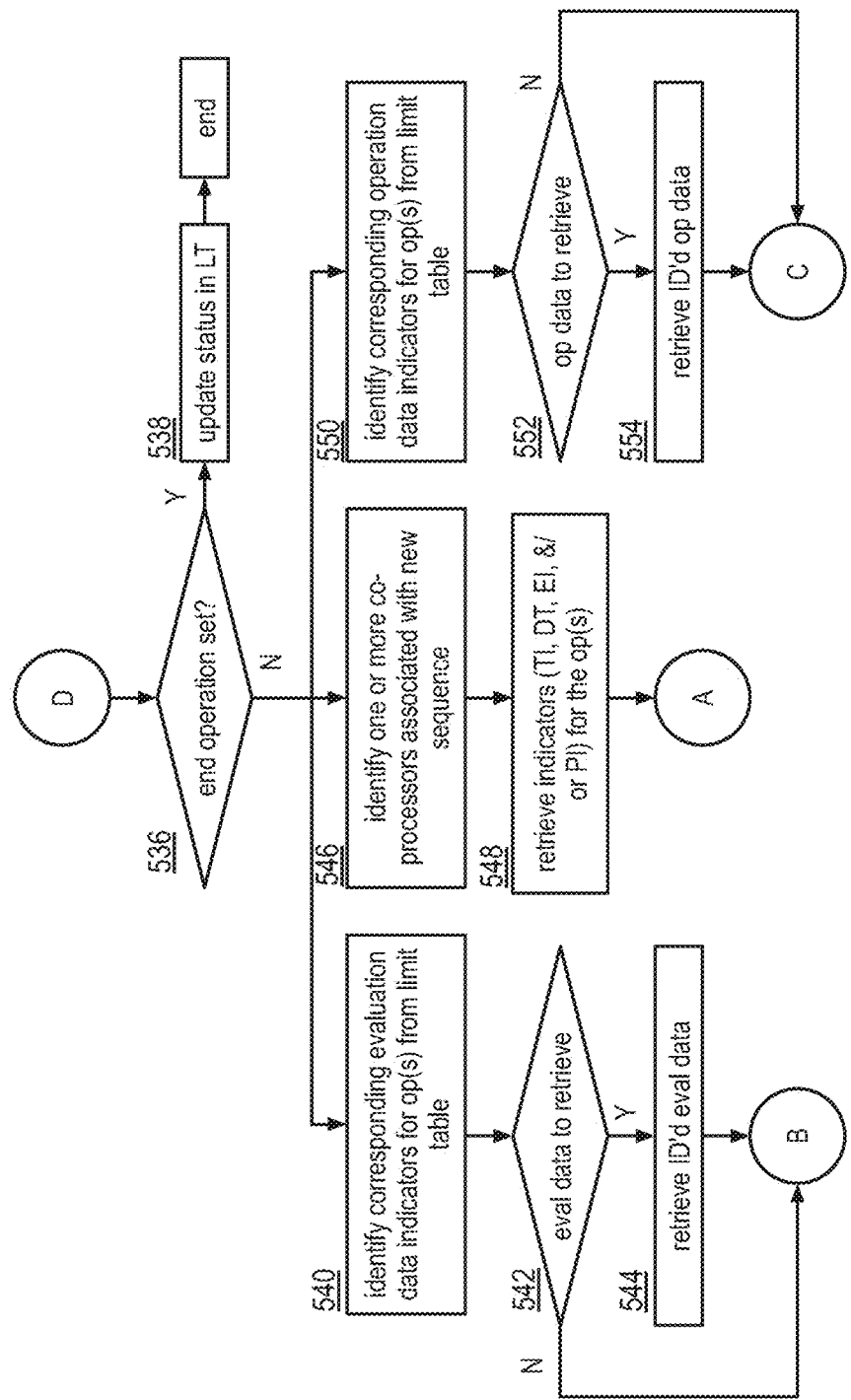

FIGS. 31-33 are a logic diagram of another method for modifying an asset that may be performed by the asset modification module of FIG. 30. The method begins with the asset modification module selecting a limit table for a particular asset 488. The method continues with the asset modification module determining an initial sequence based on one or more entries of the limit table 490. For example, the asset modification module identifies the operations having a sequence number of 0 and may further identify the operations having the next one or more sequence numbers. As a specific example, the asset modification module may identify the sequence number and ordering from information contained in the limit table or it may determine it based on the operations, evaluation data being analyzed, and/or the indicators.

The method then branches into three branches. In the first branch, the asset modification module identifies evaluation data indicators for the operation(s) of the initial sequence (e.g., sequence 0) from the limit table 492. This branch continues with the asset modification module determining whether there is evaluation data to retrieve 494. If yes, the branch continues with the asset modification module retrieving the identified evaluation data 496. If not, or after the evaluation data is retrieved, this branch continues on FIG. 32.

In the second branch, the asset modification module identifies one or more co-processors associated with the initial sequence 498. This branch continues with the asset modification module retrieving the one or more operations. This branch continues with the asset modification module retrieving the indicators (trigger, detrigger, activate, and deactivate) for each of the operations 500. This branch then continues on FIG. 32.

In the third branch, the asset modification module identifies operation data indicators for the selected operations of the initial sequence 502. This branch continues with the asset modification module determine whether there is at least one operation data indictor (e.g., operation data ID, data allotment, and/or data operands) to retrieve 504. For example, if the operations for the initial sequence are to open an asset modification process of the limit table, there may not be any operation data indicators to retrieve. If there is an operation data indicator to retrieve, this branch continues with the asset modification module retrieving it 506. Once the asset modification module has, or if there are no operation data indicators to retrieve, this branch continues on FIG. 32.

On FIG. 32, the second branch continues with the asset modification module determining whether the operation set is complete 508. For example, the asset modification module is determining whether the asset modification process for the selected asset is being closed. If yes, the method continues with the asset modification module updating 510, if needed, status fields in the limit table indicating that the asset modification process is being closed 512. If the asset modification process is not being closed, the method continues with the asset modification module determining whether a trigger indicator for an operation is met 514. If not, the method remains in a loop until the asset modification process is closed or an operation is triggered. Note that the first branch of FIG. 31 ties into the step of determining whether a trigger indicator is met.

When a trigger indicator is met, the method continues with the asset modification module triggering the co-processor 516. The method continues with the asset modification module determining whether an execution (or activate) indicator is met 518. If not, the method branches back to the step of determining whether a trigger indicator is met for another operation 514. Also, for the current triggered co-processor, the method continues with the asset modification module determining whether a detriggering indicator is met 520. If yes, the current co-processor is detriggered 522. If not, the method loops back to determining whether an activate indicator is met 518.

When, for a triggered co-processor, an activate indicator is met, the method continues by enabling the co-processor to execute the operation to produce a result 524. Note that the first and third branch of FIG. 31 tie into the step of enabling the co-processor 524. The method continues with the asset modification module (via the results analysis module) determining whether the results indicate whether the asset modification process should proceed to the next sequence 526. If yes, the method continues with the asset modification module deactivating the co-processor(s) of the current sequence state and placing them in a triggered state or a detriggered state depending on the next sequence 528. For example, if the next sequence could be a repeat of the current sequence, then the operations are placed in the triggered state. If, however, the next sequence could not be a repeat of the current sequence, then the operations are placed in a detriggered state. Regardless of the state of the operations are placed in, the method continues on FIG. 33.

If the results of the executed operation do not indicate transitioning to the next sequence state, the method continues with the asset modification module determining whether a deactivate (or pause) indicator is met for the co-processor 530. If not, the method continues in three branch back paths. The first branch back path is for the activated co-processor, which loops back to the step of enabling the co-processor to execute the operation 524. The second branch back path is for triggered co-processors, which loops back to the step of determining whether an activation indicator is met 518. The third branch back path is for other co-processors of the current sequence that are not yet triggered, which loops back to the step of determining whether a trigger indicator is met 508.

If a deactivate indicator is met, the method continues with the asset modification module deactivates the co-processor from executing the operation 532. The method then continues with the asset modification module determining whether other co-processors are still enabled (e.g., are still activated) 534. If not, the method continues in two branch back paths. The first branch back path is for triggered co-processors, which loops back to the step of determining whether an activation indicator is met 518. The second branch back path is for other co-processors of the current sequence that are not yet triggered, which loops back to the step of determining whether a trigger indicator is met 508.

When another co-processor is still activated, the method continues in three branch back paths. The first branch back path is for the activated co-processor, which loops back to the step of executing the operation 524. The second branch back path is for triggered co-processors, which loops back to the step of determining whether an activation indicator is met 518. The third branch back path is for other co-processors of the current sequence that are not yet triggered, which loops back to the step of determining whether a trigger indicator is met 508.

When the asset modification process is in a transition state, the method continues on FIG. 33 with the asset modification module determining whether end the operation set (e.g., close the asset modification process) 536. If yes, the method continues with the asset modification module updating status in the limit table and outputting a resultant, if any 38.

If the asset modification process is not being closed, the method continues with the asset modification module transitioning the process to the next sequence, which branches into three branches. In the first branch, the asset modification module identifies evaluation data indicators for the operation(s) of the next sequence, or sequences, from the limit table 540. This branch continues with the asset modification module determining whether there is evaluation data to retrieve 542. If yes, the branch continues with the asset modification module retrieving the identified evaluation data 544. If not, or after the evaluation data is retrieved, this branch continues on FIG. 32.

In the second branch, the asset modification module identifies one or more co-processors associated with the next sequence(s) 546. This branch continues with the asset modification module retrieving the indicators (trigger, detrigger, activate, and deactivate) for each of the operations 548. This branch then continues on FIG. 32.

In the third branch, the asset modification module identifies operation data indicators for the selected operations of the next sequence(s) 550. This branch continues with the asset modification module determine whether there is at least one operation data indictor (e.g., operation data ID, data allotment, and/or data operands) to retrieve 552. If there is an operation data indicator to retrieve, this branch continues with the asset modification module retrieving it 554. Once the asset modification module has, or if there are no operation data indicators to retrieve, this branch continues on FIG. 32.

FIG. 34 is a diagram of another example of an operation set limit table 212 that includes a plurality of columns and a plurality of rows. The columns correspond to particular aspects of the operation set limit table 212 such as sequence (ordering) 214, operation identifier (ID) 216, one or more trigger indicators 218, one or more detrigger indicators 220, evaluation data indicators 222, execute (or activate) indicators 224, pause (or deactivate) indicators 226, operational data indicators 228, current operation status 230, and execution module selection 232. Note that an operation limit table 212 may include more or less columns (i.e., aspects). For example, the execution module selection 232 may be omitted. As another example, the sequence column 214 may be omitted. As yet another example, a column or aspect may be added to indicate configuration information for the evaluation data filter.

Each row of the operation set limit table 212 corresponds to an identified operation and its operating conditions. For example, a first row below the header includes an entry in the sequence field 214 of 0, an entry in the operation ID 216 field of "A" (e.g., open asset modification process of an asset), an entry in the trigger indicator field 218 of "turn op on signal", an entry in the de-trigger indicator field 220 of "turn op off signal", an entry in the evaluation data ID field 234 of "not applicable (n/a)", an entry in the evaluation data factors 236 of "n/a", an entry in the execute indicator field 224 of "upon activation" (e.g., when the turn on signal is detected), an entry in the pause indicator 226 of "upon execution" (e.g., just after it is executed), entries in each of the operational data indicators 228 of "n/a", an entry in the current operation status 230 of "executed", and an entry in the execution module selection 232 of "A-1" (e.g., use execution module A-1 to perform the operation).

When operation A has been executed, the next sequenced operations are triggerable, which are operations B and C since they have a sequence number of 1. The entries for operation B include an entry in the trigger indicator field 220 of "dm>=f1(m)", an entry in the de-trigger indicator field 222 of "dm<=f1(m)–f2(m)", an entry in the evaluation data ID field 234 of "dm", an entry in the evaluation data factors 2236 of "dm source time frame", an entry in the execute indicator field 224 of "dm>=f1(m)+3", an entry in the pause indicator 226 of "dm<f2(m)", an entry in the operation data ID 238 of "Dc", an entry in the data allotment 240 of "10%", an entry in the data operands 242 of "x value", an entry in the current operation status 230 of "hold", and an entry in the execution module 232 selection of "B-1".

For this row (i.e., operation B), the operation is to be triggered when dm (i.e., the evaluation data set of one or more evaluation data) is equal to or greater than a first function of the evaluation data. The first function may be a mathematical function, a filtering function, a logic function, a mapping function, a statistical function, etc. For example, the first function may be to detect when a value of the evaluation data exceeds a threshold, when a slope of the evaluation data is at or above a certain slope, when a pattern of the evaluation data is within a given tolerance of a desired pattern. etc.

The operation is to be detriggered when the evaluation data (dm) is less than the first function of the evaluation data (f1(m)) minus a second function (f2(m)). The second function may also be a mathematical function, a filtering function, a logic function, a mapping function, a statistical function, etc.

The evaluation data indicators 228 include the evaluation data ID 234 of dm and an evaluation data factor(s) 236 of a given time frame. For example, dm identifies a set of evaluation data that includes one or more evaluation data and the dm source time frame indicates what time of the day the data is to be retrieved.

The execute indicator 224 indicates that the operation is to be activated for execution when the evaluation data (dm) is equal to or greater than a first function of the evaluation data plus 3. The operation is to be paused (i.e., deactivated) when the evaluation data (dm) is less than the second function on the evaluation data.

The operation data ID 238 identifies operation data (Dc), which corresponds to the asset being modified. The data allotment field 240 indicates that 10% of the asset is to be subjected to modification by operation B. The data operand field 242 indicates an operand of the value x for operation B to use when executed. The operand may be an initializing value, a constant for an equation, a unit of measure (e.g., quantity, pounds, dollars, etc.), a condition for executing the operation, an execution repetition indication (e.g., how many times the operation is to be executed), etc.

The current operation status 230 of "hold" indicates that this operation will not be triggered even if the triggering conditions occur. An operation may be put on hold when another operation of the same sequence number is triggered or activated. Other operation status includes triggered, activated, executed, waiting (to be triggered), etc.

The third row of the limit table is for operation C, which also has a sequence number of 1. Operation C is to be triggered when dn (i.e., another evaluation data set of one or more evaluation data) is equal to or greater than k, which may be a constant, a slope, a pattern, a trend, etc. Operation C is to be detriggered when the evaluation data (dn) is less than k−2.

The evaluation data indicators 222 include the evaluation data ID 234 of dn and an evaluation data factor(s) 236 of a given time frame. For example, dn identifies a set of evaluation data that includes one or more evaluation data and the dn source time frame indicates what time of the day the data is to be retrieved.

The execute indicator 224 indicates that the operation is to be activated for execution when the evaluation data (dn) is equal to or greater than k+2. Operation C is to be paused 226 (i.e., deactivated) when the evaluation data (dn) is less than k.

The operation data ID 238 identifies operation data (Dc), which corresponds to the asset being modified. The data allotment field 240 indicates that 10% of the asset is to be subjected to modification by operation C. The data operand field 242 indicates an operand of the value x for operation C to use when executed. The current operation status of "triggered" indicates that this operation is triggered, but not yet activated.

From this limited example, a variety of evaluation data can be analyzed for a variety of characteristics to trigger, de-trigger, activate, and de-activate an operation. For example, the characteristics include, but are not limited to, author, subject matter, values, trends, patterns, slopes, etc.

FIG. 35 is a diagram of another example of a generalized operation set limit table that includes a sequence column 556, an operation ID column 558, a general description of the operation column 560, and a generalized indicators column 562. The first row is for sequence 0 and identifies operation A, which is an operation to turn on the asset modification process when a turn on signal is detected.

The next row of the table is sequence 1 that identifies operations B and C. Each operation, while performing different operations, generally functions to open a position (e.g., for a given asset, subject it to modification). Either operation B or C is triggered and then executed upon favorable analysis of relevant evaluation data.

The next row of the table is for sequence 2, which identifies operation D. Operation D is a function to extend the position of the asset in a first manner based on extend asset development type 1 indicators. For example, operation D corresponds to buying a certain quantity of component for a manufactured product based on certain conditions in the relevant evaluation data.

The next row of the table is also for sequence 2, which identifies operations E and F. Each of operations E and F, while performing different operations, generally functions to extend the position of the asset in a second manner based on extend asset development type 2 indicators. For example, each of operation E and F corresponds to buying different quantities of component for a manufactured product based on certain conditions in the relevant evaluation data. As a more specific example, operation D may be to buy x quantity when inventory is running low regardless of price from any vendor; operation E may be to buy z quantity of the component when the price is below a certain threshold from a specific vendor; and operation F may be to buy y quantity of the component when the price is below a certain threshold for a set of vendors.

The next row of the table is for sequence 3, which identifies operations G and H. Each of operations G and H, while performing different operations, generally function to reduce the position of the asset in a first manner based on reduced asset development type 1 indicators. For example, each of operations G and H corresponds to consuming a component in the manufacture of a product. As a more specific example, operation G may be to use k quantity of the component when the evaluation data indicates a certain level of a market condition for the product; and operation H may be use m quantity of the component when the evaluation data indicates a different level of the market condition for the product.

The next row of the table is also for sequence 3, which identifies operations K and L. Each of operations K and L, while performing different operations, generally function to reduce the position of the asset in a second manner based on reduced asset development type 2 indicators. For example, each of operations K and L corresponds to selling an abundance of a component used in the manufacture of a product. As a more specific example, operation K may be to sell a quantity of the component when the evaluation data indicates a particular market condition for the product; and operation L may be sell a different quantity of the component when the evaluation data indicates a different market condition for the product.

The next row of the table is for sequence 4, which identifies operations M, N, and O. Each of operations M, N, and O, while performing different operations, generally function to close the position of the asset when the evaluation data is unfavorable. For example, operation M closes the asset modification process when the evaluation data is unfavorable in a first manner; operation N closes the asset modification process when the evaluation data is unfavorable in a second manner; and operation O closes the asset modification process when the evaluation data is unfavorable in a third manner.

The last row of the table is for sequence 5, which identifies operation P. Operation P functions to turn off the asset modification process when a turn off signal is detected.

FIG. 36 is a diagram of an example of operation sequencing of the limit table of FIG. 35. In this diagram, the processing starts in sequence 0 with operation A engaged to detect the turn on signal. Until the turn on signal is detected, the asset modification process remain is sequence 0 (e.g., the asset modification process is off). Once the turn on signal is detected, the sequencing transitions to sequence 1, which is to open a position for an asset. In sequence 1, operations B and C are engaged to open a position as discussed above.

Once a position for an asset is opened, the asset modification process is in a transition state and can transition from sequence 1 to sequence 2, 3, or 4 based on the indicators. For example, if the extend asset development per type 1 indicators are detected in the evaluation data, the process transitions to sequence 1 and operation D is engaged. As another example, if the extend asset development per type 2 indicators are detected in the evaluation data, the process transitions to sequence 1 and operations E and/or F are engaged. As yet another example, if the reduced asset development per type 1 indicators are detected in the evaluation data, the process transitions to sequence 3 and operations G and H are engaged. As yet another example, if the reduced asset development per type 2 indicators are detected in the evaluation data, the process transitions to sequence 3 and operations K and L are engaged. As a further example, if the analysis of the evaluation data is unfavorable (e.g., for a given time period), the process transitions to sequence 4 and operations M, N, and O are engaged to close the position for the asset.

When the process is in sequence 1, it may transition to sequence 2, 3, or 4. When the process is in sequence 2, it may transition to sequence 3, 4 or it may transition back to sequence 2. When the process is in sequence 3, it may transition to sequence 2, 4, or it may transition back to sequence 3. When the process is in sequence 4, it may transition to sequence 1 or to 5. The various transitions are based on analysis of the evaluation data in light of the various indicators.

Figure 37:
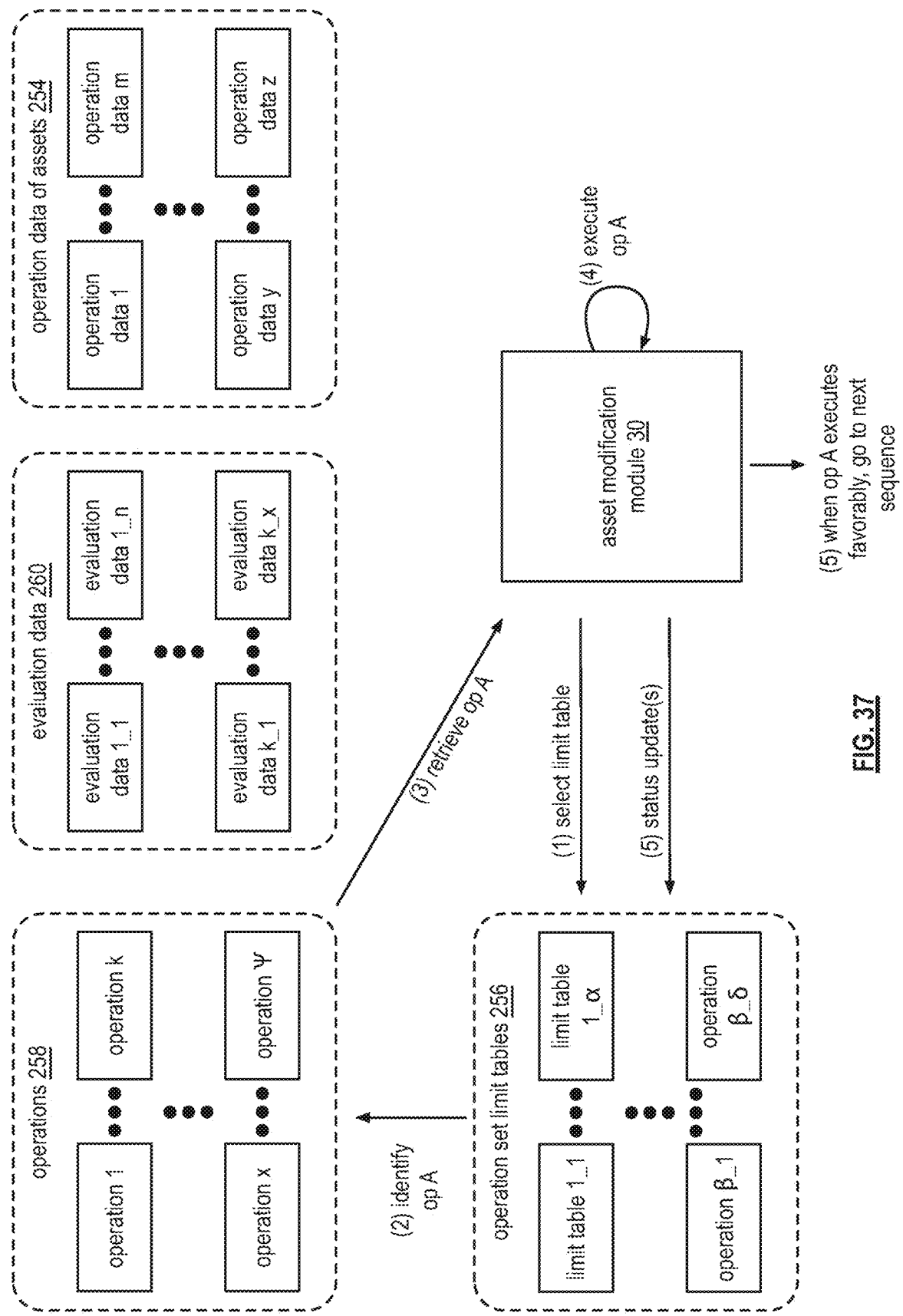
FIG. 37 is a schematic block diagram of another example of an asset modification module modifying an asset in accordance with the present invention.

FIG. 37 is a schematic block diagram of another example of an asset modification module 30 modifying an asset in accordance with the limit table of FIG. 35 and sequence diagram of FIG. 36. In this example, the asset modification module 30 has selected one of the assets (e.g., asset 1) to manage and retrieves the operational data regarding the asset in accordance with a selection process (e.g., user selection, automated determination process, default selection, etc.).

The asset modification module 30 then selects an operation set limit table from a plurality of limit tables 256 (e.g., step 1 for sequence 0). In this example, asset 1 has limit tables 1_1 through 1_α available and the asset modification module 30 selects one of them based on attributes and/or factors of the limit tables in accordance with user preferences and/or a calculated preference. For this example, the limit table of FIG. 35 is selected.

The asset modification module accesses the selected limit table to retrieve the first row of information (e.g., the sequence 0 row). The asset modification module 30 interprets the information to identify indicators (e.g., trigger, detrigger, activate, deactivate, etc.). The asset modification module 30 also interprets the information to identify, and retrieve, operation A from a pool of operations 258 (e.g. steps 2 & 3 for sequence 0).

Having retrieved indicators and operation A, the asset modification module 30 waits for the trigger and the activate indicators to be met (e.g., detect activation of a turn on signal). When an activate indicator is met, the asset modification module 30 executes operation A (e.g., step 4 of sequence 0). The asset modification module 30 then updates the status of the limit table (e.g., indicating that operation A has been executed) and places the asset modification process in a sequence transition state (e.g., step 5 of sequence 0).

Figure 38:
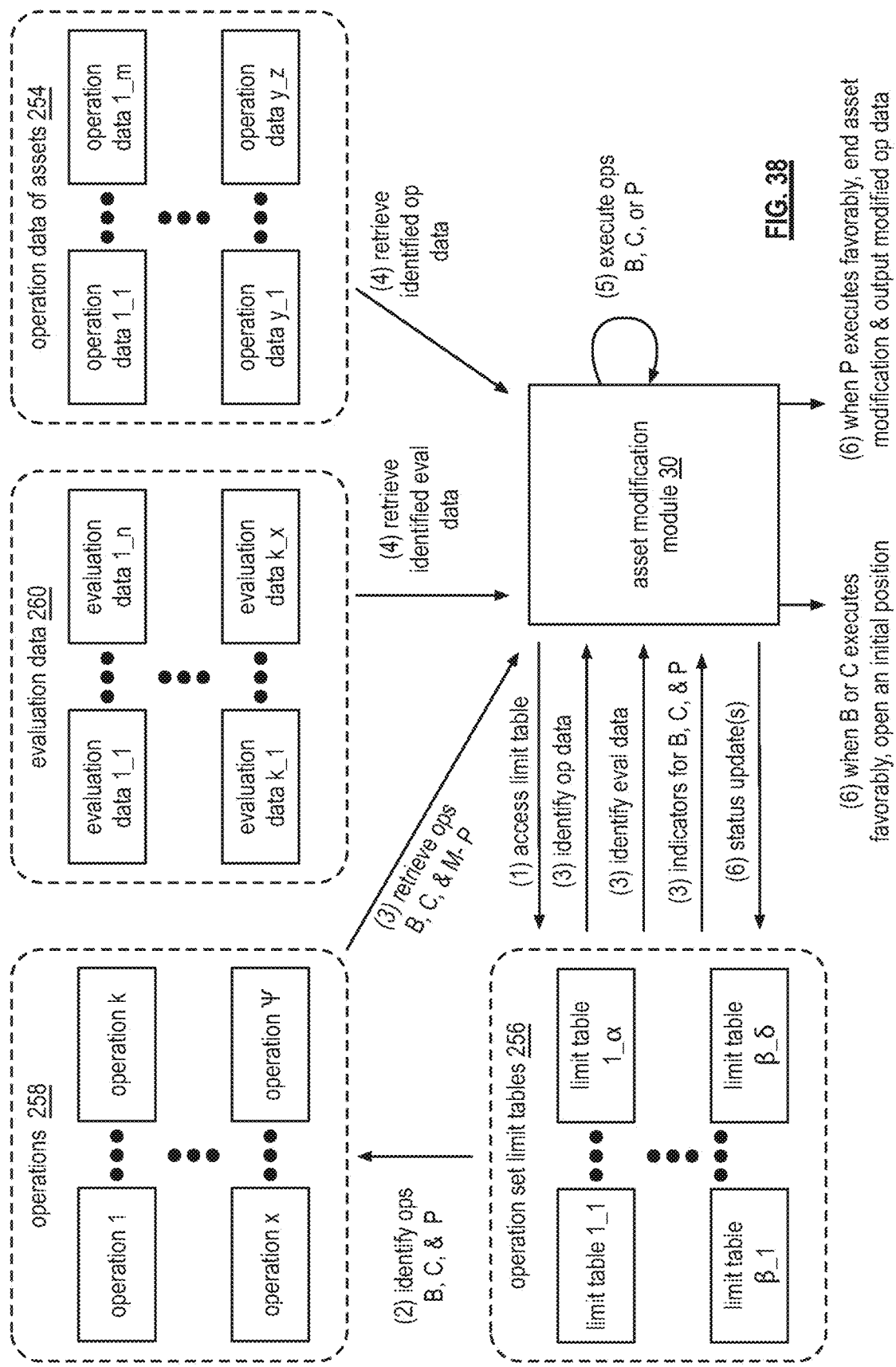
FIG. 38 is a schematic block diagram of another example of an asset modification module modifying an asset in accordance with the present invention.

FIG. 38 is a schematic block diagram of another example of an asset modification module 30 modifying an asset transitioning to sequence 1 in accordance with the limit table of FIG. 35 and sequence diagram of FIG. 36. The processing in sequence 1 begins with the asset modification module 30 accessing the limit table (e.g., step 1 of sequence 1). From the limit table, the asset modification module 30 identifies operations to retrieve (e.g., step 2 of sequence 1); identify operation data (e.g., step 3 of sequence 1); identify evaluation data (e.g., step 3 of sequence 1); and the identify indicators for the identified operations (e.g., step 3 of sequence 1).

In this example, the asset modification module 30 identified operations B, C, and P from the limit table (step 2). With reference to FIG. 36, the sequencing can transition from sequence 0 to sequence 1 or to sequence 5 after successful execution of operation A of sequence 0. As such, operations B and C are operations of sequence 1 and operation P is the operation of sequence 5. In other words, once operation A is executed to turn on the asset modification process, the process waits for either operation B or C to be executed to open the asset for modification or for operation P to be executed to turn off the asset modification process.

For step 3 of sequence 1, the asset modification module 30 identifies the operation data indicators for the asset (e.g., the asset ID, the data allotment amount, and data operands, if any). In addition, the asset modification module 30 identifies evaluation data for analysis and identifies the other indicators (e.g., trigger indicator, de-trigger indicator, execute indicator, and pause indicator).

The processing within sequence 1 continues at step 4 where the asset modification module 30 retrieves the identified evaluation data and the identified operation data (if any). The asset modification module analyzes the retrieved evaluation data in light of the indicators. When a trigger indicator is met for one of the operations, the operation is triggered and the status of the operation within the limit table is updated accordingly. When an activate indicator is met for a triggered operation, the operation is activated for execution and the status of the operation within the limit table is updated accordingly. The asset modification module 30 executes the activated operation in accordance with the indicators of the limit table to produce a partial modification resultant (e.g., step 5 of sequence 1).

Depending on which operation is triggered, activated, and executed, the asset modification process transitions to a next sequence. For instance, if operation P is executed, the asset modification process is turned off. If, however, operation B or C is executed, the asset modification process is in a transition state from which it could transition to sequence 2, 3, or 4.

Figure 39:
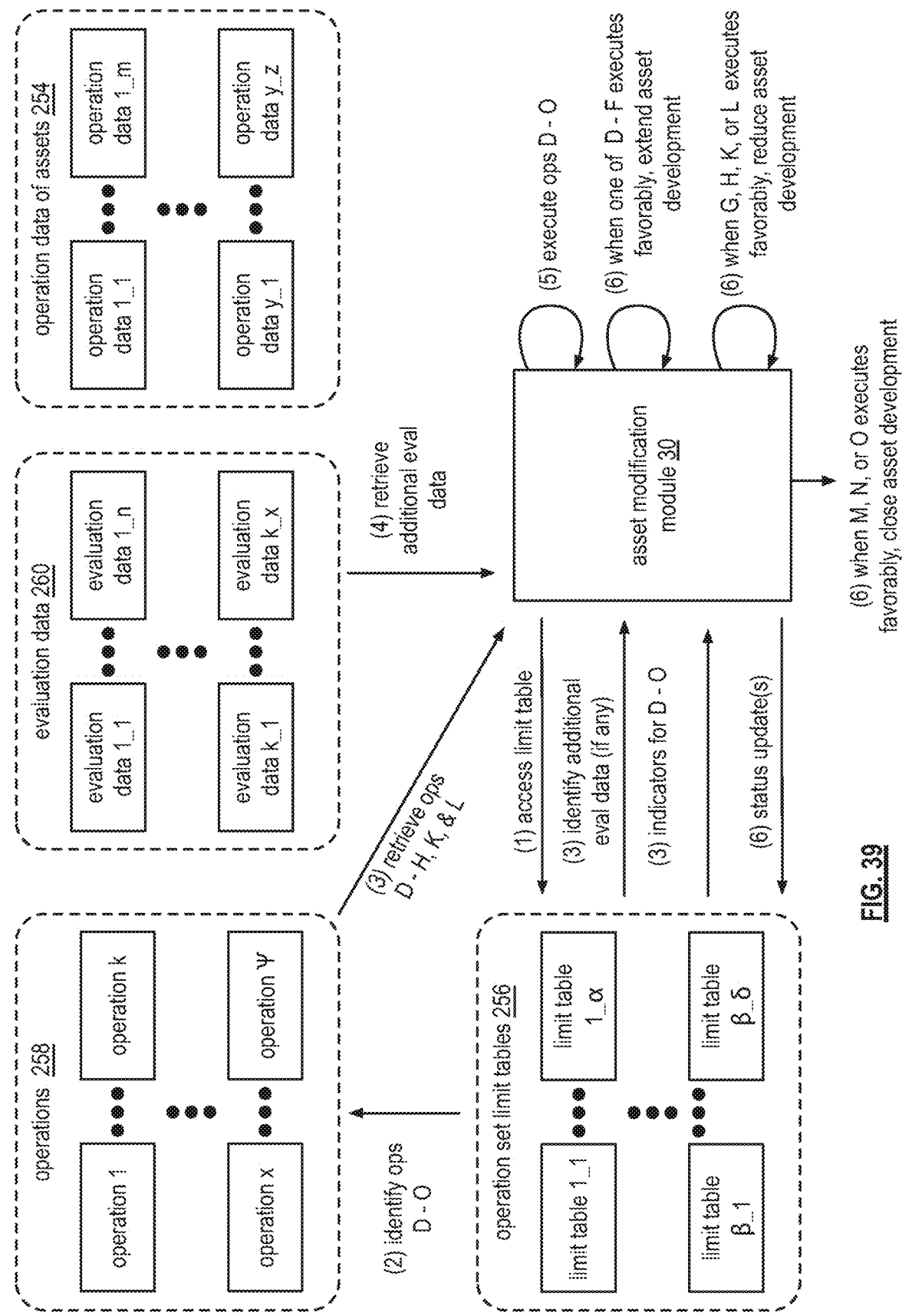
FIG. 39 is a schematic block diagram of another example of an asset modification module modifying an asset in accordance with the present invention.

FIG. 39 is a schematic block diagram of another example of an asset modification module 30 modifying an asset transitioning from sequence 1 to sequence 2, 3, or 4 in accordance with the limit table of FIG. 35 and sequence diagram of FIG. 36. The sequence transitioning processing begins with the asset modification module 30 accessing the limit table (e.g., step 1 of transitioning from sequence 1). From the limit table, the asset modification module 30 identifies operations to retrieve (e.g., step 2); identify operation data (e.g., step 3); identify evaluation data (e.g., step 3); and the identify indicators for the identified operations (e.g., step 3).

In this example, the asset modification module 30 identified operations D-O from the limit table (step 2). With reference to FIG. 36, the sequencing can transition from sequence 1 to sequence 2, 3, or 4 after successful execution of operation B or C of sequence 1. More specifically, operations D-F are operations of sequence 2, operations G, H, K, and L are operations of sequence 3, and operations M, N, and O are operations of sequence 4. In other words, once operations B or C is executed to open the asset for modification, the process waits for one of operations D-O to be triggered to transition to the next sequence.

For step 3 of transitioning from sequence 1, the asset modification module identifies the operation data indicators for the asset (e.g., the asset ID, the data allotment amount, and data operands, if any). In addition, the asset modification module identifies evaluation data for analysis and identifies the other indicators (e.g., trigger indicator, de-trigger indicator, execute indicator, and pause indicator).

The processing of transitioning from sequence 1 continues at step 4 where the asset modification module 30 retrieves the identified evaluation data and the identified operation data (if any). The asset modification module 30 analyzes the retrieved evaluation data in light of the indicators. When a trigger indicator is met for one of the operations, the operation is triggered and the status of the operation within the limit table is updated accordingly. When an activate indicator is met for a triggered operation, the operation is activated for execution and the status of the operation within the limit table is updated accordingly. The asset modification module 30 executes the activated operation in accordance with the indicators of the limit table to produce a partial modification resultant (e.g., step 5).

Depending on which operation is triggered, activated, and executed, the asset modification process transitions to a next sequence. For instance, if one of operations D-F is triggered, the asset modification process transitions to sequence 2, where the asset is extended. If, however, one of operations G, H, K, or L is triggered, the asset modification process transitions to sequence 3, where the asset is reduced. Alternatively, if one of operations M, N, or I is triggered, the asset modification process transitions to sequence 4, where the asset modification process for the asset is closed.

Figure 40:
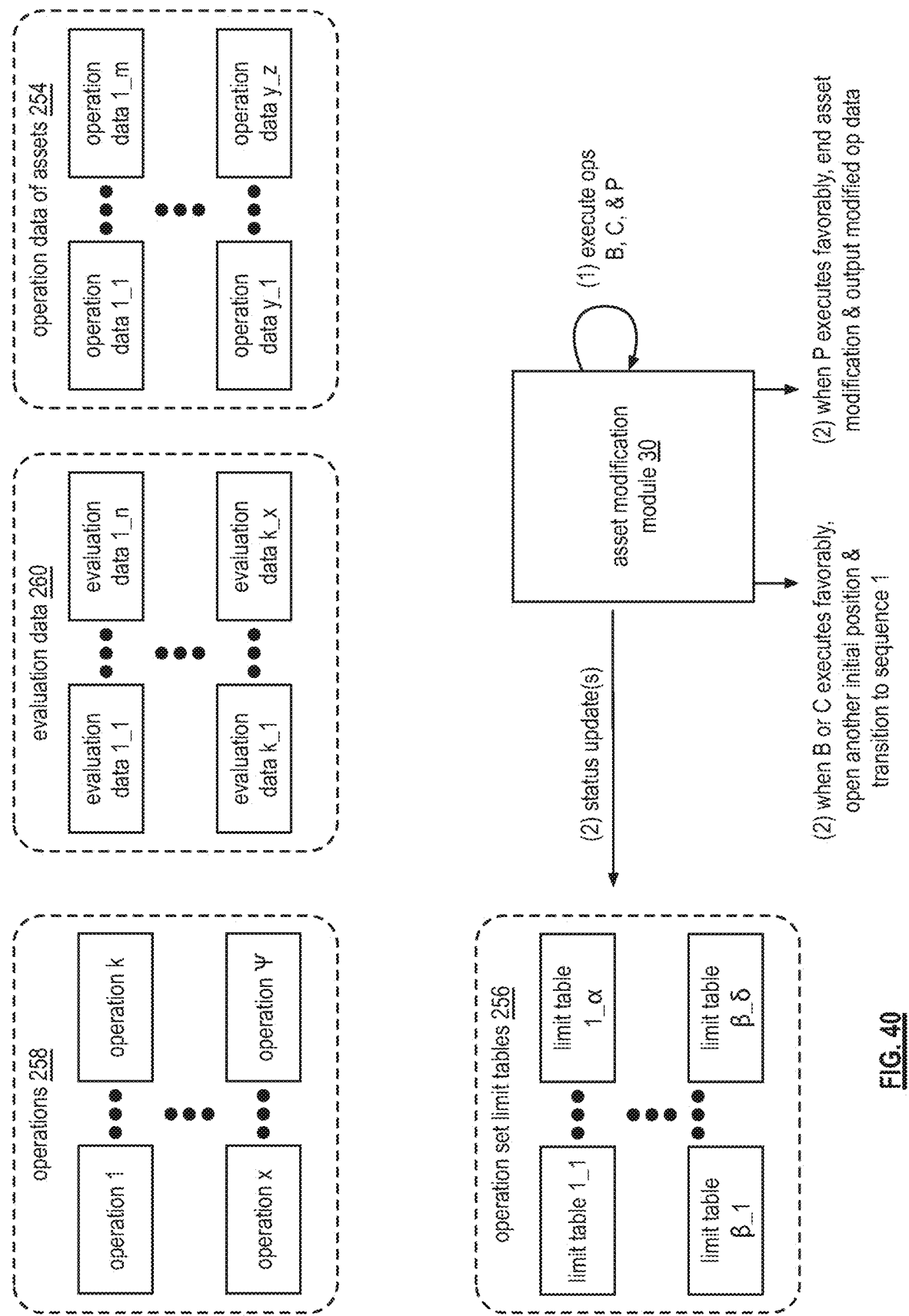
FIG. 40 is a schematic block diagram of another example of an asset modification module modifying an asset in accordance with the present invention.

FIG. 40 is a schematic block diagram of another example of an asset modification module 30 modifying an asset in sequence 4 in accordance with the limit table of FIG. 35 and sequence diagram of FIG. 36. With the asset modification process in sequence 4, it can only transition to sequence 1 (open an asset for modification) or to sequence 5 (turn off the asset modification process).

In this sequence state, the asset modification module 30 identified operations B, C, and P from the limit table. Depending on which operation is triggered, activated, and executed, the asset modification process transitions to a next sequence. For instance, if operation P is executed, the asset modification process is turned off. If, however, operation B or C is executed, the asset modification process is in a transition state for the asset or for another asset from which it could transition to sequence 2, 3, or 4.

FIGS. 41-42 are a diagram of another example of an operation set limit table for financial portfolio management. The operation set limit table includes a plurality of columns and a plurality of rows. A row of the table corresponds to information for a particular operation and the columns corresponding to the specific information of the operation. The columns include a sequence field, an evaluation type field (e.g., evaluation data ID and/or evaluation data factors), a notes field (optional and for reference purposes), an activation trigger (e.g., trigger), an execution trigger (e.g., activate for execution) as shown in FIG. 41 and includes action field (e.g., operation ID), a % trade allotment field, a trigger reference field (e.g., data operand), a status field, and an additional actions field as shown in FIG. 42. Note that the first two columns in FIG. 42 are the same columns as in FIG. 41 and are shown for ease of reference.

Figure 43:
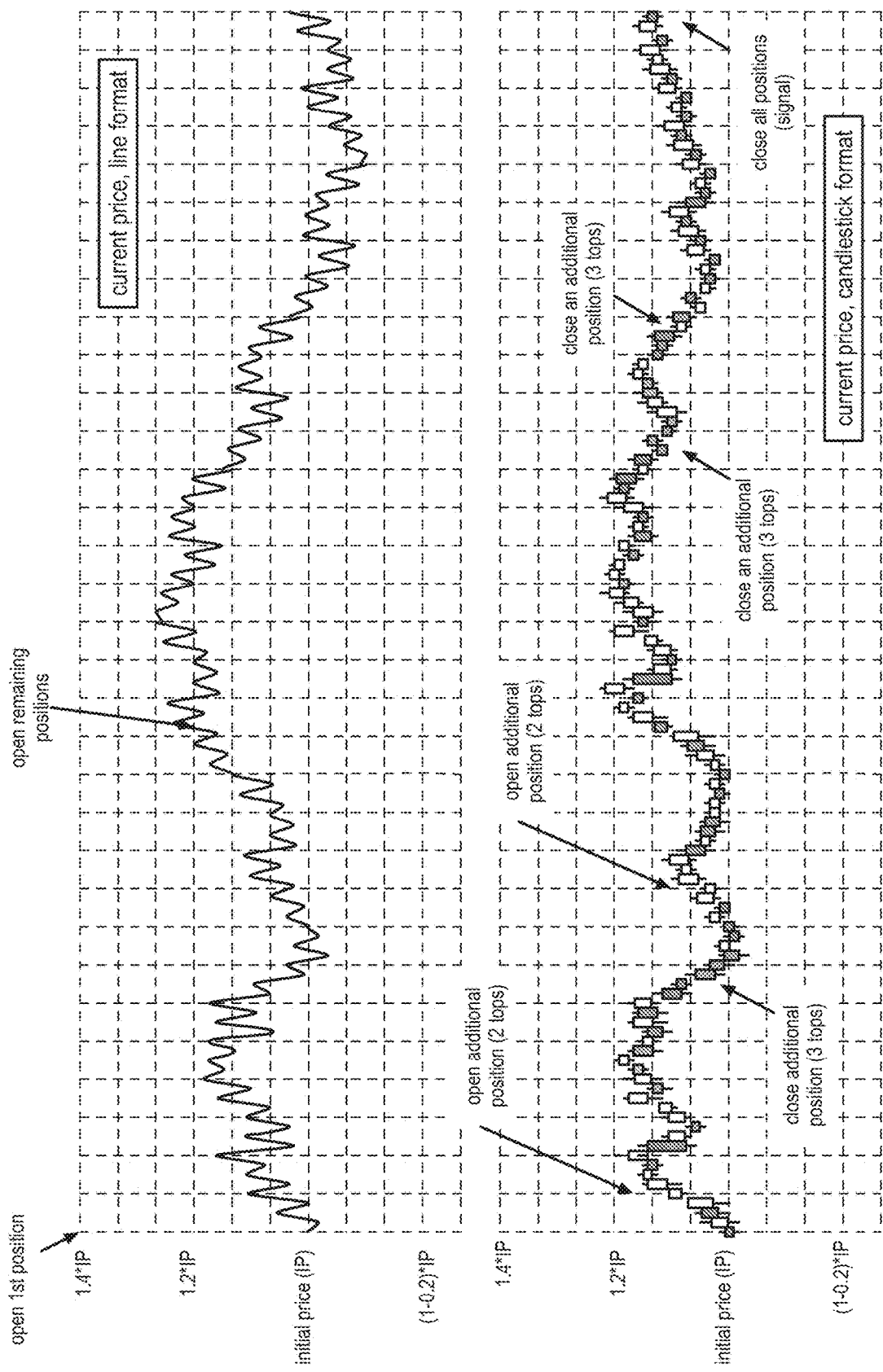
FIG. 43 is a diagram of an example of modifying an asset based on the limit table of FIGS. 41-42 in accordance with the present invention.

FIGS. 43-47 illustrate various examples of performing an asset modification process in accordance with the limit table of FIGS. 41 and 42. FIG. 43 includes two graphs of evaluation data being analyzed for the asset. The top graph illustrates a line format of the current price, which plots the current price of the asset in a line format over time, and the bottom graph illustrates the current price in a candlestick format, which plots a candlestick format of the current price over time.

The asset modification module analyzes the evaluation data in light of the sequence one operations to trigger (i.e., enable) an asset modification process for the asset. The sequence one operations include an open initial signal detection, open initial position based on moving average, and open initial position based on money flow. For the open initial position based on moving average operation, the asset modification process for an initial position is triggered (e.g., enabled) when the distance from the moving average-to-price crossing is at a level indicated by the trigger and activation indicators. In this example, the trigger indicator is 10 and the activation indicator is 0, indicating that when the trigger indicator is met, the operation is triggered and activated.

Once the asset modification process is enabled for an initial position, the asset modification module analyzes the evaluation data to determine if an operation to open an initial position is triggered (e.g., a sequence two operation that occurred after one of the sequence 1 operations is executed). For the sequence 1 operation, the limit table includes a trigger indicator of 0 from base level (e.g., the initial price), an execution indicator of 0, on operation ID of "open first position", a data allotment indicator of 10%, and a status. Since the trigger and execution indicators are identical, once the trigger condition is met, the operation of "open first position" with a 10% allotment at the current (or initial) price is executed.

The asset modification module continues to analyze the evaluation data for another operation to be triggered. At this point in the execution of the asset modification process, it may continue at any sequence level. In the example of FIG. 43, the analysis of the candlestick format of the current price is rising and triggers the "open limit 2 tops operation" when, as indicated by the trigger indicator, it is 10 units (e.g., percent, dollars, etc.) higher than the initial price (e.g., data operand). Since the activation trigger is 0, it indicates that the operation is to be activated (i.e., executed) when the trigger condition is met. As such, at this point, the asset modification module executes the operation to purchase 25% more of the asset, which now has 35% open.

As time continues, the "close limit 3 tops" operation is triggered when the candlestick format of the current price drops. The asset modification module executes the operation to sell 25% of the asset at the current price, leaving 10% of the asset open. When the candlestick format of the current price again rises, the asset modification module executes the "open limit 2 tops operation" to purchase 25% more of the asset, which now has 35% open.

As time continues, the "open remaining" operation is triggered when the line format of the current price reaches 1.2*(initial price). Since the activation indicator is 0 for this operation, the asset modification module executes the operation upon its triggering to open 100% of the asset, which, for this stage of the example, equates to purchasing 65% of the asset at the then current price. The example continues with the asset modification module executing the "close limit 3 tops" operation a couple of times perform executing a "close all positions" operation based on a close all signal.

Figure 44:
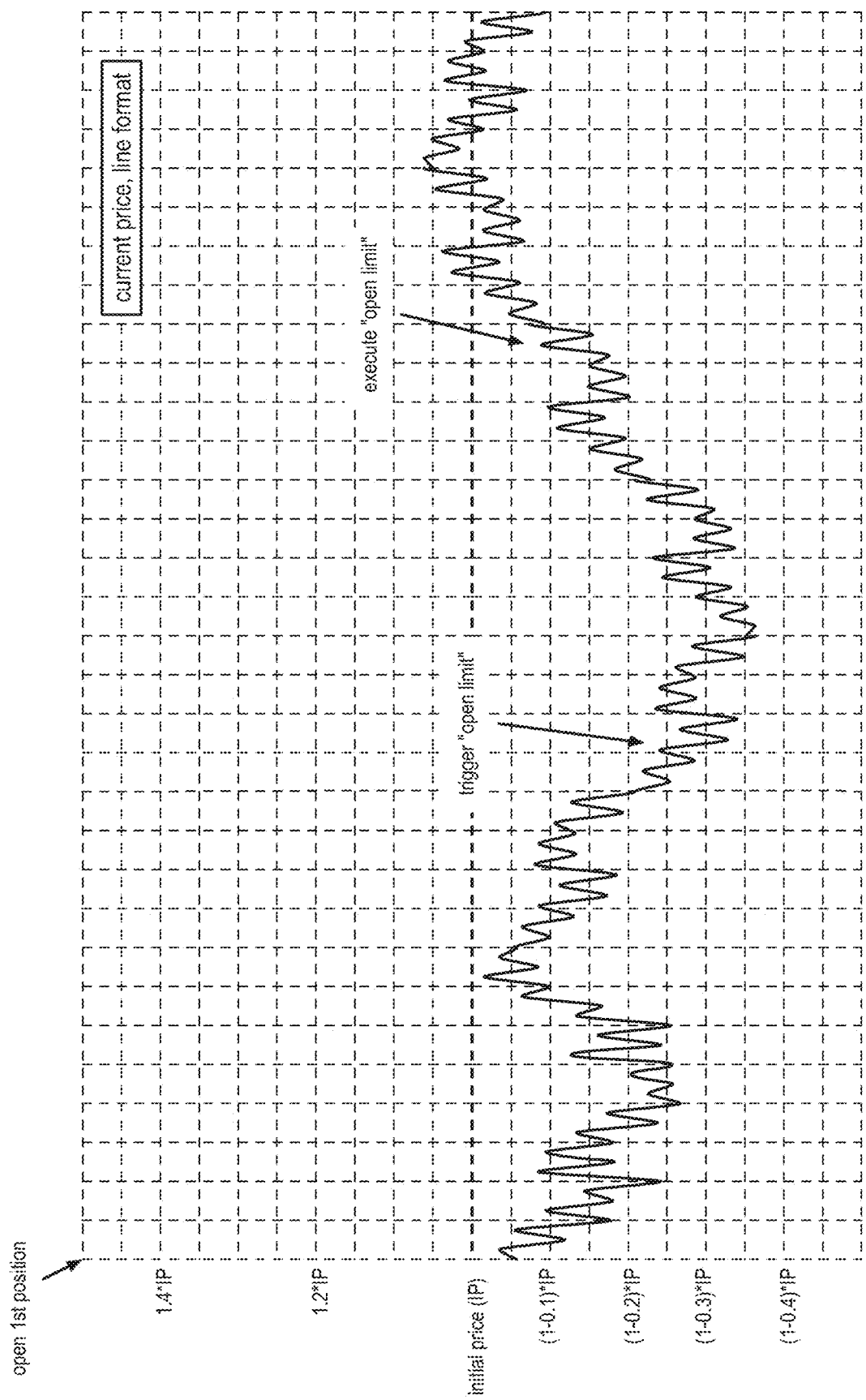
FIG. 44 is a diagram of another example of modifying an asset based on the limit table of FIGS. 41-42 in accordance with the present invention.

FIG. 44 illustrates another example of asset modification using the line format of the current price. In this example, after the initial position is opened, the current price drops from the initial price. The asset modification module analyzes the data for a triggering condition to be met. When the current price is down 30 from the initial price, the "open limit" operation is triggered (e.g., trigger indicator is –30). For this operation, the activation indicator is 20, meaning that the current price needs to rise 20 from the price at which the operation was triggered before it is executed. When this occurs, the asset modification module executes the "open limit" operation to purchase an additional 20% of the asset.

Figure 45:
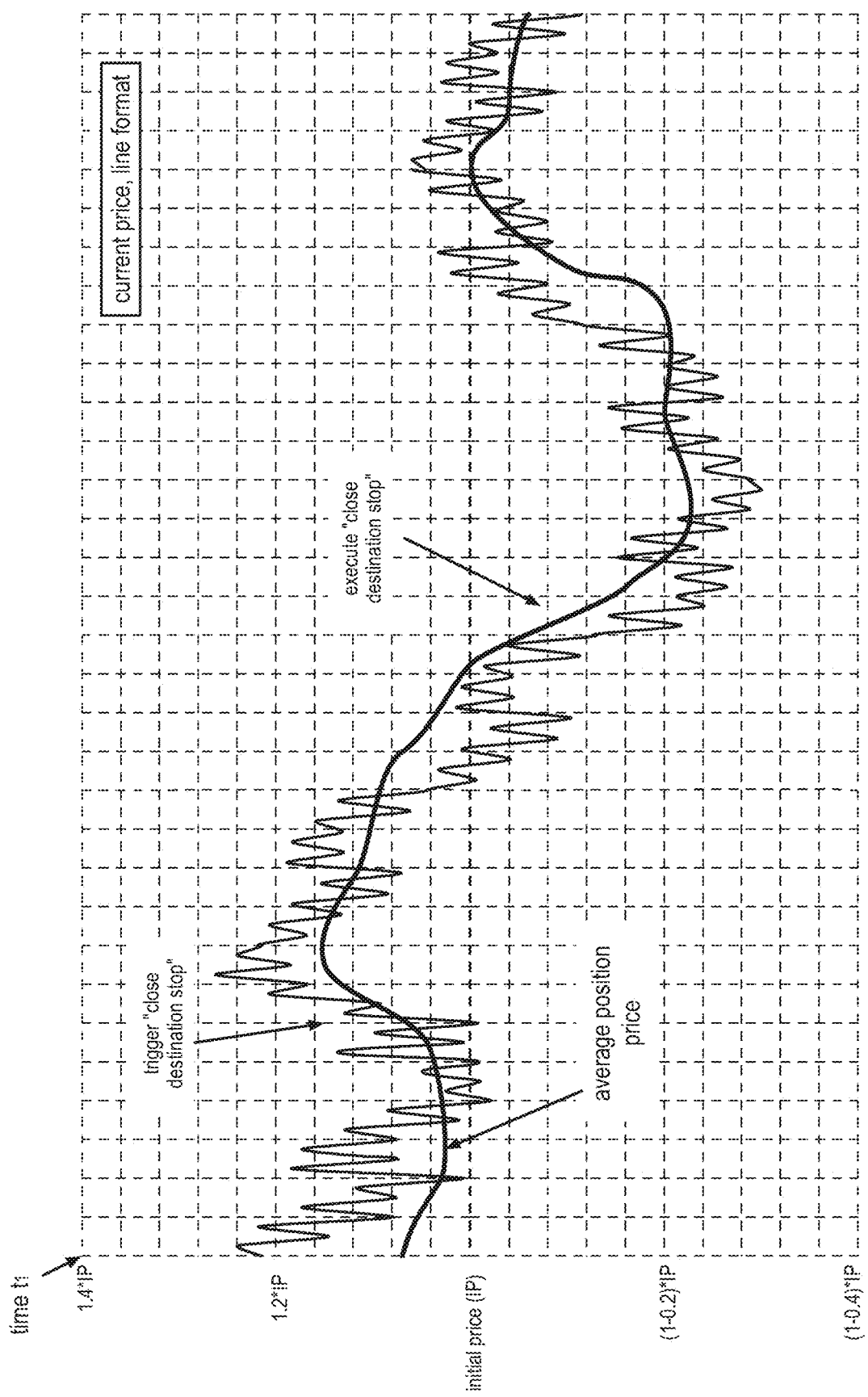
FIG. 45 is a diagram of another example of modifying an asset based on the limit table of FIGS. 41-42 in accordance with the present invention.

FIG. 45 illustrates another example of asset modification using the line format of the current price and an average position price. In this example, the analysis of the data is occurring some time after the initial position is opened (e.g., at time t1) where there is 50% of the asset open. The asset modification module analyzes the data for a triggering condition to be met. When the average position price is up 10 from a given reference point (e.g., the initial price), the "close destination stop" operation is triggered (e.g., trigger indicator is 10). For this operation, the activation indicator is 20 (e.g., −20 for a close operation), meaning that the average position price needs to drop 20 from the average position price at which the operation was triggered before it is executed. When this occurs, the asset modification module executes the "close destination stop" operation to sell all open positions of the asset, which is the 50% that was open in this example.

Figure 46:
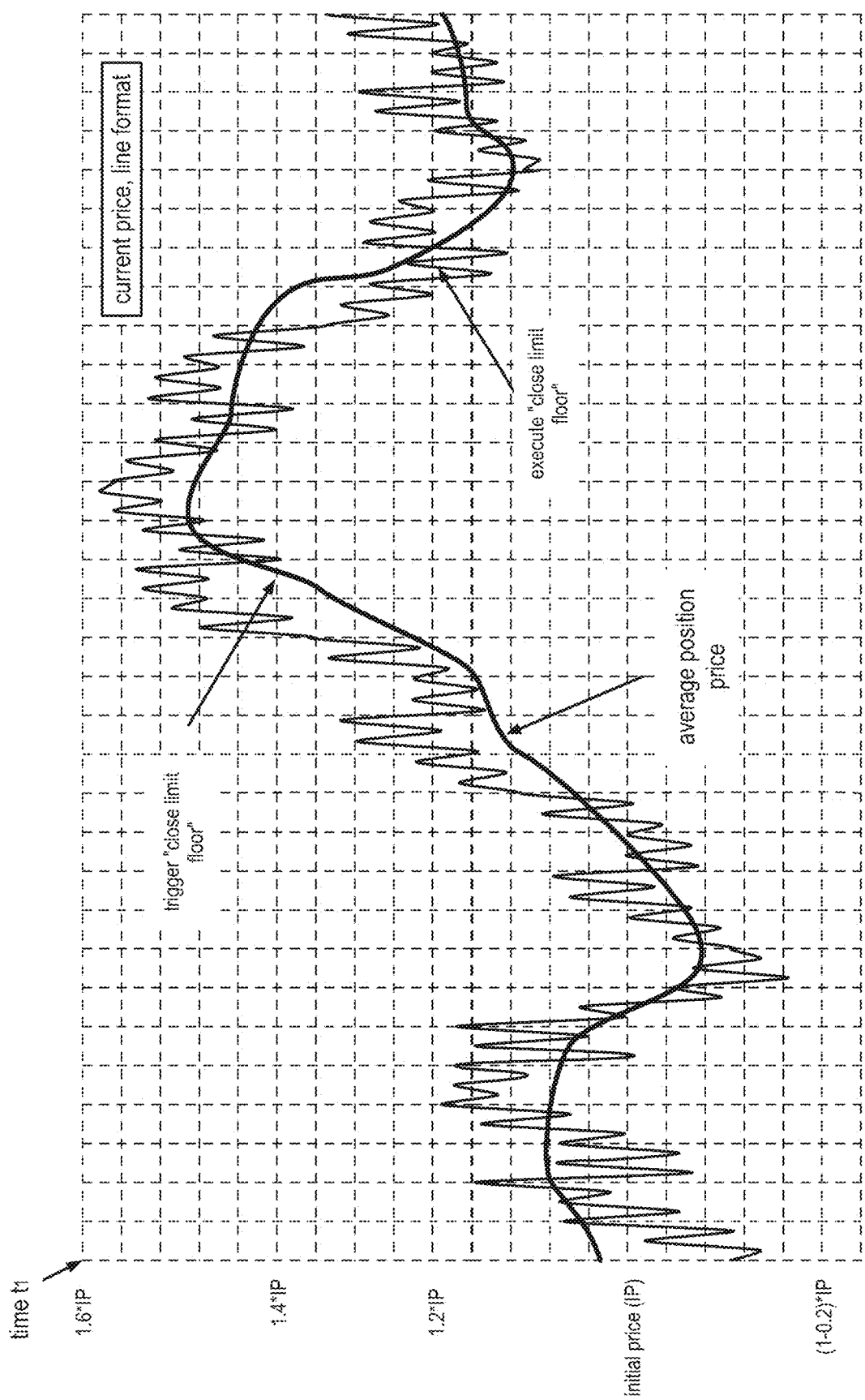
FIG. 46 is a diagram of another example of modifying an asset based on the limit table of FIGS. 41-42 in accordance with the present invention.

FIG. 46 illustrates another example of asset modification using the line format of the current price and an average position price. In this example, the analysis of the data is occurring some time after the initial position is opened (e.g., at time t1) where there is 50% of the asset open. The asset modification module analyzes the data for a triggering condition to be met. When the average position price is up 40 from a given reference point (e.g., the initial price), the "close limit floor" operation is triggered (e.g., trigger indicator is 40). For this operation, the activation indicator is 20 (e.g., −20 for a close operation), meaning that the average position price needs to drop 20 from the average position price at which the operation was triggered before it is executed. When this occurs, the asset modification module executes the "close limit floor" operation to sell 50% of the open positions of the asset, which leaves 25% of the asset open.

Figure 47:
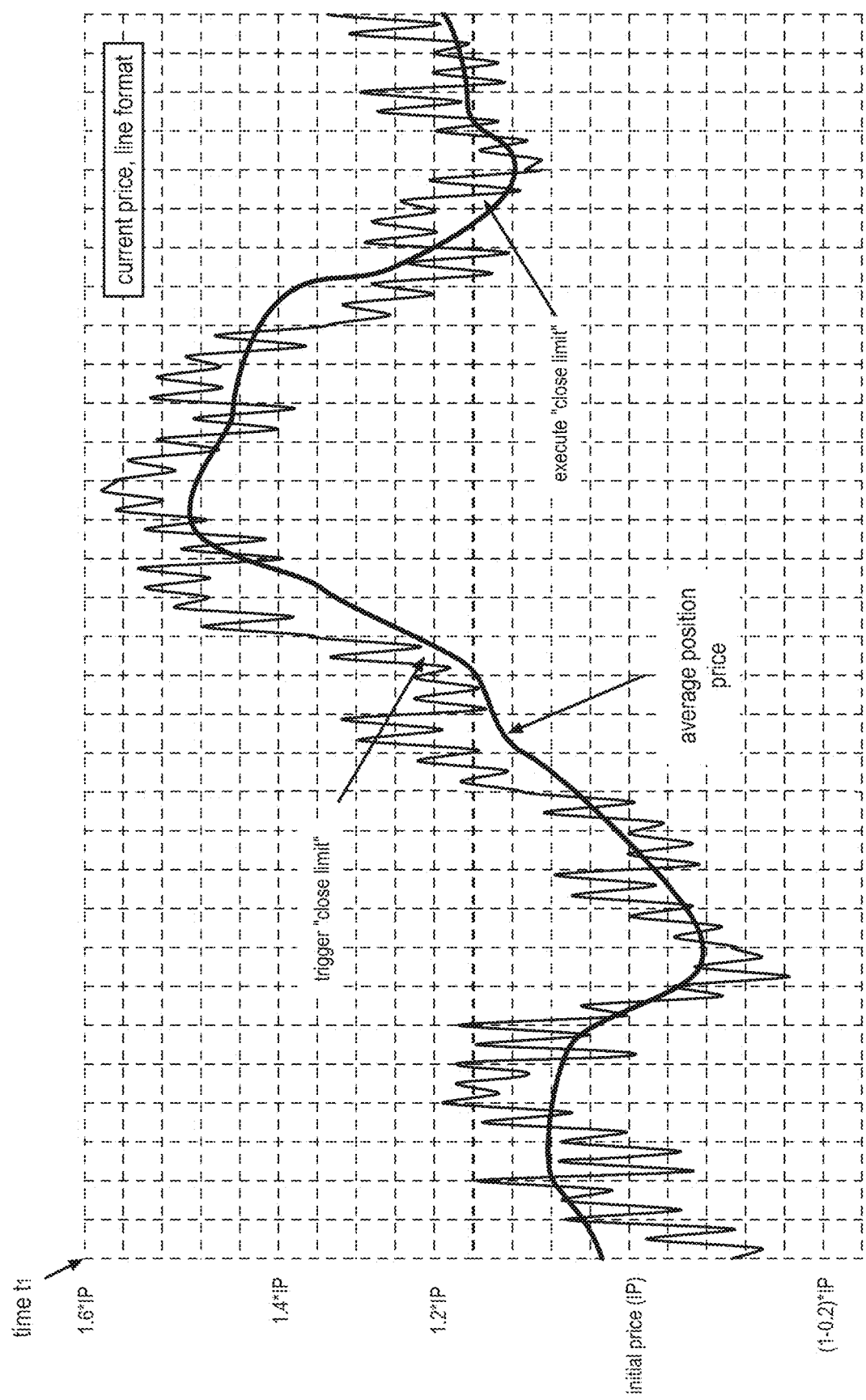
FIG. 47 is a diagram of another example of modifying an asset based on the limit table of FIGS. 41-42 in accordance with the present invention.

FIG. 47 illustrates another example of asset modification using the line format of the current price and an average position price. In this example, the analysis of the data is occurring some time after the initial position is opened (e.g., at time t1) where there is 50% of the asset open. The asset modification module analyzes the data for a triggering condition to be met. When the average position price is up 20 from a given reference point (e.g., the initial price), the "close limit" operation is triggered (e.g., trigger indicator is 20). For this operation, the activation indicator is 5 (e.g., −5 for a close operation), meaning that the average position price needs to drop 5 from the average position price at which the operation was triggered before it is executed. When this occurs, the asset modification module executes the "close limit" operation to sell 20% of the open positions of the asset, which leaves 40% of the asset open.

Figure 48:
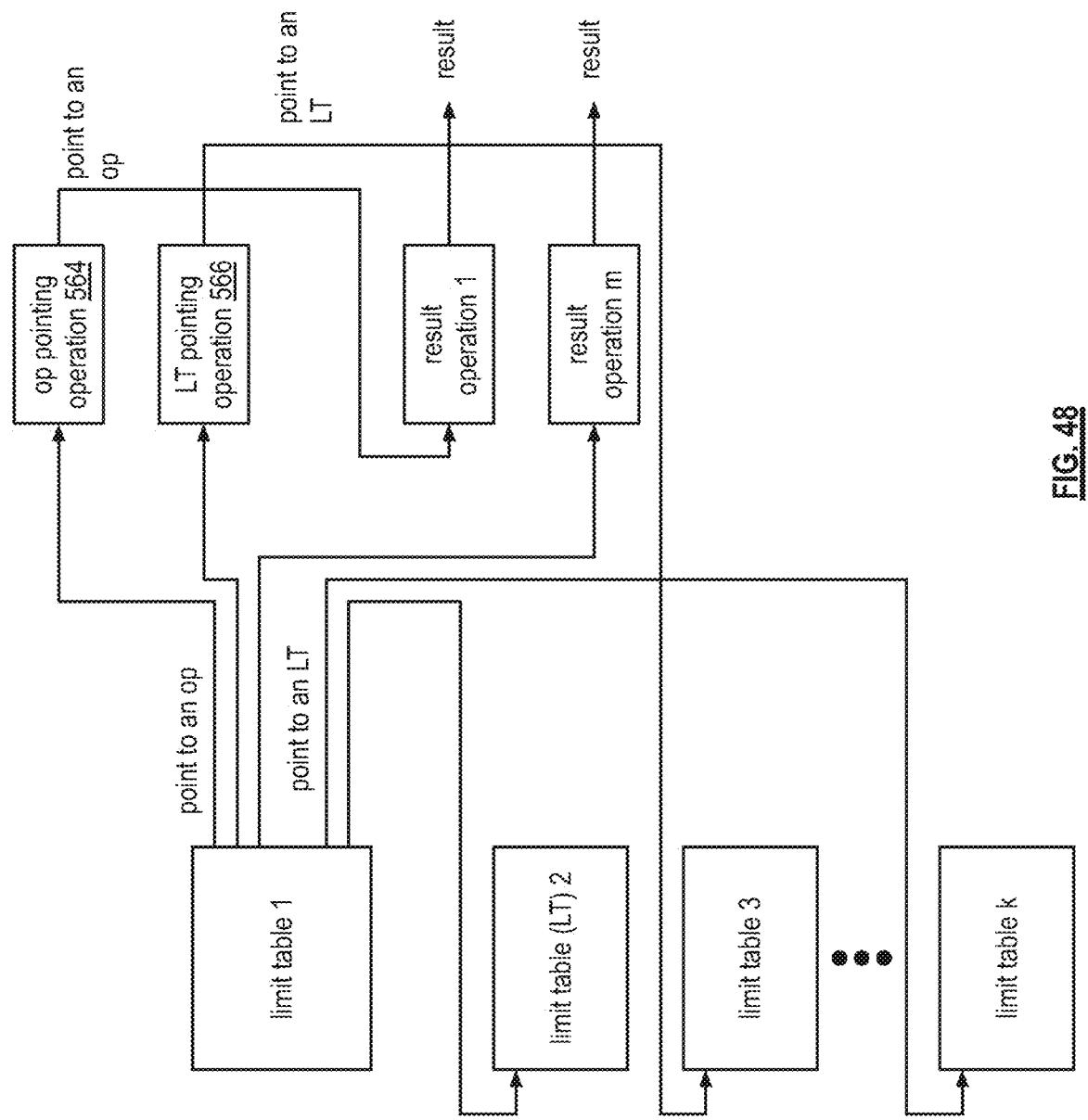
FIG. 48 is a diagram of an example of interoperations of multiple operation set limit tables in accordance with the present invention.

FIG. 48 is a diagram of an example of interoperations of multiple operation set limit tables. In this example, a limit table may include a row of information that points to another limit table, to an operation to determine an operation 564, and/or an operation to determine another limit table 566. The limit table may further include rows of information that identify particular operations as previously discussed. For example, limit table 1 includes a row of information that points to an operation pointing operation 564. The row of information includes indicators (e.g., evaluation data, operation data, trigger, and activation) that enable the operation pointing operation 564 to identify a particular result operation. As a specific example, assume that result operation l is an operation to purchase a component from a particular vendor and operation m is an operation to purchase the component from another vendor. The operation pointing operation 564 executes its operation in light of the indicators to determine whether one or both of the results operations l and m should be selected.

As another example, limit table 1 includes a row of information that points to a limit table (LT) pointing operation 566. The row of information includes indicators (e.g., evaluation data, operation data, trigger, and activation) that enable the LT pointing operation 566 to identify a particular limit table. As a specific example, assume that limit table 2 is regarding purchasing a component based on a first set of evaluation data and limit table 3 is regarding purchasing a component based on a second set of evaluation data. The LT pointing operation 566 executes its operation in light of the indicators to determine whether one or both of the limit tables 2 and 3 should be selected. Note that part of the operation may be to test each limit table in light of past evaluation data to determine which one to select.

As yet another example, limit table 1 includes a row of information that points to a limit table (LT). The row of information includes indicators (e.g., evaluation data, operation data, trigger, and activation) that enable limit table 1 to identify a particular limit table. As a specific example, assume that limit table 2 is regarding purchasing a component based on a first set of evaluation data and limit table 3 is regarding purchasing a component based on a second set of evaluation data. Limit table 1 executes the appropriate operation in light of the indicators to determine whether one or both of the limit tables 2 and 3 should be selected.

Figure 49:
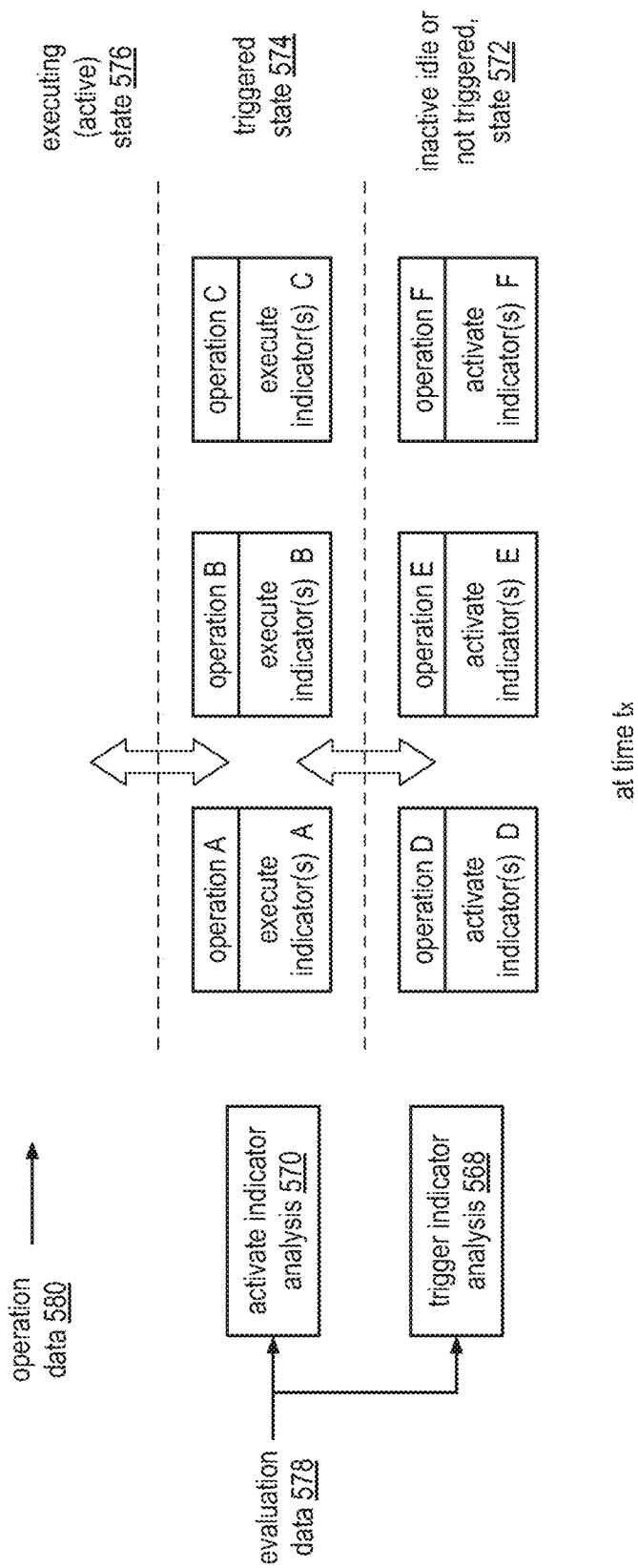
FIG. 49 is a diagram of an example of operation of an operation set limit table in accordance with the present invention.

FIG. 49 is a diagram of an example of an asset modification module implementing an asset modification process via an operation set limit table that includes rows of information for six operations (A-F). A trigger indicator analysis module 568 and an activation indicator analysis module 570 of the asset modification module are shown. The asset modification module may include other modules as previously discussed. Each of the operations may be in one of three states: inactive state 572 (i.e., not triggered), triggered 574, and executing 576.

In this example, at time tx, operations A, B, and C are in the triggered state 574 and operations D, E, and F are in the inactive state 572. In addition, the trigger indicator analysis module 568 is analyzing the evaluation data 578 to determine whether to trigger one or more of operations D, E, and F and the activation indicator analysis module 570 is analyzing the evaluation data 578 to determine whether to activate for execution one or more of operations A, B, and C.

Figure 50:
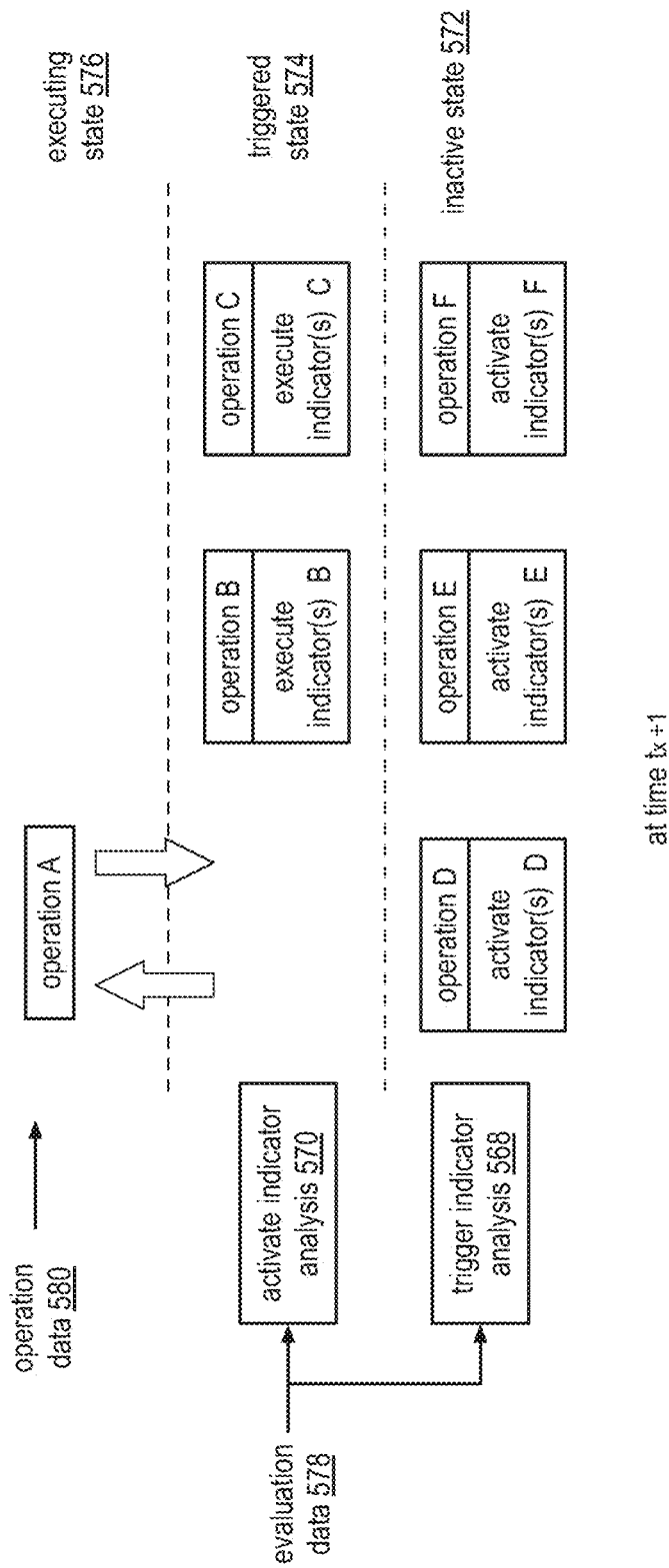
FIG. 50 is a diagram of another example of operation of an operation set limit table in accordance with the present invention.

FIG. 50 is a continuation of the example of FIG. 49 at time tx+1. At this point in time, the activation indicator analysis module 570 determines that the evaluation data 578 is exhibiting a condition that corresponds to an activation indicator for operation A. As such, operation A is activated for execution on the corresponding operation data 580. Once operation A has performed its operation and outputs its result, it is returned to a triggered state 574.

Figure 51:
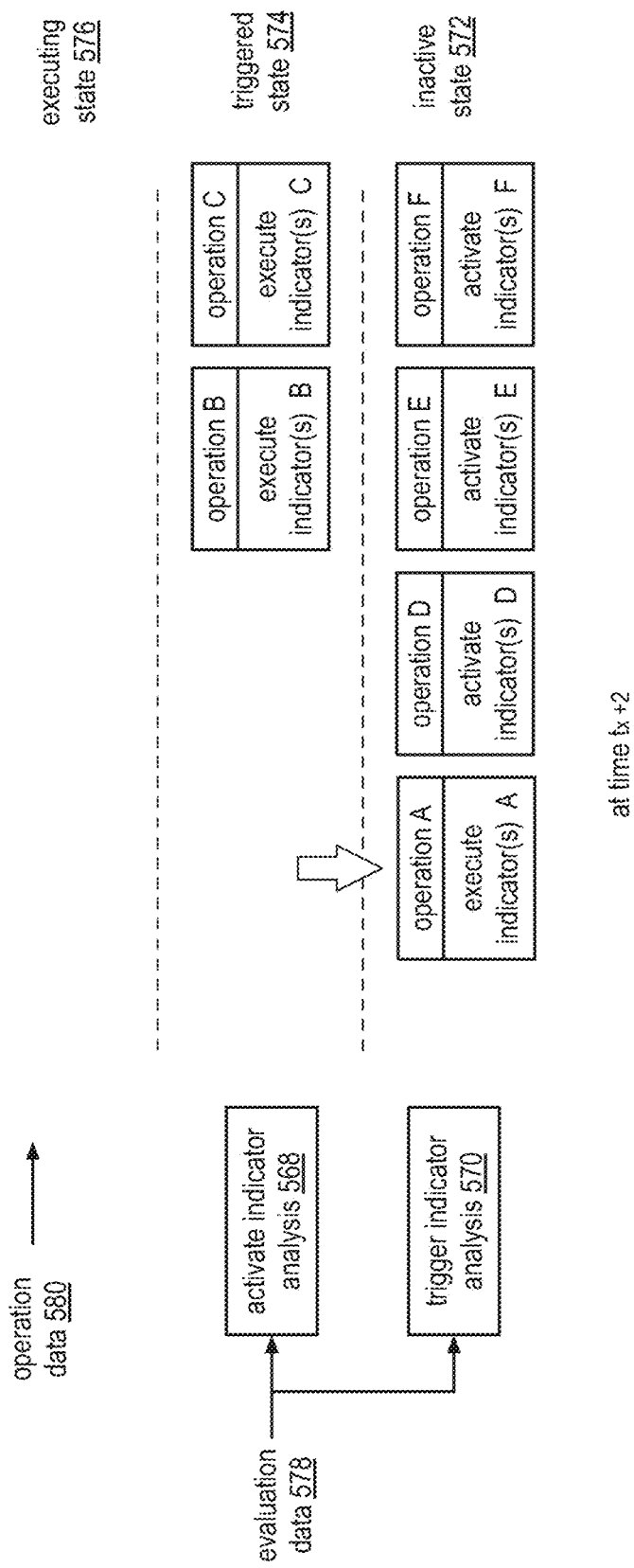
FIG. 51 is a diagram of another example of operation of an operation set limit table in accordance with the present invention.

FIG. 51 is a continuation of the example of FIGS. 49 & 50 at time tx+2. At this point in time, the trigger indicator analysis module 570 determines that the evaluation data 578 is exhibiting a condition that corresponds to a detriggering indicator for operation A. As such, operation A is detriggered and placed in the inactive state 572.

Figure 52:
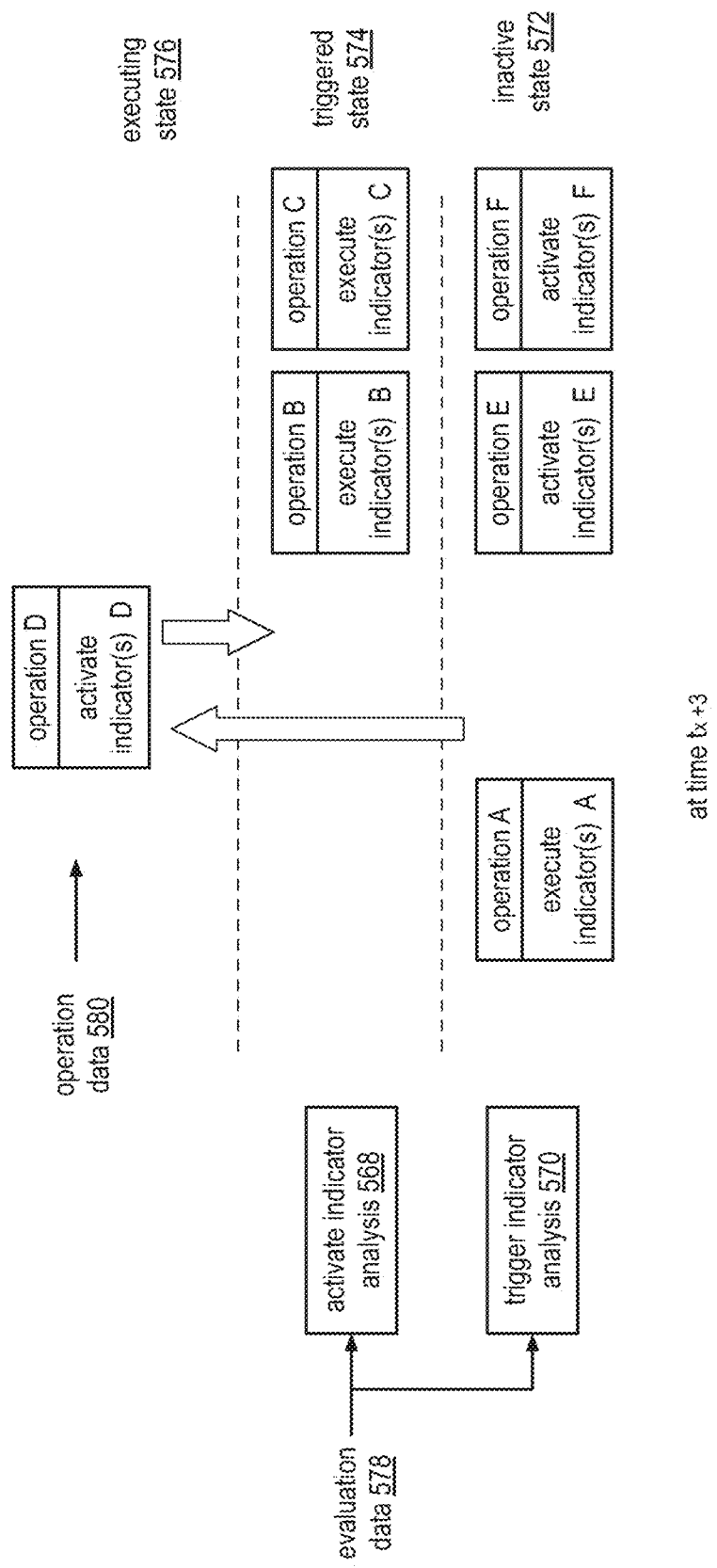
FIG. 52 is a diagram of another example of operation of an operation set limit table in accordance with the present invention.

FIG. 52 is a continuation of the example of FIGS. 49-51 at time tx+3. At this point in time, each of the trigger and activation indicator analysis modules 568-570 determines that the evaluation data 578 is exhibiting a condition that corresponds to a trigger indicator and an activation indicator, respectively, for operation D. As such, operation D is activated for execution on the corresponding operation data 580. Once operation D has performed its operation and outputs its result, it is returned to a triggered state 574.

FIG. 53 is a diagram of another example of an operation set limit table 212 that includes a plurality of columns and rows of information corresponding to operations. This limit table is similar to the limit tables of FIGS. 9 and 34, with the exception that it does not include a sequence column. As such, when the asset modification module is performing an asset modification process in accordance with the limit table, the trigger and activation indicators for each operation is analyzed with reference to the appropriate evaluation data. Thus, any one or more of the operations may be triggered and/or activated at a given time without reference to what other operations may or may not be triggered and/or activated. Note that the limit table 212 may include one or more rows of information that point to another limit table, to an operation pointing operation, and/or to a limit table pointing operation as discussed with reference to FIG. 48.

Figure 54:
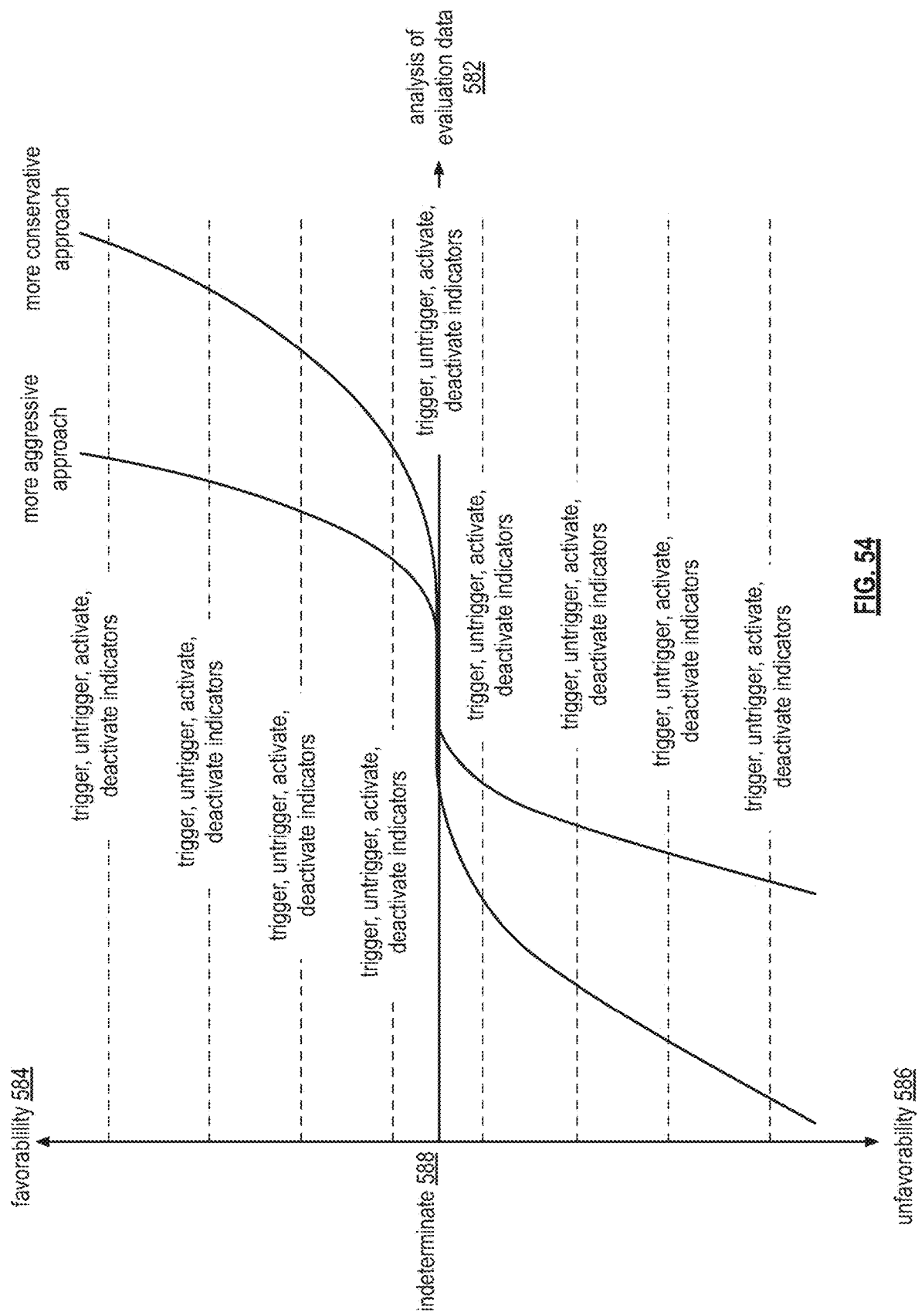
FIG. 54 is a diagram of an example of building an operation set limit table in accordance with the present invention.

FIG. 54 is a diagram of an example of differing philosophies when building an operation set limit table. In this diagram, the horizontal axis corresponds to an approach to analyzing the evaluation data 582, where, closer to the origin, corresponds to a more aggressive approach. The positive vertical axis corresponds to a favorable analysis 584 (e.g., the evaluation data is indicating conditions are favorable to increase an asset), where, the further from the origin, the more favorable. The negative vertical axis corresponds to an unfavorable analysis 586 e.g., the evaluation data is indicating conditions are unfavorable to increase an asset), where, the further from the origin, the more unfavorable.

In general, the analysis of the evaluation data 582 includes, but is not limited to, detecting predictable patterns, trends, factors, values, etc. of the current evaluation data. The level of favorability (or unfavorability) is how closely the detected patterns, trends, factors, values, etc. match past patterns, trends, factor values, etc., the predictability of the asset modification outcome therefrom, and the likelihood that evaluation data will continue to follow past trends, patterns, factors, values, etc. For example, when the analysis yields patterns, trends, etc. that don't particular match the predictable patterns, trends, etc., the favorability may be indeterminate 588. The analysis may also be indeterminate 588 if the pattern, trend, etc. are corresponding to predictable patterns, trends, etc., but the outcome of asset modification from these patterns is mixed (e.g., 50% of the time, the asset grows, 30% of the time the asset decreases, and 20% of the time the asset remains relatively constant). The analysis may further be indeterminate if the pattern, trend, etc. are corresponding to predictable patterns, trends, etc., but the likelihood that the evaluation data will continue to follow the trends, patterns, etc. is mixed (e.g., sometimes it does continue and other times it does not).

As the ability to calculate a favorable or unfavorable analysis, the more the curve moves from the origin (e.g., the indeterminate state). Even though the analysis may be indeterminate, a limit table may include one or more operations to modify an asset in this state of analysis. The amount of an asset to expose to modification and what indicators to set for triggering and activating the modification process will vary depending on the aggressiveness of the approach being taken. The more aggressive the approach, the more of the asset will be exposed and the lower the thresholds for the indicators will be.

When the analysis is favorable, the level of favorability 584 may be used to determine how much of the asset to expose for modification and the threshold for the indicators. For instance, when the pattern, trend, etc. matching is good, the predictability is good, and the likelihood of continuing is good, then may want to take an aggressive approach and subject a majority of the asset to modification. Conversely, when the analysis is unfavorable 586, may want to take a less aggressive approach to minimize the asset to modification.

FIG. 55 is a diagram of an example of historical evaluation data table 590 for building an operation set limit table. The table includes fields for evaluation data ID 592, characteristics 594, recognition filter parameters 596, frequency 598, frequency deviation 600, factors 602, subsequent characteristics 604, and probability of subsequent characteristics 606. Each row corresponds to a particular characteristic of one or more evaluation data. An evaluation data may be identified in multiple rows for different characteristics.

For example, evaluation data 1 is being analyzed for pattern α using two different recognition filter parameters. Using these parameters, the pattern occurs about three times per day for the last month with a daily deviation of 0.65 times per day. For parameter set 1, the factors include that this pattern is not preceded by pattern β. Under these conditions, trend B will occur within a given time frame (e.g., factions of a second, seconds, minutes, hours, days, etc.) with a probability of 67% (e.g., for the number of times these conditions have been monitors, trend B follows pattern α within the time frame 67% of the time). For parameter set 2, the factors include that this pattern is preceded by pattern β. Under these conditions, trend A will occur nearly immediately (e.g., factions of a second, seconds, etc.) with a probability of 80%.

As another example, evaluation data 2 is being analyzed for pattern φ, trend A, and a three-month minimum value using different parameters. For the time the evaluation data has been analyzed, which could be days, weeks, months, etc., pattern φ occurs about 7 times per day for the last two weeks and trend A has occurred once per day for the last five weeks. Pattern φ has a daily deviation of 3.5 and trend A has a daily deviation of 0.15. The factor for pattern φ is that current evaluation data has to exceed a value of M; there are no factors for trend A. When these conditions are met for pattern φ, pattern Ψ is the subsequent pattern about 40% of the time, pattern λ is the subsequent pattern about 30% of the time, and the remaining 30% of the time there is no discernable characteristic. When the three-month minimum value is detected, trend C occurs within 2 days about 80% of the time.

The last entry in the table identifies evaluation data 4, 5, and 6 with a characteristic of function 1. The function may be a logic function, a mathematical function, a comparative function, a translation function, a scaling function, a mapping function, a filtering function, a combination thereof, etc. The analysis provided favorable results with a frequency of 2 times per day for the last 8 weeks with a daily deviation of 0.35. There are no factors and the subsequent characteristic is pattern Ω of evaluation data 4 within K minutes at a probability of 35%. In practice, the evaluation data being analyzed, the characteristics, the parameters, the frequency, the frequency deviation, factors, subsequent characteristics, and probability may be in an almost endless combination and range of results.

Figures 56, 57, 58:
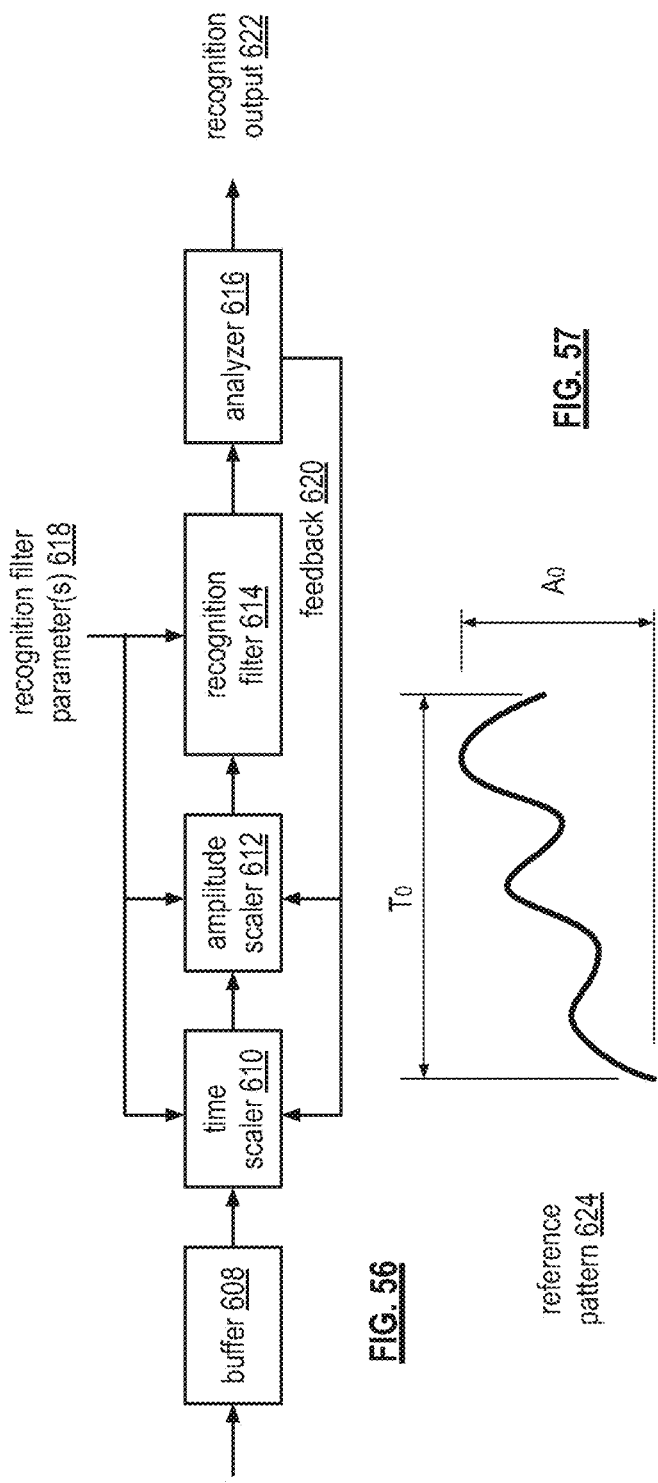
FIG. 56 is a schematic block diagram of an embodiment of an evaluation filter of an asset modification module in accordance with the present invention.
FIG. 57 is a diagram of an example of a reference pattern in accordance with the present invention.
FIG. 58 is a diagram of an example of a reference pattern in accordance with the present invention.

FIG. 56 is a schematic block diagram of an embodiment of an evaluation filter of an asset modification module that may be used to build a limit table. The evaluation filter includes a buffer 608, a time scaler 610, an amplitude scaler 612, a recognition filter 614, and an analyzer 616. The buffer 608 is of sufficient size to store a sample set of the evaluation data being analyzed. The time scaler 610 and amplitude scaler 612 function in accordance with the recognition filter parameters 618 to scale the samples of the evaluation data to fit within a sample window of a reference pattern 624. FIG.

57 is a diagram of an example of a reference pattern 624 that is within a sample window having a time frame of T0 and an amplitude range of A0.

The recognition filter 614, which may be a matching filter, a convolution filter, etc., filters the scaled evaluation data samples for one or more recognizable characteristics (e.g., trends, patterns, values, function result, etc.) in light of the recognition filter parameters 618 (e.g., a reference pattern, a reference trend, a reference value, a reference function result, etc.). The analyzer 616 analyzes the filters output for how closely the evaluation data (e.g., as shown in FIG. 58) matches the reference characteristic to produce a recognition output 622. The more closely the filtered evaluation data matches the reference pattern 624, the more favorable the analysis. In addition, the analyzer 616 may provide feedback 620 to adjust the time and/or amplitude scaling to adjust the evaluation data sample 626.

Figure 59:
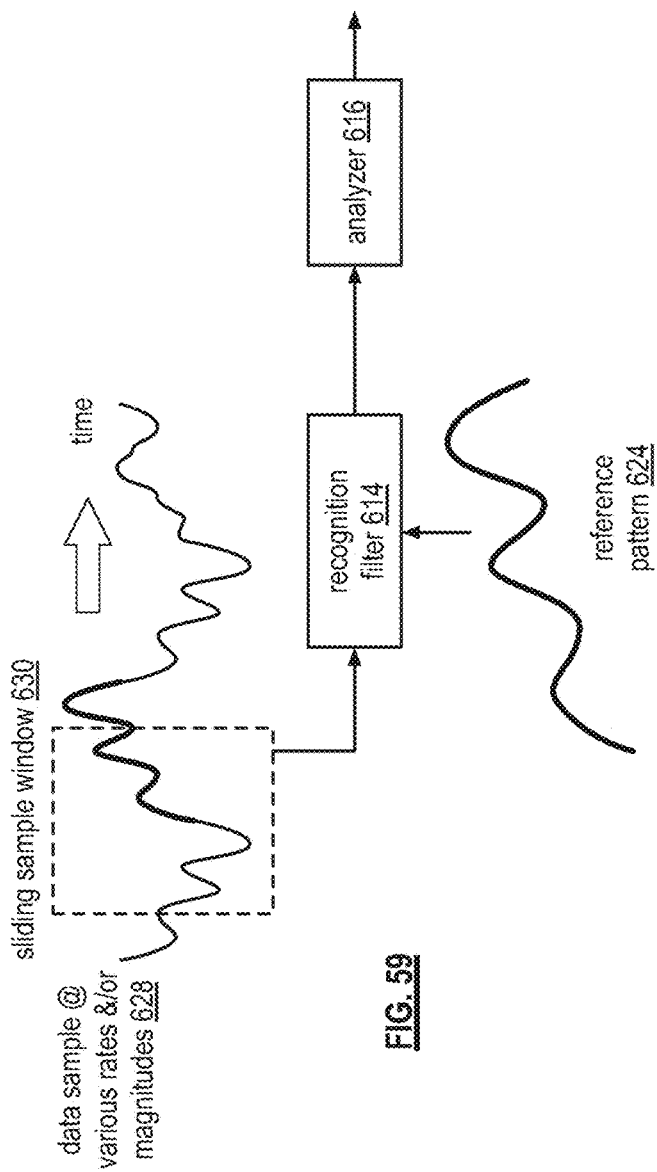
FIG. 59 is a schematic block diagram of an example of operation of an evaluation filter in accordance with the present invention.

FIG. 59 is a schematic block diagram of an example of operation of an evaluation data recognition filter 614. In this example, the evaluation data sample is at various rates and/or magnitudes 628. As the time window 630 scans the evaluation data sample, the recognition filter 614 is comparing it to a reference characteristic (e.g., a reference pattern 624).

Figure 60:
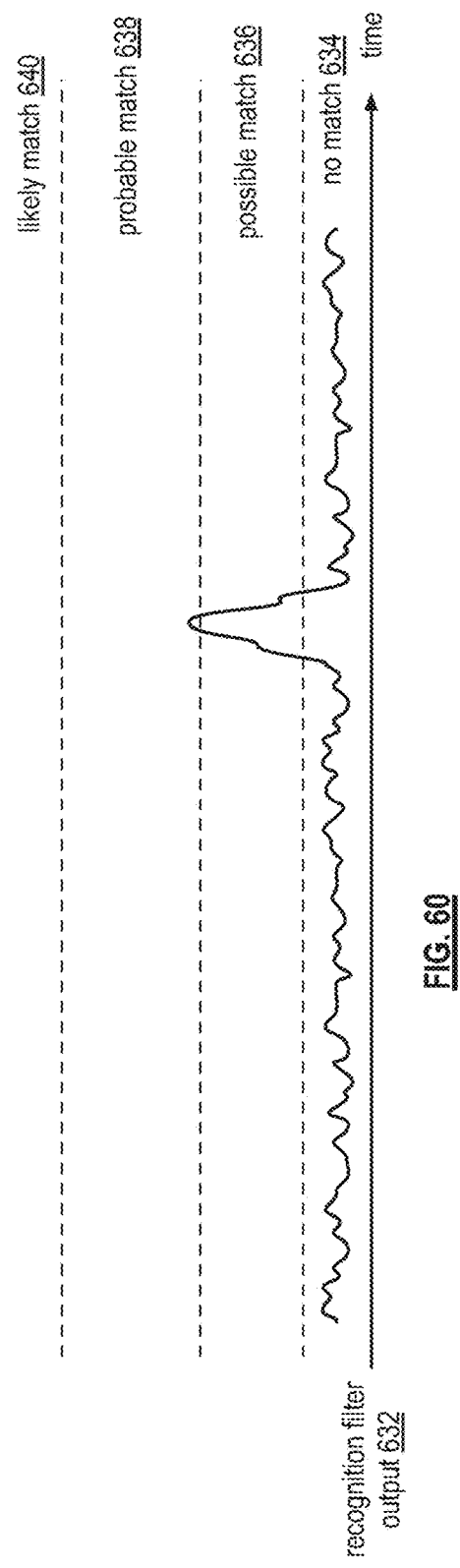
FIG. 60 is a diagram of an example output of an evaluation filter in accordance with the present invention.

FIG. 60 illustrates the output of the recognition filter 632 as the time window 630 scans the evaluation data sample. For a majority of the sample time window 630, the output of the filter is low. The analyzer 616 analyzes the output with reference to thresholds (e.g., no match, possible match, probable match, likely match, etc.). When the output is below the no match threshold 634, the analyzer 616 provides no feedback and keeps the time window 630 scanning the evaluation data sample.

When the output of the filter is above the no match threshold 634, the analyzer 616 has some decisions to make. First, it decides what other thresholds the output exceeds. If it exceeds the likely match threshold 640, the analyzer marks the current time window position of the evaluation data sample to indicate a likely match to the reference characteristic. In this instance, the analyzer 616 continues analyzing the output of the filter for the reference characteristic to occur again. Note that the filter may be analyzing the evaluation data with respect to multiple reference characteristics. In this instance, when the output exceeds the no match threshold, the analyzer determines whether another threshold is exceeded and for what reference characteristic.

When the output of the filter is at a level above the no match threshold 634 and below the likely match threshold 640, the analyzer 616 may provide feedback to adjust the evaluation data sample to determine if a better indication of a match can be achieved. If yes, the analyzer 616 includes that in the recognition output 632. If not, the analyzer 616 includes the initial, or more favorable, match outcome as the recognition output.

Figure 61:
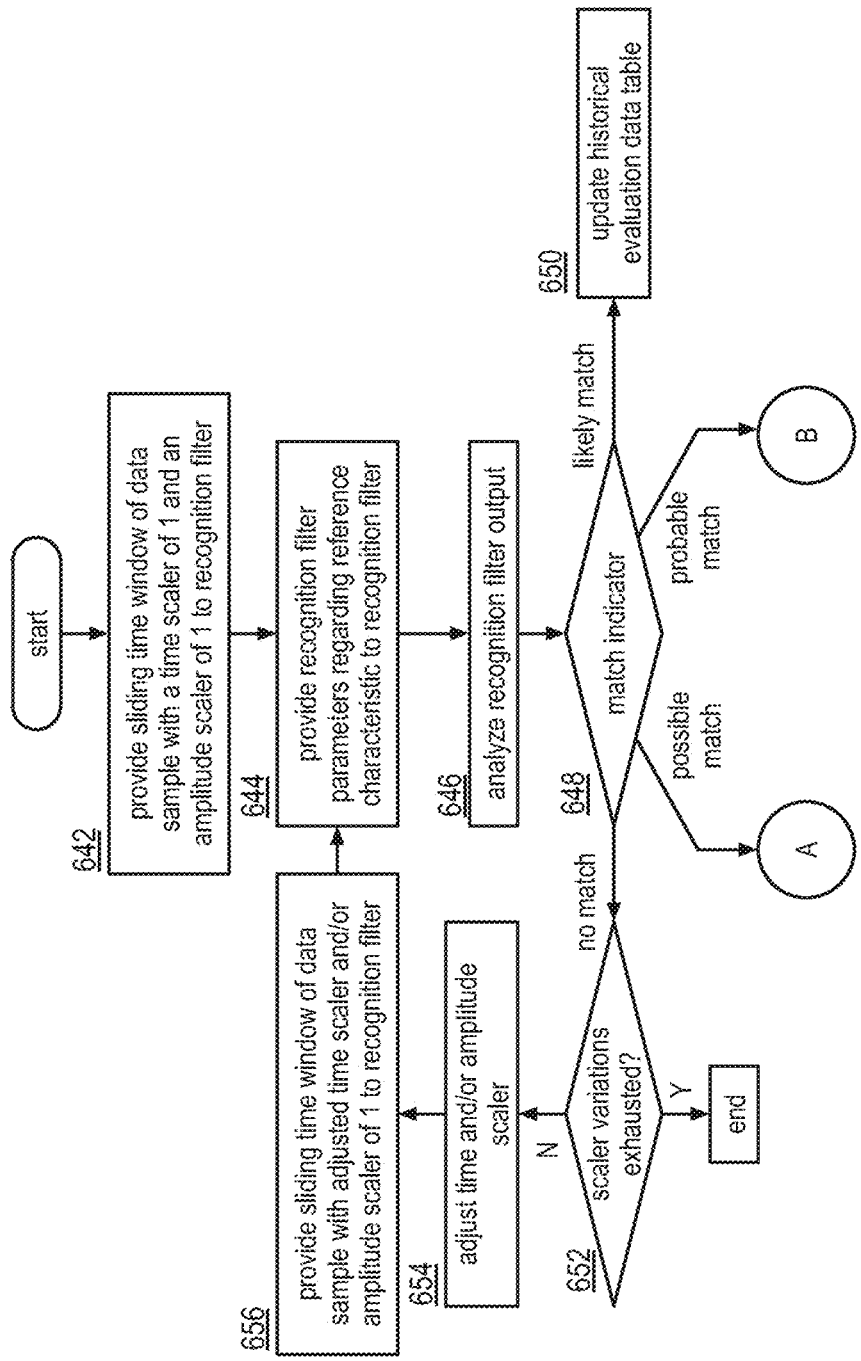
FIGS. 61-63 are a logic diagram of a method for building a limit table in accordance with the present invention.
Figure 62:
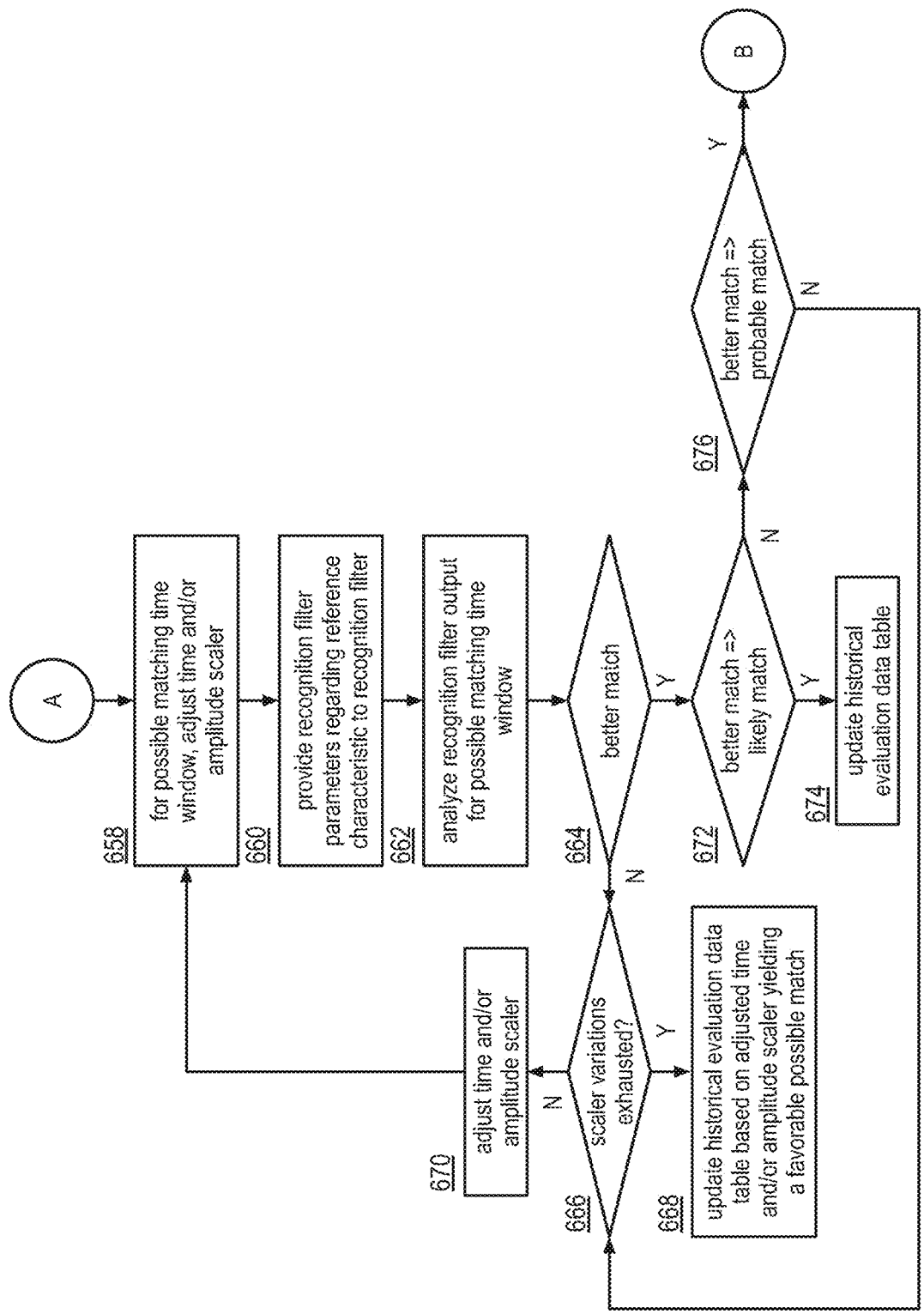
Figure 63:
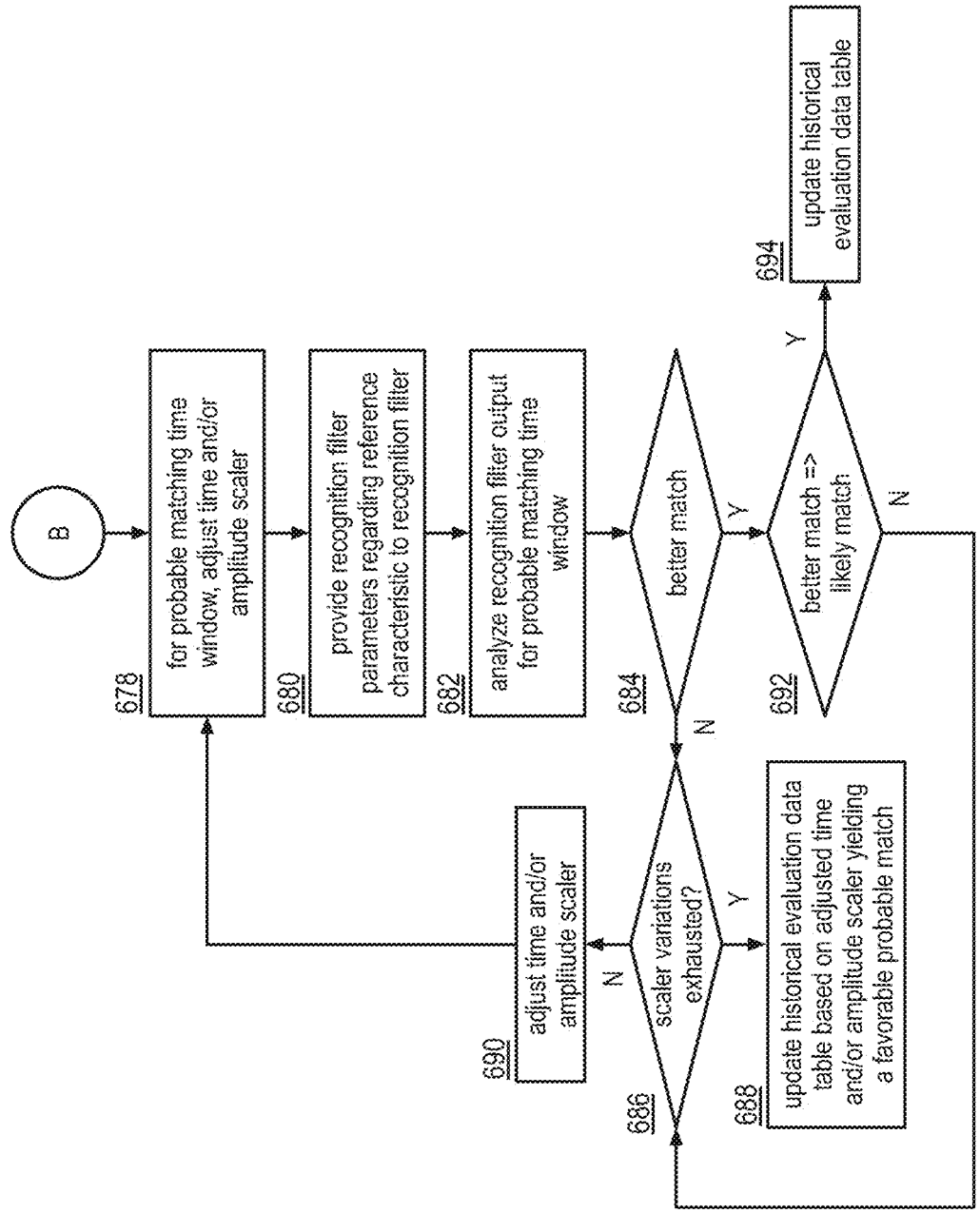

FIGS. 61-63 are a logic diagram of a method for building a limit table that may be executed by recognition filter module. The method begins with the module providing a sliding time window of an evaluation data sample to the recognition filter without adjustment to the time scale or the amplitude scale 642. The method continues with the module providing recognition filter parameters regarding a reference characteristic to the recognition filter 644. The method continues with the module analyzing the recognition filter output 646.

The method branches in accordance with the analysis of the recognition filter output 648. When the match indicator indicates a likely match, the evaluation data history table is updated 650. When the match indicator indicates no match, the method continues with the module determining whether the time and/or amplitude scaling variations have been exhausted 652. For example, may allow for scaling from 50% to 200% of the original evaluation data sample. If the variations are exhausted, the method is ended for the current analysis, but repeats for further analysis of evaluation data samples.

If the variations are not exhausted, the method continues with the module adjusting the time and/or amplitude of the evaluation data sample 654. The method continues with the module providing the adjusted evaluation data sample to the recognition filter and the method repeats as shown 656.

When the match indicator indicates a possible match, the method continues in FIG. 62 where the module adjusts the time and/or amplitude of the evaluation data sample 658. The method continues with the module providing the adjusted evaluation data sample to the recognition filter 660. The method continues with the module providing a sliding time window to the recognition filter for the adjusted evaluation data sample. The method continues with the module providing recognition filter parameters regarding a reference characteristic to the recognition filter. The method continues with the module analyzing the recognition filter output 662.

The method continues with the module analyzing the output of the recognition filter for a better match 664. If a better match is not indicated, the method continues with the module determining whether the time and/or amplitude scaling variations have been exhausted 666. If the variations are exhausted, the module updates the historical evaluation data table based on the results of the possible match 668. If the variations are not exhausted, the method continues with the module adjusting the time and/or amplitude of the evaluation data sample 670. The method continues with the module providing the adjusted evaluation data sample to the recognition filter and the method repeats as shown.

When the analysis indicates a better match, the method continues with determining whether the better match is a likely match 672. If yes, the method continues with the module updating the historical evaluation data table based on the results of the likely match 674. If the better match is not a likely match, the method continues with the module determining whether the better match is a probable match 676. If not, the method repeats as shown. If yes, the method continues on FIG. 63.

In FIG. 63, when the match indicator indicates a probably match, the method continues with the module adjusting the time and/or amplitude of the evaluation data sample 678. The method continues with the module providing the adjusted evaluation data sample to the recognition filter. The method continues with the module providing a sliding time window to the recognition filter for the adjusted evaluation data sample. The method continues with the module providing recognition filter parameters regarding a reference characteristic to the recognition filter 680. The method continues with the module analyzing the recognition filter output 682.

The method continues with the module analyzing the output of the recognition filter for a better match 684. If a better match is not indicated, the method continues with the module determining whether the time and/or amplitude scaling variations have been exhausted 686. If the variations are exhausted, the module updates the historical evaluation data table based on the results of the probable match 688. If the variations are not exhausted, the method continues with the module adjusting the time and/or amplitude of the evaluation data sample 690. The method continues with the module providing the adjusted evaluation data sample to the recognition filter and the method repeats as shown.

When the analysis indicates a better match, the method continues with determining whether the better match is a likely match 692. If yes, the method continues with the module updating the historical evaluation data table based on the results of the likely match 694. If the better match is not a likely match, the method repeats as shown.

Figure 64:
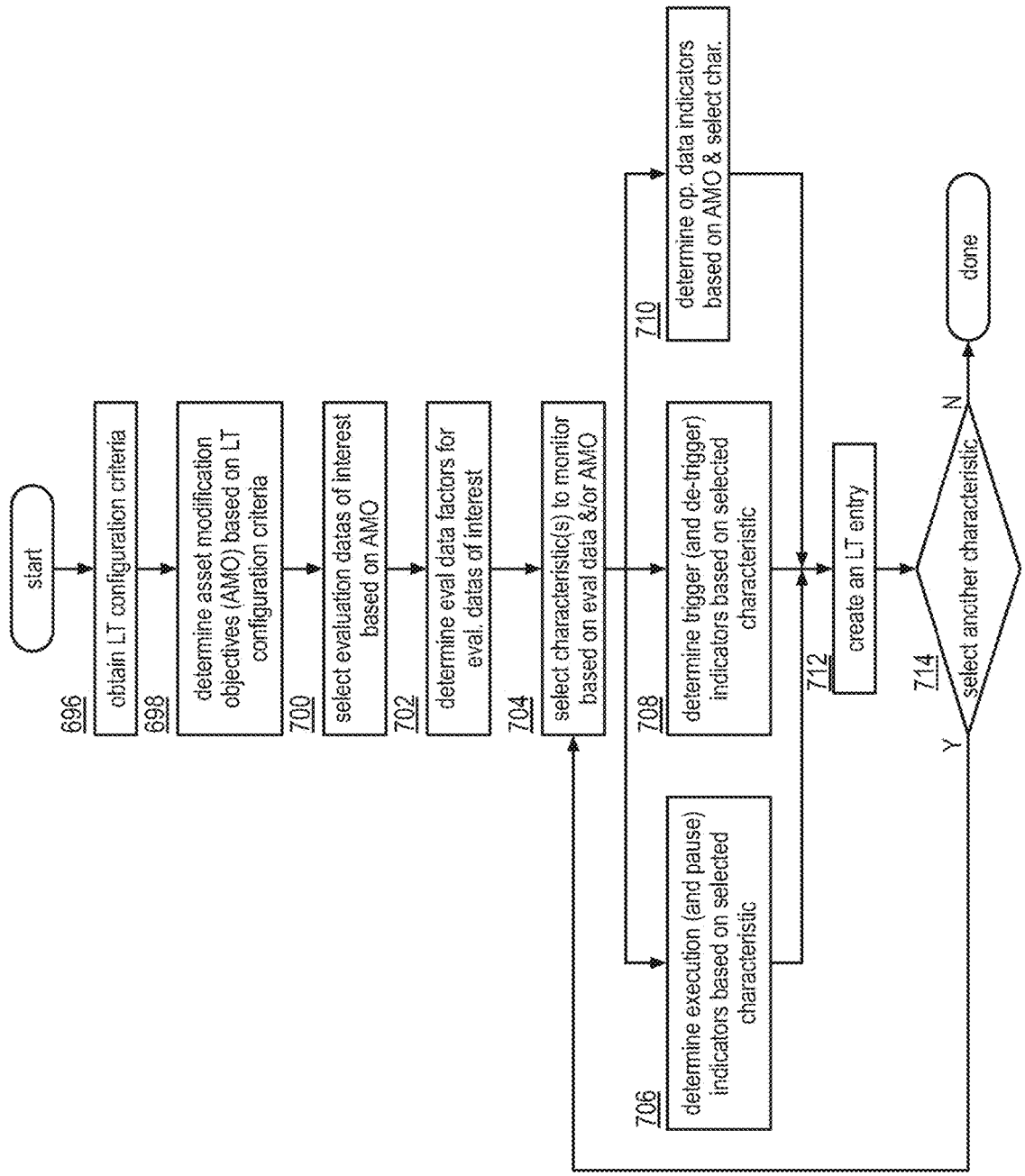
FIG. 64 is a logic diagram of another method for building a limit table in accordance with the present invention.

FIG. 64 is a logic diagram of another method that may be executed by an asset modification module or other processing module to build a limit table. The method begins with the module obtaining limit table (LT) configuration criteria, which relates to desired attributes of the limit table 696. The attributes include, but are not limited to, risk level, evaluation data relevancy, asset modification philosophy, reliability level (e.g., proven, unproven, works sometimes, etc.), favorable evaluation data patterns and/or trends, performance information, etc.

The method continues with the module determining asset modification objectives based on the LT configuration criteria 698. The asset modification objectives include, but are not limited to, grow asset, gather information, manage asset use, manage asset distribution, identify use opportunities, identify sales opportunities, and identify acquisition opportunities.

The method continues with the module selecting evaluation data of interest based on the asset modification objectives 700. The method continues with the module determining evaluation data factors (e.g., type of asset, modification timing (e.g., time of day, inventory depletion, etc.), evaluation data sources of interest availability, evaluation data analysis (e.g., pattern mapping, trend detection, value thresholds, comparative analysis, etc.)) 702. The method continues with the module selecting characteristics of the selected evaluation data to monitor based on the evaluation data and the asset modification objectives 704. These three steps may be based on default settings, starting with a large number of evaluation data and narrowing via these steps, user inputs, a look up table, subscription to evaluation data sources, trial and error, etc.

The method branches into three parallel branches. In the parallel branches, the module determines activation indicators based on the selected characteristics 706, determines trigger indicators based on the selected characteristics 708, and determines operation data indictors based on the asset modification objectives and the selected characteristics 710.

The method continues with the module creating a limit table entry based on the foregoing 712. The method continues with the module determining whether to select another characteristic 714. If yes, the method repeats as shown. If not, the method is complete.

Figure 65:
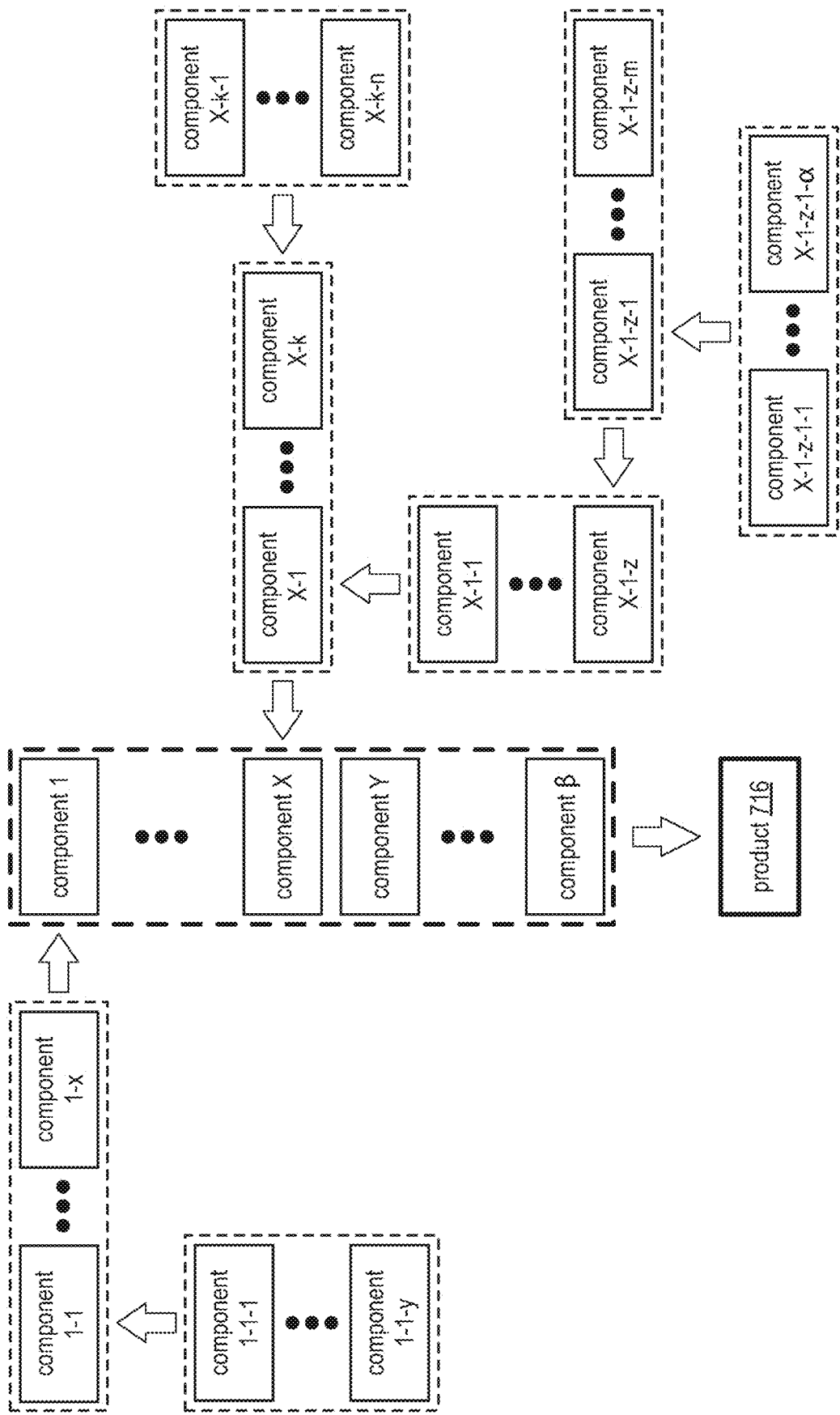
FIG. 65 is a schematic block diagram of an example of an assembly line of building a product in accordance with the present invention.

FIG. 65 is a schematic block diagram of an example of an assembly line of building a product 716. In this example, the product 716 is comprised of a plurality of components $(1, \ldots, X, Y, \ldots,$ and $\beta)$. At least some of the components are comprised of subcomponents. For example, component 1 is comprised of sub-components 1-1 through 1-x, which is typically manufactured by a different entity than the entity manufacturing the product. In addition, some of the sub-components may be comprised of further sub-components. For example, sub-component 1-1 is comprised of further sub-components 1-1-1 through 1-1-y.

The availability of a component, sub-component, or further sub-components affects an inventory philosophy for manufacturing the product. For example, if one sub-component or further sub-component becomes in short supply, the production of the product may be adversely affected. As such, it would behoove the manufacturer to monitor evaluation data that affects the availability of its components, sub-components, and further sub-components. The evaluation data may include pricing information, component availability, raw materials availability, raw material supply issues, shipping requirements and/or constraints, assembly requirement information (e.g., timing, complexity, labor involvement, etc.), import/export regulations, political issues, labor issues, weather, component and/or sub-component demand, product marketing information, etc.

Figure 66:
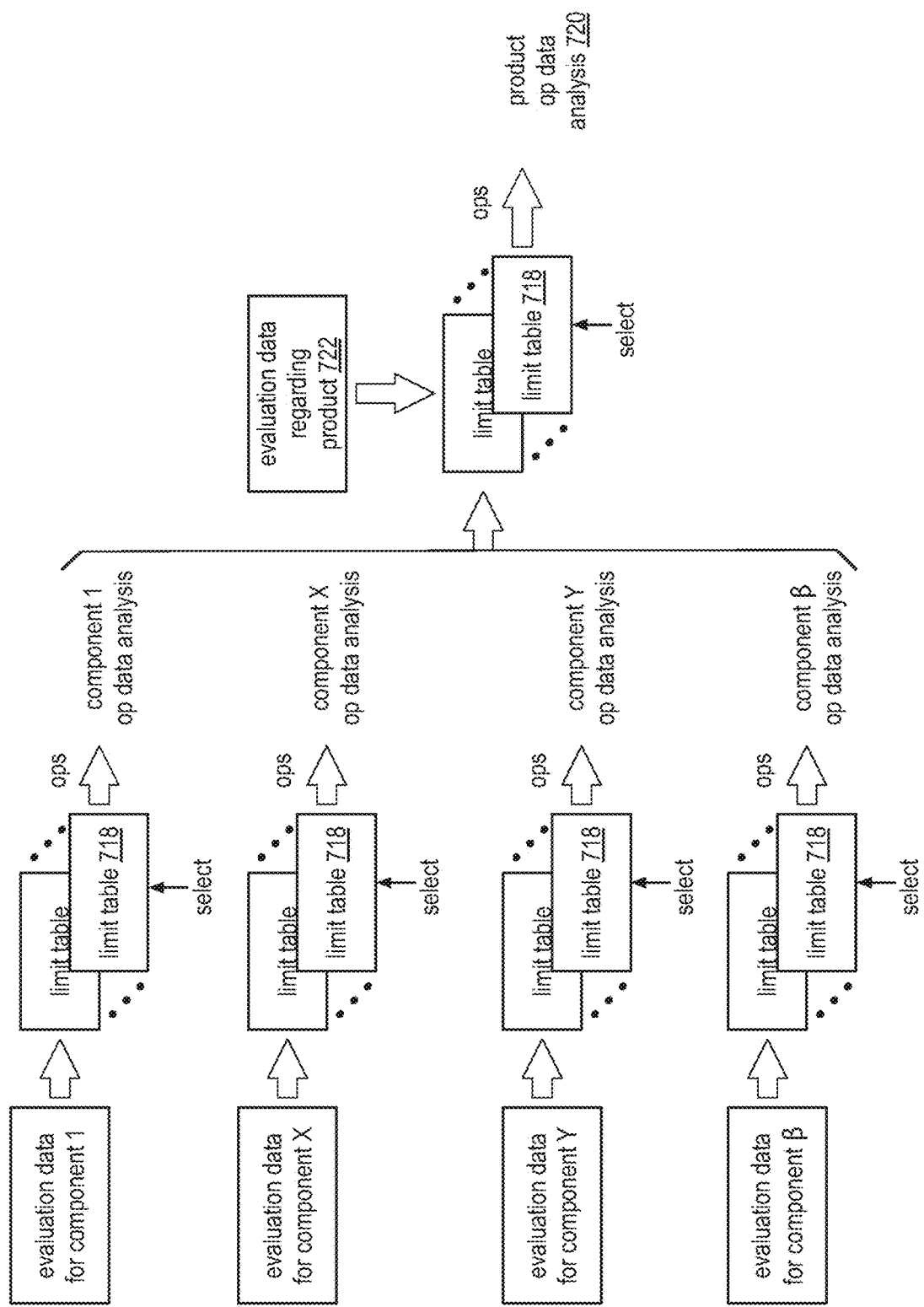
FIG. 66 is a diagram of an example of limit tables for inventory management of an assembly line of building a product in accordance with the present invention.

FIG. 66 is a diagram of an example of limit tables 718 for inventory management of an assembly line of building a product of FIG. 65. As shown, a plurality of limit tables 718 may be created for managing inventory for the product, each of which includes various operations that, when executed, produces product operation data analysis 720, which may include, for a given time frame (e.g., a day, a week, a month, etc.), buy more of one or more components, buy less of one or more components, buy at status quo for one or more components, user alterative suppliers for one or more components, increase inventory of one or more components for the next time frame, decrease inventory of one or more components for the next time frame, timing for placing orders for one or more components, quantity per order, determine shipping options for one or more components, etc.

The execution of a selected limit table 718 is based on the evaluation data regarding the product 722 and the operation data analysis for at least some of the components. In addition, the selection of a limit table 718 may be based on the operation data analysis of one or more of the components. Executing the operations of a selected limit table 718 produces the component operation data analysis for a component.

Figure 67:
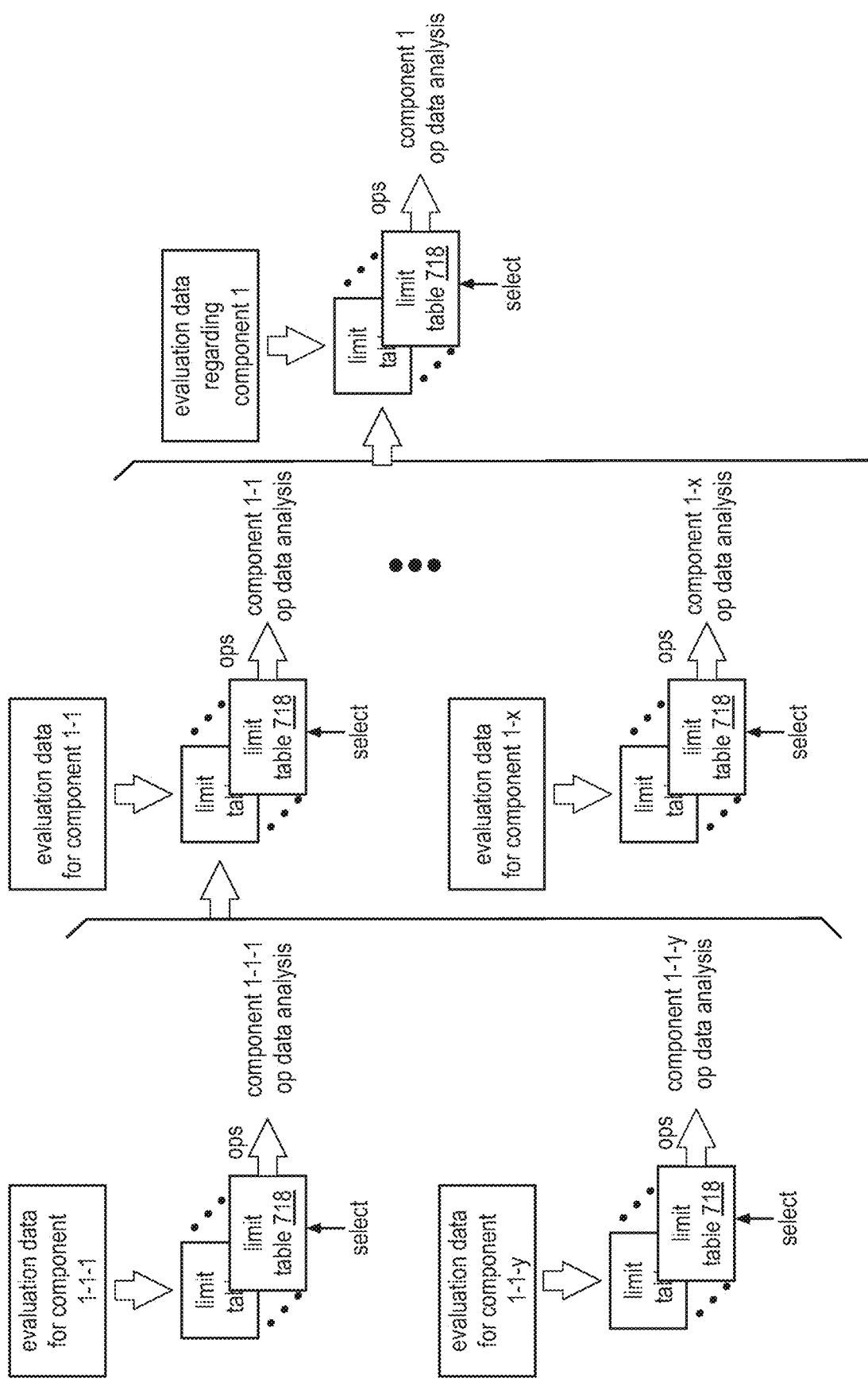
FIG. 67 is a diagram of an example of limit tables for inventory management of an assembly line of building a product in accordance with the present invention.

FIG. 67 is a diagram of an example of limit tables 718 for inventory management of a component of a product of FIG. 65. This example illustrates the tiers of operation data analysis for component 1 being built on the operation data analysis of its sub-components, which is built on the operation data analysis of its sub-components. By using g a tiered analysis approach to inventory management, inventory supplies can be adjusted based on issues that affect the availability and pricing of components. For example, historical analysis of politics in a particular country shows that, when a particular political issue arises, the availability of raw materials for a sub-component is reduced within 6 months of the outbreak of the political issue. As such, it might be prudent to overstock the component now to avoid potential limited supplies in the future.

Figure 68:
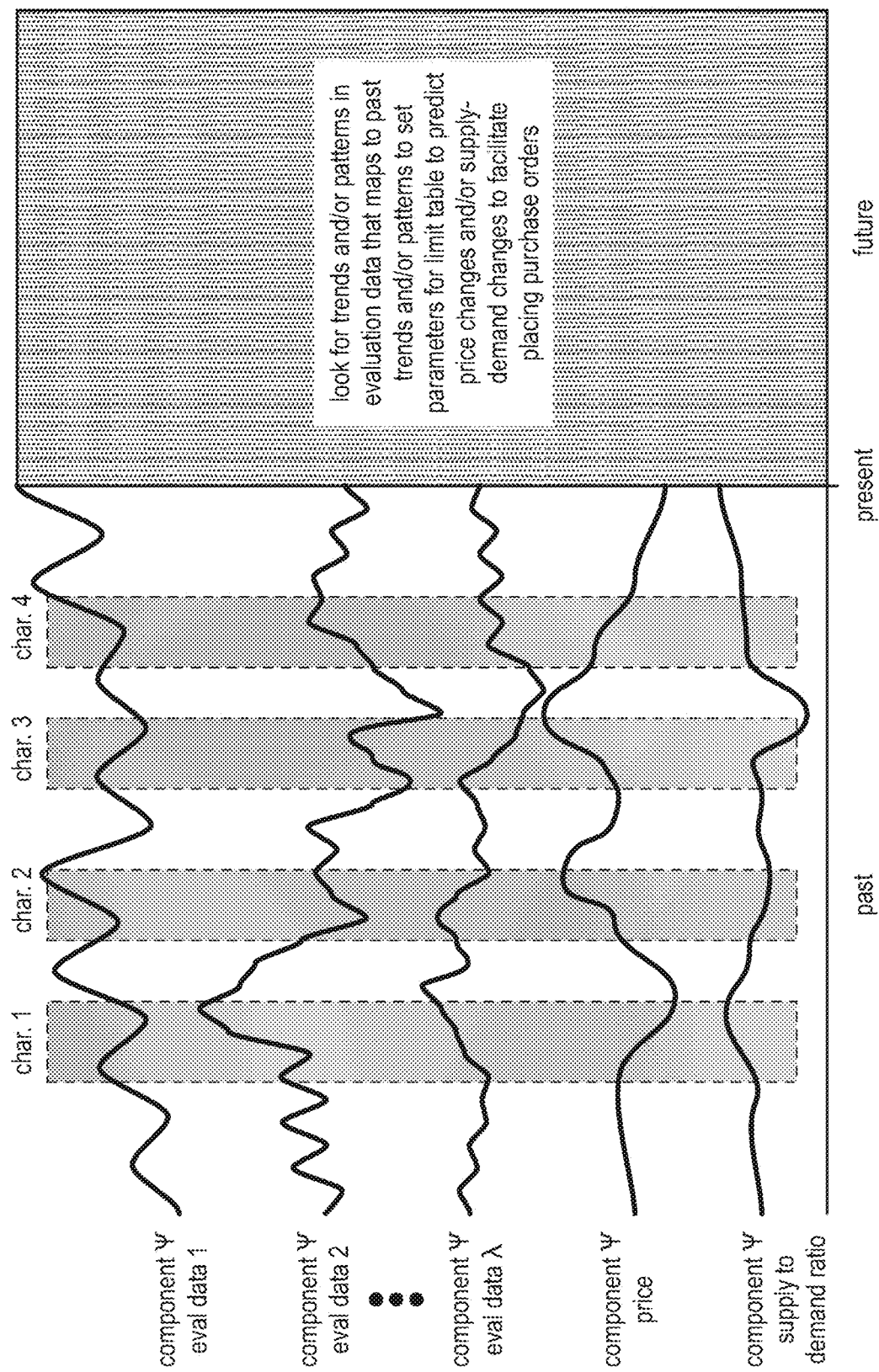
FIG. 68 is a diagram of an example of inventory management of an assembly line of building a product in accordance with the present invention.

FIG. 68 is a diagram of an example of inventory management of an assembly line of building a product by monitoring various evaluation data for component $\Psi$. The evaluation data includes evaluation data 1, evaluation data 2, evaluation data $\lambda$, pricing information, and supply to demand ratio. The grey areas in the past section are reflective of when the data is exhibiting a recognizable characteristic (e.g., pattern, trend, value, function result, etc.). Note that the time frame may be seconds, minutes, hours, days, weeks, months, years, etc.

The various evaluation data may be analyzed individually, collectively, or in any combination for one or more characteristics. For example, characteristic 1 may be a pattern of evaluation data $\lambda$, that has an increasing value for a period of time at a desired slope. As another example, characteristic 2 may be a function executed upon evaluation data 1 and 2. As yet another example, characteristic 3 may based on a trend of the price evaluation data. As a further example, the characteristic 4 may be based on a functional result of all of the evaluation data.

The identifiable characteristics of the past are used to identify similar characteristics in the future, which can be used to set indicators for a limit table. Such limit tables may then be used to manage inventory based on recognizable characteristics and probable subsequent characteristics.

Figure 69:
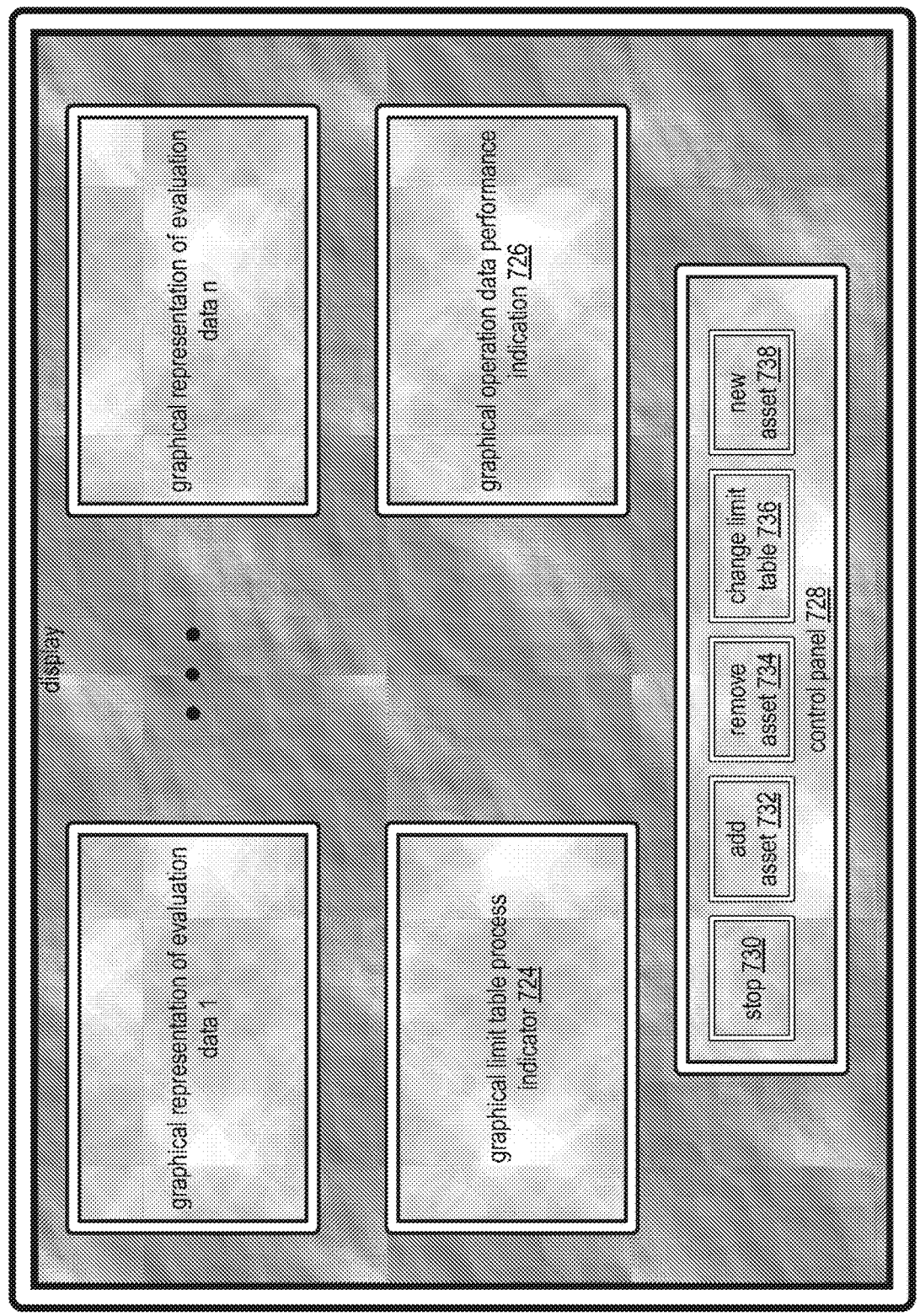
FIG. 69 is a diagram of an example of graphical user interface in accordance with the present invention.

FIG. 69 is a diagram of an example of graphical user interface (GUI) for an asset modification process. The GUI includes a plurality of windows. Some of the windows may be used to display a graphical representation of evaluation data of interest. One or more other windows may be used to illustrate the processing of a limit table 724. Another window may be used to illustrate a graphical representation of the operation data (e.g., asset modification) performance (e.g., increasing, reducing, etc.) 726. Another window may be used for a graphical representation of a control panel 728.

The control panel 728 may include buttons for stopping the execution of a limit table 730, adding another asset to the processing of the current limit table 732, removing an asset from the processing of the current limit table 734, changing the limit table 736, selecting a new asset and a new limit table for modification 738. Other controls may be included to build a limit table, selecting a limit table, selecting an asset, etc.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A computer-implemented method of using a data communication system for dynamic asset modification, the method comprises:
    creating, by an asset modification module of a service provider computing device of the data communication system, one or more limit tables associated with an asset to be modified;
    identifying, by the asset modification module of the service provider computing device, time-varying and time-sensitive evaluation data from one or more limit tables;
    analyzing, by the asset modification module of the service provider computing device, the time-varying and time-sensitive evaluation data based on evaluation criteria from the one or more limit tables to produce analyzed time-varying and time-sensitive evaluation data;
    triggering, by the asset modification module of the service provider computing device, one or more operations of a set of operations corresponding to a particular criterion in accordance with the analyzed time-varying and time-sensitive evaluation data;
    generating, by the asset modification module of the service provider computing device of the data communication system, a core algorithm for modification of assets associated with a plurality of user computing devices of the data communication system, wherein the core algorithm modifies the assets based on the analyzed time-sensitive and time varying evaluation data and in accordance with user preferences of a subset of user computing devices of the plurality of user computing devices, wherein the subset of user computing devices are associated with purchasers of the assets, wherein the subset of user computing devices are disassociated with sellers of the assets;
    for an asset of the assets associated with a first user computing device of the subset of user computing devices of the data communication system, wherein the first user computing device is distinct from the service provider computing device:
    generating, by an asset modification module of the first user computing device, a set of first augmented algorithms based on the core algorithm, wherein the set of first augmented algorithms modifies the asset based on asset specific time-sensitive and time varying evaluation data and in accordance with asset specific first user preferences for a first purchaser of the asset, wherein the asset specific first user preferences are disassociated with a seller of the asset; and
    selecting the asset to modify comprising:
    obtaining, by the asset modification module of the first user computing device, current asset specific time-sensitive and time varying evaluation data from the asset modification module of the service provider computing device;
    selecting, by the asset modification module of the first user computing device, an augmented algorithm of the set of first augmented algorithms based on the current asset specific time-sensitive and time varying evaluation data and the asset specific first user preferences, wherein the augmented algorithm processes trigger indicators of the current asset specific time-sensitive and time varying evaluation data in light of the asset specific first user preferences to determine a modification operation, wherein the trigger indicators of the current asset specific time-sensitive and time varying evaluation data include a comparison of the current asset specific time-sensitive and time varying evaluation data to a time-sensitive and time varying evaluation data trend and/or data pattern indicates that a favorable asset modification is probable within the next one second of time;
    executing, by the asset modification module of the first user computing device, the one or more operations of the set of operations utilizing trigger indicators of the one or more limit tables;
    modifying, by the asset modification module of the first user computing device, the asset in accordance with the modification operation to produce a modified asset, wherein the modification operation includes, within the one second of time, one or more of: increase amount, decrease amount, dispose of some or all, use some or all, transfer some or all, assign some or all, adjust sales price, adjust anticipated purchase price, adjust purchasing procedures, buy, and sell some or all; and
    storing, by the asset modification module of the first user computing device via the data communication system, a record for the modified asset in a set of records in a memory of the service provider computing device;
    providing, by the service provider computing device, a corresponding asset to the first user computing device in accordance with corresponding asset specific first user preferences for the asset by subsequently utilizing the record for the modified asset, wherein each record of the set of records corresponds to one asset of the assets and is indexed in the memory by an asset identifier of the corresponding one asset of the assets, wherein each record includes the asset identifier of the corresponding one asset of the assets wherein the asset comprises at least one of: tangible property, financial capital, intangible assets, intelligence information, a rented asset, or a disposable asset.

2. A data communication system for dynamic asset modification, the data communication system comprises:

a service provider computing device comprising:
an interface of the service provider computing device;
memory of the service provider computing device;
an asset modification processing module of the service provider computing device operably coupled to the memory of the service provider computing device and the interface of the service provider computing device, wherein the asset modification processing module of the service provider computing device is operable to:
create one or more limit tables associated with an asset to be modified;
identify time-varying and time-sensitive evaluation data from one or more limit tables;
analyze the time-varying and time-sensitive evaluation data based on evaluation criteria from the one or more limit tables to produce analyzed time-varying and time-sensitive evaluation data;
trigger one or more operations of a set of operations corresponding to a particular criterion in accordance with the analyzed time-varying and time-sensitive evaluation data;
generate a core algorithm for modification of assets associated with a plurality of user computing devices of the data communication system, wherein the core algorithm modifies the assets based on the analyzed time-sensitive and time varying evaluation data and in accordance with user preferences of a subset of user computing devices of the plurality of user computing devices, wherein the subset of user computing devices are associated with purchasers of the assets, wherein the subset of user computing devices are disassociated with sellers of the assets; and a first user computing device comprising:
an interface of the first user computing device;
memory of the first user computing device;
an asset modification processing module of the first user computing device operably coupled to the memory of the first user computing device and the interface of the first user computing device, wherein the asset modification processing module of the first user computing device is operable to:
for an asset of the assets associated with the first user computing device of the subset of user computing devices of the data communication system, wherein the first user computing device is distinct from the service provider computing device:
generate a set of first augmented algorithms based on the core algorithm, wherein the set of first augmented algorithms modifies the asset based on asset specific time-sensitive and time varying evaluation data and in accordance with asset specific first user preferences for a first purchaser of the asset, wherein the asset specific first user preferences are disassociated with a seller of the asset; and select the asset to modify, wherein the asset modification processing module of the first user computing device is further operable to:
obtain current asset specific time-sensitive and time varying evaluation data from the asset modification module of the service provider computing device;
select an augmented algorithm of the set of first augmented algorithms based on the current asset specific time-sensitive and time varying evaluation data and the asset specific first user preferences, wherein the augmented algorithm processes trigger indicators of the current asset specific time-sensitive and time varying evaluation data in light of the asset specific first user preferences to determine a modification operation, wherein the trigger indicators of the current asset specific time-sensitive and time varying evaluation data include a comparison of the current asset specific time-sensitive and time varying evaluation data to a time-sensitive and time varying evaluation data trend and/or data pattern indicates that a favorable asset modification is probable within the next one second of time;
execute the one or more operations of the set of operations utilizing trigger indicators of the one or more limit tables;
modify the asset in accordance with the modification operation to produce a modified asset, wherein the modification operation includes, within the one second of time, one or more of: increase amount, decrease amount, dispose of some or all, use some or all, transfer some or all, assign some or all, adjust sales price, adjust anticipated purchase price, adjust purchasing procedures, buy, and sell some or all; and
store, via the interface of the first user computing device and the data communication system, a record for the modified asset to be in a set of records in the memory of the service provider computing device;
provide a corresponding asset to the first user computing device in accordance with corresponding asset specific first user preferences for the asset by subsequently utilizing the record for the modified asset, wherein each record of the set of records corresponds to one asset of the assets and is indexed in the memory by an asset identifier of the corresponding one asset of the assets, wherein each record includes the asset identifier of the corresponding one asset of the assets, wherein the asset comprises at least one of: tangible property, financial capital, intangible assets, intelligence information, a rented asset, or a disposable asset.

3. A non-transitory computer readable storage medium that stores a method for dynamic asset modification for execution by one or more asset modification processing modules of one or more computing devices of a data communication system, the non-transitory computer readable storage medium comprises:
a first storage section that stores operations that, executed by an asset modification processing module of the one or more asset modification processing modules, causes the asset modification processing module to:

create one or more limit tables associated with an asset to be modified;
identify time-varying and time-sensitive evaluation data from one or more limit tables;
analyze the time-varying and time-sensitive evaluation data based on evaluation criteria from the one or more limit tables to produce analyzed time-varying and time-sensitive evaluation data;
trigger one or more operations of a set of operations corresponding to a particular criterion in accordance with the analyzed time-varying and time-sensitive evaluation data;
generate a core algorithm for modification of assets associated with a plurality of user computing devices of the data communication system, wherein the core algorithm modifies the assets based on the analyzed time-sensitive and time varying evaluation data and in accordance with user preferences of a subset of user computing devices of the plurality of user computing devices, wherein the subset of user computing devices are associated with purchasers of the assets, wherein the subset of user computing devices are disassociated with sellers of the assets;
a second storage section that stores operations that, executed by the asset modification processing module, causes the asset modification processing module to:
for an asset of the assets associated with a first user computing device of the subset of user computing devices of the data communication system, wherein the first user computing device is distinct from a service provider computing device:
generate a set of first augmented algorithms based on the core algorithm, wherein the set of first augmented algorithms modifies the asset based on asset specific time-sensitive and time varying evaluation data and in accordance with asset specific first user preferences for a first purchaser of the asset, wherein the asset specific first user preferences are disassociated with a seller of the asset; and
a third storage section that stores operations that, executed by the asset modification processing module, causes the asset modification processing module to:
select the asset to modify, wherein the third storage section stores further operations that, executed by the asset modification processing module, further cause the asset modification module to:
obtain current asset specific time-sensitive and time varying evaluation data from the service provider computing device;
select an augmented algorithm of the set of first augmented algorithms based on the current asset specific time-sensitive and time varying evaluation data and the asset specific first user preferences, wherein the augmented algorithm processes trigger indicators of the current asset specific time-sensitive and time varying evaluation data in light of the asset specific first user preferences to determine a modification operation, wherein the trigger indicators of the current asset specific time-sensitive and time varying evaluation data include a comparison of the current asset specific time-sensitive and time varying evaluation data to a time-sensitive and time varying evaluation data trend and/or data pattern indicates that a favorable asset modification is probable within the next one second of time;
execute the one or more operations of the set of operations utilizing trigger indicators of the one or more limit tables;
modify the asset in accordance with the modification operation to produce a modified asset, wherein the modification operation includes, within the one second of time, one or more of: increase amount, decrease amount, dispose of some or all, use some or all, transfer some or all, assign some or all, adjust sales price, adjust anticipated purchase price, adjust purchasing procedures, buy, and sell some or all; and
store, via the data communication system, a record for the modified asset in a set of records in a memory of the service provider computing device;
provide a corresponding asset to the first user computing device in accordance with corresponding asset specific first user preferences for the asset by subsequently utilizing the record for the modified asset, wherein each record of the set of records corresponds to one asset of the assets and is indexed in the memory by an asset identifier of the corresponding one asset of the assets, wherein each record includes the asset identifier of the corresponding one asset of the assets, wherein the asset comprises at least one of: tangible property, financial capital, intangible assets, intelligence information, a rented asset, or a disposable asset.

\* \* \* \* \*